United States Patent
Mitkar et al.

(10) Patent No.: US 11,249,858 B2
(45) Date of Patent: *Feb. 15, 2022

(54) POINT-IN-TIME BACKUPS OF A PRODUCTION APPLICATION MADE ACCESSIBLE OVER FIBRE CHANNEL AND/OR ISCSI AS DATA SOURCES TO A REMOTE APPLICATION BY REPRESENTING THE BACKUPS AS PSEUDO-DISKS OPERATING APART FROM THE PRODUCTION APPLICATION AND ITS HOST

(71) Applicant: Commvault Systems, Inc., Tinton Falls, NJ (US)

(72) Inventors: Amit Mitkar, Manalapan, NJ (US); Paramasivam Kumarasamy, Morganville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 180 days.

This patent is subject to a terminal disclaimer.

(21) Appl. No.: 16/422,862

(22) Filed: May 24, 2019

(65) Prior Publication Data

US 2019/0278667 A1    Sep. 12, 2019

Related U.S. Application Data

(63) Continuation of application No. 15/015,049, filed on Feb. 3, 2016, now Pat. No. 10,360,110, which is a
(Continued)

(51) Int. Cl.
*G06F 3/06* (2006.01)
*G06F 11/14* (2006.01)
(Continued)

(52) U.S. Cl.
CPC ............ *G06F 11/1464* (2013.01); *G06F 3/06* (2013.01); *G06F 11/00* (2013.01);
(Continued)

(58) Field of Classification Search
CPC ........ G06F 11/1464; G06F 3/06; G06F 11/00; G06F 2201/84; H04L 67/1095; H04L 69/40
(Continued)

(56) References Cited

U.S. PATENT DOCUMENTS 4,084,231 A    4/1978 Capozzi et al.
4,267,568 A    5/1981 Dechant et al.
(Continued)

FOREIGN PATENT DOCUMENTS

CN    101650680 A    2/2010
EP    0259912    3/1988
(Continued)

OTHER PUBLICATIONS

Armstead et al., "Implementation of a Campwide Distributed Mass Storage Service: The Dream vs. Reality," IEEE, Sep. 11-14, 1995, pp. 190-199.
(Continued)

*Primary Examiner* — Hosain T Alam
*Assistant Examiner* — Robert F May
(74) *Attorney, Agent, or Firm* — Commvault Systems, Inc.

(57) ABSTRACT

The present enhancement leaves production systems undisturbed while a remote application ("testbed application") executes elsewhere ("testbed host"). An intermediary computing device hosts an enhanced pseudo-disk driver, pseudo-disks, and an enhanced media agent. The enhanced pseudo-disk driver creates the pseudo-disks, each one representing an associated point-in-time backup image residing in sec-
(Continued)

System 700 For Making Accessible Over Fibre Channel And/or ISCSI One Or More Point-in-time Backups Of A Production Application As Respective Data Sources To A Remote Application, By Representing The Backups As Respective Pseudo-disks Operating Apart From The Production Application And Its Host ondary storage. A network, e.g., an Internet Protocol (IP) network or a Fibre Channel (FC) Storage Area Network (SAN), connects the intermediary device with the testbed host, and the enhanced media agent exposes pseudo-disks over the network using iSCSI or FC protocol, respectively. The testbed application uses an exposed pseudo-disk as its recovery data source, such that pseudo-disk resources provide data on an as-needed basis sufficient for the testbed application to operate, yet (a) without restoring the entire associated backup image from secondary storage and (b) without impacting the production environment.

20 Claims, 18 Drawing Sheets

Related U.S. Application Data continuation-in-part of application No. 14/453,045, filed on Aug. 6, 2014, now Pat. No. 9,852,026.

(51) Int. Cl.
*G06F 11/00* (2006.01)
*H04L 29/14* (2006.01)
*H04L 29/08* (2006.01)

(52) U.S. Cl.
CPC ...... *G06F 2201/84* (2013.01); *H04L 67/1095* (2013.01); *H04L 69/40* (2013.01)

(58) Field of Classification Search
USPC ...................................................... 707/649
See application file for complete search history.

(56) References Cited

U.S. PATENT DOCUMENTS

| | | | |
|---|---|---|---|
| 4,283,787 A | 8/1981 | Chambers |
| 4,394,732 A | 7/1983 | Swenson |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos |
| 5,403,639 A | 4/1995 | Belsan |
| 5,410,700 A | 4/1995 | Fecteau et al. |
| 5,420,996 A | 5/1995 | Aoyagi |
| 5,448,718 A | 9/1995 | Cohn |
| 5,448,724 A | 9/1995 | Hayashi et al. |
| 5,450,592 A | 9/1995 | McLeod |
| 5,454,099 A | 9/1995 | Myers et al. |
| 5,485,606 A | 1/1996 | Midgley |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,537,568 A | 7/1996 | Yanai |
| 5,544,345 A | 8/1996 | Carpenter et al. |
| 5,544,347 A | 8/1996 | Yanai et al. |
| 5,555,371 A | 9/1996 | Duyanovish |
| 5,559,957 A | 9/1996 | Balk |
| 5,559,991 A | 9/1996 | Kanfi |
| 5,564,037 A | 10/1996 | Lam |
| 5,608,865 A | 3/1997 | Midgely |
| 5,613,134 A | 3/1997 | Lucus |
| 5,619,644 A | 4/1997 | Crockett et al. |
| 5,625,793 A | 4/1997 | Mirza |
| 5,634,052 A | 5/1997 | Morris |
| 5,638,509 A | 6/1997 | Dunphy et al. |
| 5,642,496 A | 6/1997 | Kanfi |
| 5,659,614 A | 8/1997 | Bailey |
| 5,666,501 A | 9/1997 | Jones |
| 5,673,381 A | 9/1997 | Huai et al. |
| 5,673,382 A | 10/1997 | Cannon |
| 5,699,361 A | 12/1997 | Ding et al. |
| 5,711,010 A | 1/1998 | Naddell et al. |
| 5,720,026 A | 2/1998 | Uemura |
| 5,729,743 A | 3/1998 | Squibb |
| 5,732,240 A | 3/1998 | Caccavale |
| 5,740,405 A | 4/1998 | DeGraff |
| 5,751,997 A | 5/1998 | Kullick et al. |
| 5,758,359 A | 5/1998 | Saxon |
| 5,758,649 A | 6/1998 | Iwashita |
| 5,761,677 A | 6/1998 | Senator et al. |
| 5,764,972 A | 6/1998 | Crouse et al. |
| 5,765,173 A | 6/1998 | Cane et al. |
| 5,778,165 A | 7/1998 | Saxon |
| 5,778,395 A | 7/1998 | Whiting et al. |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,864,846 A | 1/1999 | Voorhees |
| 5,872,905 A | 2/1999 | Ono et al. |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,894,585 A | 4/1999 | Inoue et al. |
| 5,896,531 A | 4/1999 | Curtis |
| 5,901,327 A | 5/1999 | Ofek |
| 5,907,672 A | 5/1999 | Matze |
| 5,924,102 A | 7/1999 | Perks |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,983,239 A | 11/1999 | Cannon |
| 5,990,810 A | 11/1999 | Williams |
| 5,991,753 A | 11/1999 | Wilde |
| 6,006,029 A * | 12/1999 | Bianchi ............... G06F 13/105 703/21 |
| 6,009,275 A | 12/1999 | DeKoning et al. |
| 6,012,053 A | 1/2000 | Pant |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough |
| 6,073,128 A | 6/2000 | Pongracz |
| 6,076,148 A | 6/2000 | Kedem et al. |
| 6,091,518 A | 7/2000 | Anabuki |
| 6,094,416 A | 7/2000 | Ying |
| 6,112,304 A | 8/2000 | Clawson |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,182,198 B1 | 1/2001 | Hubis |
| 6,212,512 B1 | 4/2001 | Barney et al. |
| 6,226,759 B1 | 5/2001 | Miller |

(56) References Cited

U.S. PATENT DOCUMENTS

| | | |
|---|---|---|
| 6,239,800 B1 | 5/2001 | Mayhew |
| 6,253,217 B1 | 6/2001 | Dourish |
| 6,260,069 B1 | 7/2001 | Anglin |
| 6,266,679 B1 | 7/2001 | Szalwinski |
| 6,266,784 B1 | 7/2001 | Hsiao |
| 6,269,431 B1 | 7/2001 | Dunham |
| 6,275,953 B1 | 8/2001 | Vahalia et al. |
| 6,286,084 B1 | 9/2001 | Wexler et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii |
| 6,327,612 B1 | 12/2001 | Watanabe |
| 6,328,766 B1 | 12/2001 | Long |
| 6,330,570 B1 | 12/2001 | Crighton et al. |
| 6,330,642 B1 | 12/2001 | Carteau |
| 6,341,287 B1 | 1/2002 | Sziklai et al. |
| 6,343,287 B1 | 1/2002 | Kumar |
| 6,343,324 B1 | 1/2002 | Hubis et al. |
| 6,345,288 B1 | 2/2002 | Reed et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,462 B1 | 3/2002 | Bergsten |
| 6,366,986 B1 | 4/2002 | St. Pierre |
| 6,366,988 B1 | 4/2002 | Skiba |
| 6,367,073 B2 | 4/2002 | Elledge |
| 6,374,336 B1 | 4/2002 | Peters |
| 6,374,363 B1 | 4/2002 | Wu |
| 6,389,432 B1 | 5/2002 | Pothapragada et al. |
| 6,397,308 B1 | 5/2002 | Ofek |
| 6,418,478 B1 | 7/2002 | Ignatius et al. |
| 6,421,678 B2 | 7/2002 | Smiga et al. |
| 6,421,711 B1 | 7/2002 | Blumenau et al. |
| 6,425,057 B1 | 7/2002 | Cherkasova et al. |
| 6,442,706 B1 | 8/2002 | Wahl |
| 6,470,332 B1 | 10/2002 | Weschler |
| 6,484,162 B1 | 11/2002 | Edlund |
| 6,487,561 B1 | 11/2002 | Ofek et al. |
| 6,487,644 B1 | 11/2002 | Huebsch |
| 6,496,850 B1 | 12/2002 | Bowman-Amuah |
| 6,502,205 B1 | 12/2002 | Yanai |
| 6,519,679 B2 | 2/2003 | Devireddy et al. |
| 6,538,669 B1 | 3/2003 | Lagueux, Jr. et al. |
| 6,539,388 B1 | 3/2003 | Hattori et al. |
| 6,542,972 B2 | 4/2003 | Ignatius et al. |
| 6,549,918 B1 | 4/2003 | Probert |
| 6,557,030 B1 | 4/2003 | Hoang |
| 6,557,039 B1 | 4/2003 | Leong |
| 6,557,089 B1 | 4/2003 | Reed |
| 6,564,228 B1 | 5/2003 | O'Connor |
| 6,618,771 B1 | 9/2003 | Leja |
| 6,629,110 B2 | 9/2003 | Cane |
| 6,647,399 B2 | 11/2003 | Zaremba |
| 6,658,436 B2 | 12/2003 | Oshinsky et al. |
| 6,658,526 B2 | 12/2003 | Nguyen et al. |
| 6,662,198 B2 | 12/2003 | Satyanarayanan |
| 6,662,218 B2 | 12/2003 | Mighdoll et al. |
| 6,665,815 B1 | 12/2003 | Goldstein |
| 6,675,177 B1 | 1/2004 | Webb |
| 6,675,299 B2 | 1/2004 | Porter et al. |
| 6,691,232 B1 | 2/2004 | Wood et al. |
| 6,704,730 B2 | 3/2004 | Moulton et al. |
| 6,721,767 B2 | 4/2004 | De Meno et al. |
| 6,732,088 B1 | 5/2004 | Glance |
| 6,732,125 B1 | 5/2004 | Autry |
| 6,732,231 B1 | 5/2004 | Don |
| 6,732,244 B2 | 5/2004 | Ashton |
| 6,745,178 B1 | 6/2004 | Emens |
| 6,757,794 B2 | 6/2004 | Cabrera et al. |
| 6,760,723 B2 | 7/2004 | Oshinsky et al. |
| 6,760,812 B1 | 7/2004 | Degenaro et al. |
| 6,789,161 B1 | 9/2004 | Blendermann |
| 6,795,828 B2 | 9/2004 | Ricketts |
| 6,799,258 B1 | 9/2004 | Linde |
| 6,810,398 B2 | 10/2004 | Moulton |
| 6,816,941 B1 | 11/2004 | Carlson |
| 6,820,070 B2 | 11/2004 | Goldman |
| 6,823,377 B1 | 11/2004 | Wu et al. |
| 6,832,330 B1 | 12/2004 | Boudrie |
| 6,839,741 B1 | 1/2005 | Tsai |
| 6,839,803 B1 | 1/2005 | Loh |
| 6,850,994 B2 | 2/2005 | Gabryljeski |
| 6,860,422 B2 | 3/2005 | Hull et al. |
| 6,865,568 B2 | 3/2005 | Chau |
| 6,865,655 B1 | 3/2005 | Andersen |
| 6,871,182 B1 | 3/2005 | Winnard |
| 6,886,020 B1 | 4/2005 | Zahavi |
| 6,892,221 B2 | 5/2005 | Ricart |
| 6,898,650 B1 | 5/2005 | Gao et al. |
| 6,912,629 B1 | 6/2005 | West et al. |
| 6,934,725 B1 | 8/2005 | Dings |
| 6,948,038 B2 | 9/2005 | Berkowitz |
| 6,948,039 B2 | 9/2005 | Biessener et al. |
| 6,952,758 B2 | 10/2005 | Chron et al. |
| 6,957,186 B1 | 10/2005 | Guheen |
| 6,970,997 B2 | 11/2005 | Shibayama et al. |
| 6,976,039 B2 | 12/2005 | Chefalas |
| 6,983,351 B2 | 1/2006 | Gibble |
| 6,995,675 B2 | 2/2006 | Curkendall |
| 6,996,616 B1 | 2/2006 | Leighton |
| 7,003,641 B2 | 2/2006 | Prahlad et al. |
| 7,028,079 B2 | 4/2006 | Mastrianni |
| 7,028,096 B1 | 4/2006 | Lee |
| 7,035,880 B1 | 4/2006 | Crescenti et al. |
| 7,039,860 B1 | 5/2006 | Gautestad |
| 7,054,960 B1 | 5/2006 | Bezbaruah et al. |
| 7,058,661 B2 | 6/2006 | Ciaramitaro |
| 7,065,619 B1 | 6/2006 | Zhu et al. |
| 7,082,441 B1 | 7/2006 | Zahavi |
| 7,085,904 B2 | 8/2006 | Mizuno et al. |
| 7,096,330 B1 | 8/2006 | Root et al. |
| 7,099,901 B2 | 8/2006 | Sutoh |
| 7,100,089 B1 | 8/2006 | Phelps |
| 7,103,617 B2 | 9/2006 | Phatak |
| 7,107,298 B2 | 9/2006 | Prahlad et al. |
| 7,107,395 B1 | 9/2006 | Ofek |
| 7,107,416 B2 | 9/2006 | Stuart et al. |
| 7,117,246 B2 | 10/2006 | Christenson et al. |
| 7,130,860 B2 | 10/2006 | Pachet |
| 7,130,970 B2 | 10/2006 | Devassy et al. |
| 7,133,870 B1 | 11/2006 | Tripp et al. |
| 7,139,826 B2 | 11/2006 | Watanabe |
| 7,139,846 B1 | 11/2006 | Rossi |
| 7,143,091 B2 | 11/2006 | Charnock |
| 7,146,387 B1 | 12/2006 | Russo |
| 7,155,421 B1 | 12/2006 | Haldar |
| 7,155,465 B2 | 12/2006 | Lee |
| 7,155,481 B2 | 12/2006 | Prahlad |
| 7,155,633 B2 | 12/2006 | Tuma |
| 7,159,081 B2 | 1/2007 | Suzuki |
| 7,162,496 B2 | 1/2007 | Amarendran et al. |
| 7,171,468 B2 | 1/2007 | Yeung |
| 7,171,585 B2 | 1/2007 | Gail |
| 7,174,433 B2 | 2/2007 | Kottomtharayil et al. |
| 7,185,152 B2 | 2/2007 | Takahashi et al. |
| 7,188,141 B2 | 3/2007 | Novaes |
| 7,194,454 B2 | 3/2007 | Hansen |
| 7,197,665 B2 | 3/2007 | Goldstein |
| 7,225,210 B2 | 5/2007 | Guthrie, II |
| 7,240,100 B1 | 7/2007 | Wein |
| 7,243,163 B1 | 7/2007 | Friend et al. |
| 7,246,207 B2 | 7/2007 | Kottomtharayil et al. |
| 7,246,272 B2 | 7/2007 | Cabezas et al. |
| 7,269,664 B2 | 9/2007 | Hutsch |
| 7,272,606 B2 | 9/2007 | Borthakur et al. |
| 7,284,030 B2 | 10/2007 | Ackaouy et al. |
| 7,284,033 B2 | 10/2007 | Jhanji |
| 7,284,104 B1 | 10/2007 | Wu et al. |
| 7,287,047 B2 | 10/2007 | Kavuri |
| 7,287,252 B2 | 10/2007 | Bussiere et al. |
| 7,290,017 B1 | 10/2007 | Wang |
| 7,313,659 B2 | 12/2007 | Suzuki |

(56) References Cited

U.S. PATENT DOCUMENTS

| | | |
|---|---|---|
| 7,315,923 B2 | 1/2008 | Retnamma et al. |
| 7,328,325 B1 | 2/2008 | Solis et al. |
| 7,334,095 B1 | 2/2008 | Fair et al. |
| 7,337,264 B2 | 2/2008 | Iida et al. |
| 7,340,640 B1 | 3/2008 | Karr |
| 7,343,356 B2 | 3/2008 | Prahlad |
| 7,343,453 B2 | 3/2008 | Prahlad et al. |
| 7,343,459 B2 | 3/2008 | Prahlad |
| 7,346,623 B2 | 3/2008 | Prahlad |
| 7,346,676 B1 | 3/2008 | Swildens |
| 7,346,751 B2 | 3/2008 | Prahlad |
| 7,376,947 B2 | 5/2008 | Evers |
| 7,379,978 B2 | 5/2008 | Anderson |
| 7,383,379 B2 | 6/2008 | Patterson et al. |
| 7,383,462 B2 | 6/2008 | Osaki et al. |
| 7,386,535 B1 | 6/2008 | Kalucha |
| 7,389,311 B1 | 6/2008 | Crescenti et al. |
| 7,395,282 B1 | 7/2008 | Crescenti et al. |
| 7,412,583 B2 | 8/2008 | Burton |
| 7,421,460 B2 | 9/2008 | Chigusa et al. |
| 7,424,543 B2 | 9/2008 | Rice |
| 7,434,219 B2 | 10/2008 | DeMeno |
| 7,437,388 B1 | 10/2008 | DeVos |
| 7,440,982 B2 | 10/2008 | Lu et al. |
| 7,454,569 B2 | 11/2008 | Kavuri et al. |
| 7,457,790 B2 | 11/2008 | Kochunni |
| 7,472,142 B2 | 12/2008 | Prahlad |
| 7,472,242 B1 | 12/2008 | Deshmukh et al. |
| 7,490,207 B2 | 2/2009 | Amarendran et al. |
| 7,496,841 B2 | 2/2009 | Hadfield |
| 7,500,053 B1 | 3/2009 | Kavuri et al. |
| 7,506,010 B2 | 3/2009 | Kulkarni et al. |
| 7,516,186 B1 | 4/2009 | Borghetti et al. |
| 7,519,726 B2 | 4/2009 | Palliyll et al. |
| 7,529,782 B2 | 5/2009 | Prahlad et al. |
| 7,536,291 B1 | 5/2009 | Vijayan Retnamma et al. |
| 7,539,707 B2 | 5/2009 | Prahlad |
| 7,539,710 B1 | 5/2009 | Haustein et al. |
| 7,543,125 B2 | 6/2009 | Gokhale |
| 7,546,324 B2 | 6/2009 | Prahlad et al. |
| 7,552,358 B1 * | 6/2009 | Asgar-Deen ......... G06F 11/1435 714/15 |
| 7,565,484 B2 | 7/2009 | Ghosal |
| 7,568,080 B2 | 7/2009 | Prahlad et al. |
| 7,577,689 B1 | 8/2009 | Mastiner et al. |
| 7,577,694 B2 | 8/2009 | Nakano |
| 7,577,806 B2 | 8/2009 | Rowan |
| 7,584,338 B1 | 9/2009 | Bricker et al. |
| 7,584,469 B2 | 9/2009 | Mitekura |
| 7,587,715 B1 | 9/2009 | Barrett |
| 7,593,935 B2 | 9/2009 | Sullivan |
| 7,596,713 B2 | 9/2009 | Mani-Meitav et al. |
| 7,603,386 B2 | 10/2009 | Amarendran et al. |
| 7,603,626 B2 | 10/2009 | Williams |
| 7,606,844 B2 | 10/2009 | Kottomtharayil |
| 7,610,285 B1 | 10/2009 | Zoellner et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,194 B2 | 12/2009 | Wahlert et al. |
| 7,634,627 B1 | 12/2009 | Ohr |
| 7,636,743 B2 | 12/2009 | Erofeev |
| 7,651,593 B2 | 1/2010 | Prahlad et al. |
| 7,656,849 B1 | 2/2010 | Evans |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,664,771 B2 | 2/2010 | Kusters |
| 7,668,884 B2 | 2/2010 | Prahlad |
| 7,673,175 B2 | 3/2010 | Mora et al. |
| 7,676,542 B2 | 3/2010 | Moser |
| 7,676,628 B1 * | 3/2010 | Compton .............. G06F 3/0665 711/114 |
| 7,685,126 B2 | 3/2010 | Patel et al. |
| 7,689,899 B2 | 3/2010 | Leymaster |
| 7,698,520 B2 | 4/2010 | Minami et al. |
| 7,720,841 B2 | 5/2010 | Gu et al. |
| 7,730,031 B2 | 6/2010 | Forster |
| 7,734,593 B2 | 6/2010 | Prahlad |
| 7,734,669 B2 | 6/2010 | Kottomtharayil et al. |
| 7,734,820 B1 | 6/2010 | Ranade et al. |
| 7,739,235 B2 | 6/2010 | Rousseau |
| 7,747,579 B2 | 6/2010 | Prahlad et al. |
| 7,751,628 B1 | 7/2010 | Reisman |
| 7,761,409 B2 | 7/2010 | Stefik et al. |
| 7,761,425 B1 | 7/2010 | Erickson et al. |
| 7,769,722 B1 | 8/2010 | Bergan et al. |
| 7,792,789 B2 | 9/2010 | Prahlad |
| 7,797,279 B1 | 9/2010 | Starling et al. |
| 7,801,864 B2 | 9/2010 | Prahlad et al. |
| 7,801,871 B2 | 9/2010 | Gosnell |
| 7,809,914 B2 | 10/2010 | Kottomtharayil et al. |
| 7,814,118 B2 | 10/2010 | Kottomtharayil |
| 7,814,149 B1 | 10/2010 | Stringham |
| 7,822,939 B1 | 10/2010 | Veprinsky et al. |
| 7,827,150 B1 | 11/2010 | Wu et al. |
| 7,827,266 B2 | 11/2010 | Gupta |
| 7,831,793 B2 | 11/2010 | Chakravarty et al. |
| 7,831,795 B2 | 11/2010 | Prahlad et al. |
| 7,840,533 B2 | 11/2010 | Prahlad et al. |
| 7,840,537 B2 | 11/2010 | Gokhale |
| 7,844,676 B2 | 11/2010 | Prahlad |
| 7,865,517 B2 | 1/2011 | Prahlad |
| 7,865,938 B2 | 1/2011 | Shahbazi |
| 7,877,357 B1 | 1/2011 | Wu et al. |
| 7,882,077 B2 | 2/2011 | Gokhale |
| 7,882,093 B2 | 2/2011 | Kotttomtharayil |
| 7,882,097 B1 | 2/2011 | Ogilvie |
| 7,937,393 B2 | 5/2011 | Prahlad |
| 7,937,420 B2 | 5/2011 | Tabellion |
| 7,937,545 B1 | 5/2011 | Wu et al. |
| 7,937,702 B2 | 5/2011 | De Meno |
| 7,984,063 B2 | 7/2011 | Kottomtharayil |
| 7,984,435 B2 | 7/2011 | Kokkinen |
| 8,037,028 B2 | 10/2011 | Prahlad |
| 8,055,627 B2 | 11/2011 | Prahlad |
| 8,060,514 B2 | 11/2011 | Arrrouye et al. |
| 8,069,218 B1 | 11/2011 | Tormasov et al. |
| 8,074,043 B1 | 12/2011 | Zeis |
| 8,078,607 B2 | 12/2011 | Oztekin et al. |
| 8,099,428 B2 | 1/2012 | Kottomtharayil |
| 8,108,427 B2 | 1/2012 | Prahlad |
| 8,117,173 B2 | 2/2012 | Gurevich et al. |
| 8,126,854 B1 | 2/2012 | Sreedharan |
| 8,131,784 B1 | 3/2012 | Zhuge et al. |
| 8,140,786 B2 | 3/2012 | Bunte et al. |
| 8,145,614 B1 | 3/2012 | Zimran et al. |
| 8,145,742 B1 | 3/2012 | Parker et al. |
| 8,161,003 B2 | 4/2012 | Kavuri |
| 8,170,995 B2 | 5/2012 | Prahlad et al. |
| 8,200,637 B2 | 6/2012 | Stringham |
| 8,200,638 B1 | 6/2012 | Zheng et al. |
| 8,200,923 B1 | 6/2012 | Healey et al. |
| 8,204,862 B1 | 6/2012 | Paulzagade et al. |
| 8,209,334 B1 | 6/2012 | Doerner |
| 8,219,524 B2 | 7/2012 | Gokhale |
| 8,229,954 B2 | 7/2012 | Kottomtharayil et al. |
| 8,230,054 B2 | 7/2012 | Mutnuru et al. |
| 8,230,195 B2 | 7/2012 | Amarendran et al. |
| RE43,678 E | 9/2012 | Major et al. |
| 8,261,240 B2 | 9/2012 | Hoban |
| 8,280,854 B1 | 10/2012 | Emmert |
| 8,285,681 B2 | 10/2012 | Prahlad et al. |
| 8,290,994 B2 | 10/2012 | Allalouf et al. |
| 8,307,177 B2 | 11/2012 | Prahlad et al. |
| 8,347,088 B2 | 1/2013 | Moore et al. |
| 8,352,422 B2 | 1/2013 | Prahlad et al. |
| 8,352,954 B2 | 1/2013 | Gokhale |
| 8,356,209 B2 | 1/2013 | Gunabalasubramaniam et al. |
| 8,364,652 B2 | 1/2013 | Vijayan et al. |
| 8,370,166 B2 | 2/2013 | Ronnewinkel |
| 8,370,542 B2 | 2/2013 | Lu et al. |
| 8,386,733 B1 | 2/2013 | Tsaur |

(56) References Cited

U.S. PATENT DOCUMENTS

| | | |
|---|---|---|
| 8,396,838 B2 | 3/2013 | Brockway et al. |
| 8,463,989 B2 | 6/2013 | Kumagai |
| 8,468,538 B2 | 6/2013 | Attarde et al. |
| 8,473,585 B1 | 6/2013 | Smith et al. |
| 8,477,618 B2 | 7/2013 | Martin |
| 8,484,162 B2 | 7/2013 | Prahlad et al. |
| 8,495,331 B2 | 7/2013 | Matsumoto et al. |
| 8,505,010 B2 | 8/2013 | De Meno et al. |
| 8,510,573 B2 | 8/2013 | Muller et al. |
| 8,528,059 B1 | 9/2013 | Labana et al. |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,578,120 B2 | 11/2013 | Attarde et al. |
| 8,595,191 B2 | 11/2013 | Prahlad et al. |
| 8,600,935 B1 | 12/2013 | Dantkale et al. |
| 8,612,394 B2 | 12/2013 | Prahlad et al. |
| 8,621,240 B1 | 12/2013 | Auchmoody et al. |
| 8,655,850 B2 | 2/2014 | Ngo et al. |
| 8,706,867 B2 | 4/2014 | Vijayan |
| 8,707,070 B2 | 4/2014 | Muller |
| 8,719,264 B2 | 5/2014 | Varadharajan |
| 8,719,809 B2 | 5/2014 | Gokhale |
| 8,725,688 B2 | 5/2014 | Lad |
| 8,726,242 B2 | 5/2014 | Ngo |
| 8,745,105 B2 | 6/2014 | Erofeev |
| 8,769,048 B2 | 7/2014 | Kottomtharayil |
| 8,775,823 B2 | 7/2014 | Gokhale et al. |
| 8,782,064 B2 | 7/2014 | Kottomtharayil |
| 8,826,284 B1 | 9/2014 | Fuller |
| 8,832,706 B2 | 9/2014 | Gokhale et al. |
| 8,849,762 B2 | 9/2014 | Kumarasamy et al. |
| 8,868,884 B2 | 10/2014 | Venkatesh et al. |
| 8,930,306 B1 | 1/2015 | Ngo et al. |
| 8,938,481 B2 | 1/2015 | Kumarasamy et al. |
| 8,954,446 B2 | 2/2015 | Retnamma |
| 8,959,299 B2 | 2/2015 | Ngo et al. |
| 8,966,288 B2 | 2/2015 | Ignatius et al. |
| 9,020,900 B2 | 4/2015 | Retnamma |
| 9,092,378 B2 | 7/2015 | Kumarasamy |
| 9,098,495 B2 | 8/2015 | Gokhale |
| 9,104,623 B2 | 8/2015 | Retnamma et al. |
| 9,110,602 B2 | 8/2015 | Vijayan et al. |
| 9,116,850 B2 | 8/2015 | Vijayan et al. |
| 9,122,692 B1 | 9/2015 | Dalal |
| 9,128,883 B2 | 9/2015 | Gokhale et al. |
| 9,128,901 B1 | 9/2015 | Nickurak |
| 9,208,160 B2 | 12/2015 | Prahlad et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan |
| 9,251,186 B2 | 2/2016 | Muller et al. |
| 9,262,226 B2 | 2/2016 | Gokhale et al. |
| 9,274,803 B2 | 3/2016 | De Meno et al. |
| 9,298,715 B2 | 3/2016 | Kumarasamy et al. |
| 9,342,537 B2 | 5/2016 | Kumarasamy et al. |
| 9,348,827 B1 | 5/2016 | Patwardhan |
| 9,405,482 B2 | 8/2016 | Varadharajan |
| 9,405,631 B2 | 8/2016 | Prahlad et al. |
| 9,411,821 B1 | 8/2016 | Patwardhan |
| 9,436,555 B2 | 9/2016 | Dornemann |
| 9,444,726 B2 | 9/2016 | Baldwin |
| 9,444,811 B2 | 9/2016 | Nara et al. |
| 9,459,968 B2 | 10/2016 | Vijayan |
| 9,547,562 B1 * | 1/2017 | Feathergill .......... G06F 11/1469 |
| 9,589,039 B2 | 3/2017 | Pathak et al. |
| 9,612,916 B2 | 4/2017 | Gokhale et al. |
| 9,632,882 B2 | 4/2017 | Kumarasamy et al. |
| 9,633,033 B2 | 4/2017 | Vijayan |
| 9,633,216 B2 | 4/2017 | Gokhale et al. |
| 9,639,400 B2 | 5/2017 | Gokhale et al. |
| 9,645,762 B2 | 5/2017 | Nara et al. |
| 9,648,100 B2 | 5/2017 | Klose et al. |
| 9,710,338 B1 | 7/2017 | Kumar |
| 9,740,574 B2 | 8/2017 | Kochunni et al. |
| 9,766,825 B2 | 9/2017 | Bhagi |
| 9,811,522 B2 | 11/2017 | St. Laurent et al. |
| 9,823,978 B2 | 11/2017 | Mutha et al. |
| 9,823,979 B2 | 11/2017 | Gokhale et al. |
| 9,852,026 B2 | 12/2017 | Mitkar et al. |
| 9,946,569 B1 | 4/2018 | Beedu et al. |
| 9,946,603 B1 | 4/2018 | Kumar et al. |
| 10,089,193 B2 | 10/2018 | Kumarasamy et al. |
| 10,157,184 B2 | 12/2018 | Yongtao et al. |
| 10,168,929 B2 | 1/2019 | Bhagi et al. |
| 10,205,780 B2 | 2/2019 | Klose et al. |
| 10,228,962 B2 | 3/2019 | Dornemann et al. |
| 10,296,368 B2 | 5/2019 | Dornemann et al. |
| 10,310,950 B2 | 6/2019 | Kochunni et al. |
| 10,360,110 B2 | 7/2019 | Mitkar et al. |
| 10,664,352 B2 | 5/2020 | Rana |
| 10,705,913 B2 | 7/2020 | Mitkar et al. |
| 10,740,193 B2 | 8/2020 | Dhatrak |
| 10,789,387 B2 | 9/2020 | Mutha et al. |
| 10,795,927 B2 | 10/2020 | Kobozev et al. |
| 10,817,326 B2 | 10/2020 | Dornemann et al. |
| 10,860,401 B2 | 12/2020 | Vibhor et al. |
| 10,884,634 B2 | 1/2021 | Bhagi et al. |
| 2001/0012986 A1 | 8/2001 | Conan et al. |
| 2001/0028363 A1 | 10/2001 | Nomoto et al. |
| 2001/0052015 A1 | 12/2001 | Lin et al. |
| 2001/0052058 A1 | 12/2001 | Ohran |
| 2002/0032878 A1 | 3/2002 | Karpf |
| 2002/0049883 A1 | 4/2002 | Schneider |
| 2002/0062439 A1 | 5/2002 | Cotugno et al. |
| 2002/0083055 A1 | 6/2002 | Pachet |
| 2002/0107877 A1 | 8/2002 | Whiting |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0028592 A1 | 2/2003 | Ooho et al. |
| 2003/0033308 A1 | 2/2003 | Patel et al. |
| 2003/0046313 A1 | 3/2003 | Leung et al. |
| 2003/0046396 A1 | 3/2003 | Richter et al. |
| 2003/0050979 A1 | 3/2003 | Takahashi |
| 2003/0065897 A1 | 4/2003 | Sadowsky et al. |
| 2003/0101086 A1 | 5/2003 | San Miguel |
| 2003/0115346 A1 | 6/2003 | McHenry et al. |
| 2003/0172130 A1 | 9/2003 | Fruchtman et al. |
| 2003/0174648 A1 | 9/2003 | Wang et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0039689 A1 | 2/2004 | Penney et al. |
| 2004/0068713 A1 | 4/2004 | Yannakoyorgos |
| 2004/0098383 A1 | 5/2004 | Tabellion et al. |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0220980 A1 | 11/2004 | Forster |
| 2004/0230753 A1 | 11/2004 | Amiri et al. |
| 2004/0267815 A1 | 12/2004 | De Mes |
| 2004/0268068 A1 | 12/2004 | Curran et al. |
| 2005/0033756 A1 | 2/2005 | Kottomtharayil et al. |
| 2005/0039069 A1 | 2/2005 | Prahlad |
| 2005/0060643 A1 | 3/2005 | Glass et al. |
| 2005/0066118 A1 | 3/2005 | Perry |
| 2005/0066225 A1 | 3/2005 | Rowan |
| 2005/0076087 A1 | 4/2005 | Budd et al. |
| 2005/0097070 A1 | 5/2005 | Enis |
| 2005/0108292 A1 | 5/2005 | Burton |
| 2005/0117558 A1 | 6/2005 | Angermann et al. |
| 2005/0144202 A1 | 6/2005 | Chen |
| 2005/0193245 A1 | 9/2005 | Hayden et al. |
| 2005/0204108 A1 | 9/2005 | Ofek et al. |
| 2005/0216659 A1 | 9/2005 | Ogawa et al. |
| 2005/0216788 A1 | 9/2005 | Mani-Meitav et al. |
| 2005/0243609 A1 | 11/2005 | Yang et al. |
| 2005/0246393 A1 | 11/2005 | Coates et al. |
| 2005/0246397 A1 | 11/2005 | Edwards et al. |
| 2005/0246510 A1 | 11/2005 | Retnamma et al. |
| 2005/0251786 A1 | 11/2005 | Citron |

(56) References Cited

U.S. PATENT DOCUMENTS

| | | |
|---|---|---|
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0005048 A1 | 1/2006 | Osaki |
| 2006/0010227 A1 | 1/2006 | Atluri |
| 2006/0020660 A1 | 1/2006 | Prasad et al. |
| 2006/0036619 A1 | 2/2006 | Fuerst |
| 2006/0064456 A1 | 3/2006 | Kalthoff et al. |
| 2006/0070061 A1 | 3/2006 | Cox |
| 2006/0080370 A1 | 4/2006 | Torii et al. |
| 2006/0095527 A1 | 5/2006 | Malik |
| 2006/0101096 A1 | 5/2006 | Fuerst |
| 2006/0110286 A1 | 5/2006 | Boukas |
| 2006/0115802 A1 | 6/2006 | Reynolds |
| 2006/0116999 A1 | 6/2006 | Dettinger |
| 2006/0129537 A1 | 6/2006 | Torii |
| 2006/0136685 A1 | 6/2006 | Griv |
| 2006/0149604 A1 | 7/2006 | Miller |
| 2006/0149724 A1 | 7/2006 | Ritter |
| 2006/0167900 A1 | 7/2006 | Pingte et al. |
| 2006/0168318 A1 | 7/2006 | Twiss |
| 2006/0177114 A1 | 8/2006 | Tongdee et al. |
| 2006/0179261 A1 | 8/2006 | Rajan |
| 2006/0179405 A1 | 8/2006 | Chao et al. |
| 2006/0195678 A1 | 8/2006 | Jalobeanu |
| 2006/0195838 A1 | 8/2006 | Epstein |
| 2006/0224846 A1 | 10/2006 | Amarendran |
| 2006/0224852 A1 | 10/2006 | Kottomtharayil et al. |
| 2006/0230244 A1 | 10/2006 | Amarendran et al. |
| 2006/0265396 A1 | 11/2006 | Raman et al. |
| 2006/0271935 A1 | 11/2006 | Cox et al. |
| 2006/0282900 A1 | 12/2006 | Johnson et al. |
| 2007/0006018 A1 | 1/2007 | Thompson |
| 2007/0014347 A1 | 1/2007 | Prechtl et al. |
| 2007/0022122 A1 | 1/2007 | Bahar et al. |
| 2007/0022145 A1 | 1/2007 | Kavuri |
| 2007/0028229 A1 | 2/2007 | Knatcher |
| 2007/0043715 A1 | 2/2007 | Kaushik |
| 2007/0043757 A1 | 2/2007 | Benton et al. |
| 2007/0061298 A1 | 3/2007 | Wilson et al. |
| 2007/0067263 A1 | 3/2007 | Syed |
| 2007/0067595 A1 | 3/2007 | Ghose |
| 2007/0073814 A1 | 3/2007 | Kamat et al. |
| 2007/0128899 A1 | 6/2007 | Mayer |
| 2007/0136541 A1 | 6/2007 | Herz et al. |
| 2007/0143497 A1 | 6/2007 | Kottomtharayil et al. |
| 2007/0156783 A1 | 7/2007 | Zbogar-Smith et al. |
| 2007/0156966 A1 | 7/2007 | Sundarrajan et al. |
| 2007/0162462 A1 | 7/2007 | Zhang et al. |
| 2007/0166674 A1 | 7/2007 | Kochunni |
| 2007/0174246 A1 | 7/2007 | Sigurdsson et al. |
| 2007/0179990 A1 | 8/2007 | Zimran et al. |
| 2007/0179995 A1 | 8/2007 | Prahlad et al. |
| 2007/0183493 A1 | 8/2007 | Kimpe |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0208788 A1 | 9/2007 | Chakravarty et al. |
| 2007/0220308 A1 | 9/2007 | Yeung et al. |
| 2007/0226320 A1 | 9/2007 | Hager et al. |
| 2007/0226535 A1 | 9/2007 | Gokhale |
| 2007/0250670 A1 | 10/2007 | Fineberg et al. |
| 2007/0250810 A1 | 10/2007 | Tittizer |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0022003 A1 | 1/2008 | Alve |
| 2008/0028149 A1 | 1/2008 | Pardikar et al. |
| 2008/0033903 A1 | 2/2008 | Carol et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0133561 A1 | 6/2008 | Dubnicki et al. |
| 2008/0155205 A1 | 6/2008 | Gokhale et al. |
| 2008/0159331 A1 | 7/2008 | Mace et al. |
| 2008/0177994 A1 | 7/2008 | Mayer |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0244205 A1 | 10/2008 | Amano |
| 2008/0250204 A1 | 10/2008 | Kavuri et al. |
| 2008/0256431 A1 | 10/2008 | Hornberger |
| 2008/0263565 A1 | 10/2008 | Luther et al. |
| 2008/0281908 A1 | 11/2008 | McCanne et al. |
| 2008/0282048 A1 | 11/2008 | Miura |
| 2008/0294660 A1 | 11/2008 | Patterson et al. |
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0119322 A1 | 5/2009 | Mills et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0150168 A1 | 6/2009 | Schmidt |
| 2009/0171883 A1 | 7/2009 | Kochunni |
| 2009/0171888 A1 | 7/2009 | Anglin |
| 2009/0172139 A1 | 7/2009 | Wong et al. |
| 2009/0183162 A1 | 7/2009 | Kindel et al. |
| 2009/0187908 A1 | 7/2009 | He et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0228531 A1 | 9/2009 | Baumann |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0307448 A1 | 12/2009 | Gokhale et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad |
| 2010/0011178 A1 | 1/2010 | Feathergill |
| 2010/0036772 A1 | 2/2010 | Arceneaux |
| 2010/0036887 A1 | 2/2010 | Anglin et al. |
| 2010/0042790 A1 | 2/2010 | Mondal et al. |
| 2010/0042804 A1 | 2/2010 | Ignatius et al. |
| 2010/0070466 A1 | 3/2010 | Prahlad |
| 2010/0070474 A1 | 3/2010 | Kamleshkumar |
| 2010/0070478 A1 | 3/2010 | Anglin |
| 2010/0070544 A1 | 3/2010 | Gopalan et al. |
| 2010/0070725 A1 | 3/2010 | Prahlad et al. |
| 2010/0076932 A1* | 3/2010 | Lad ............... G06F 11/1469 707/639 |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0100529 A1 | 4/2010 | Erofeev |
| 2010/0114833 A1 | 5/2010 | Mu |
| 2010/0114837 A1 | 5/2010 | Prahlad |
| 2010/0125477 A1 | 5/2010 | Mousseau et al. |
| 2010/0161773 A1 | 6/2010 | Prahlad et al. |
| 2010/0169287 A1 | 7/2010 | Klose |
| 2010/0172301 A1 | 7/2010 | Watfa et al. |
| 2010/0174752 A1 | 7/2010 | Kimmel et al. |
| 2010/0180075 A1 | 7/2010 | McCloskey et al. |
| 2010/0180332 A1 | 7/2010 | Ben-Yochanan et al. |

(56) References Cited

U.S. PATENT DOCUMENTS

| | | |
|---|---|---|
| 2010/0205582 A1 | 8/2010 | Liu |
| 2010/0250549 A1 | 9/2010 | Muller |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0262585 A1 | 10/2010 | Rosikiewicz |
| 2010/0262911 A1 | 10/2010 | Kaplan et al. |
| 2010/0299490 A1* | 11/2010 | Attarde .................. G06F 3/064 711/162 |
| 2010/0306283 A1 | 12/2010 | Johnson et al. |
| 2010/0306643 A1 | 12/2010 | Chabot et al. |
| 2010/0312752 A1 | 12/2010 | Zeis et al. |
| 2010/0318759 A1 | 12/2010 | Hamilton et al. |
| 2010/0332401 A1 | 12/2010 | Prahlad et al. |
| 2010/0332454 A1 | 12/2010 | Prahlad et al. |
| 2010/0332479 A1 | 12/2010 | Prahlad et al. |
| 2011/0016091 A1 | 1/2011 | Prahlad et al. |
| 2011/0060940 A1 | 3/2011 | Taylor et al. |
| 2011/0069179 A1 | 3/2011 | Bathiche et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0161299 A1 | 6/2011 | Prahlad et al. |
| 2011/0161723 A1 | 6/2011 | Taleck et al. |
| 2011/0184993 A1* | 7/2011 | Chawla ............... G06F 9/45533 707/802 |
| 2011/0231362 A1 | 9/2011 | Attarde et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0302141 A1 | 12/2011 | Nadathur et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0011515 A1 | 1/2012 | Jolfaei et al. |
| 2012/0016839 A1 | 1/2012 | Yueh |
| 2012/0016845 A1 | 1/2012 | Bates |
| 2012/0066633 A1 | 3/2012 | Saito et al. |
| 2012/0078881 A1 | 3/2012 | Crump et al. |
| 2012/0084524 A1 | 4/2012 | Gokhale et al. |
| 2012/0084782 A1 | 4/2012 | Chou et al. |
| 2012/0089574 A1 | 4/2012 | Doerner |
| 2012/0094674 A1 | 4/2012 | Wu |
| 2012/0150818 A1 | 6/2012 | Vijayan Retnamma et al. |
| 2012/0150826 A1 | 6/2012 | Vijayan Retnamma et al. |
| 2012/0166403 A1 | 6/2012 | Kim et al. |
| 2012/0185437 A1 | 7/2012 | Pavlov et al. |
| 2012/0203742 A1 | 8/2012 | Goodman et al. |
| 2012/0233417 A1 | 9/2012 | Kalach |
| 2012/0254116 A1 | 10/2012 | Thereka et al. |
| 2012/0254824 A1 | 10/2012 | Bansod |
| 2012/0263191 A1 | 10/2012 | Baron |
| 2012/0272205 A1 | 10/2012 | Fox et al. |
| 2012/0275598 A1 | 11/2012 | Vimpari et al. |
| 2012/0303622 A1 | 11/2012 | Dean et al. |
| 2012/0317085 A1 | 12/2012 | Green et al. |
| 2013/0006625 A1 | 1/2013 | Gunatilake et al. |
| 2013/0007710 A1 | 1/2013 | Vedula |
| 2013/0013883 A1 | 1/2013 | Kottomtharayil |
| 2013/0024429 A1 | 1/2013 | Raas |
| 2013/0024568 A1 | 1/2013 | Popczynski et al. |
| 2013/0046817 A1 | 2/2013 | Isbister |
| 2013/0104027 A1 | 4/2013 | Bennett et al. |
| 2013/0110854 A1 | 5/2013 | Kimber et al. |
| 2013/0111326 A1 | 5/2013 | Lockhart et al. |
| 2013/0136253 A1 | 5/2013 | Liberman Ben-Ami et al. |
| 2013/0145376 A1 | 6/2013 | Gokhale et al. |
| 2013/0179405 A1 | 7/2013 | Bunte et al. |
| 2013/0219458 A1 | 8/2013 | Ramanathan et al. |
| 2013/0232184 A1 | 9/2013 | Grube et al. |
| 2013/0238562 A1 | 9/2013 | Kumarasamy |
| 2013/0238969 A1 | 9/2013 | Smith et al. |
| 2013/0262387 A1 | 10/2013 | Varadharajan |
| 2013/0262396 A1 | 10/2013 | Kripalani et al. |
| 2013/0262410 A1 | 10/2013 | Liu et al. |
| 2013/0262615 A1 | 10/2013 | Ankireddvoalle et al. |
| 2013/0262706 A1 | 10/2013 | Stahlberg et al. |
| 2013/0326159 A1 | 12/2013 | Vijayan et al. |
| 2013/0332412 A1 | 12/2013 | Amarendran |
| 2013/0339298 A1 | 12/2013 | Muller et al. |
| 2013/0339310 A1 | 12/2013 | Muller et al. |
| 2014/0007109 A1 | 1/2014 | De Meno et al. |
| 2014/0025641 A1 | 1/2014 | Kumarasamy et al. |
| 2014/0026000 A1 | 1/2014 | Ma et al. |
| 2014/0032495 A1* | 1/2014 | Erofeev ............. G06F 11/1471 707/634 |
| 2014/0032940 A1 | 1/2014 | Sartirana et al. |
| 2014/0040210 A1 | 2/2014 | Avery et al. |
| 2014/0040580 A1 | 2/2014 | Kripalani |
| 2014/0046900 A1* | 2/2014 | Kumarasamy ...... G06F 11/1489 707/620 |
| 2014/0046904 A1 | 2/2014 | Kumarasamy |
| 2014/0068224 A1 | 3/2014 | Fan et al. |
| 2014/0086127 A1 | 3/2014 | Kim et al. |
| 2014/0108351 A1 | 4/2014 | Nallathambi |
| 2014/0108355 A1 | 4/2014 | Prahlad |
| 2014/0108470 A1 | 4/2014 | Lad |
| 2014/0150023 A1 | 5/2014 | Gudorf et al. |
| 2014/0172793 A1 | 6/2014 | Stritzel |
| 2014/0180664 A1 | 6/2014 | Kochunni et al. |
| 2014/0181032 A1 | 6/2014 | Kumarasamy et al. |
| 2014/0181037 A1 | 6/2014 | Pawar et al. |
| 2014/0181045 A1 | 6/2014 | Pawar et al. |
| 2014/0181085 A1 | 6/2014 | Gokhale et al. |
| 2014/0181438 A1 | 6/2014 | Varadharajan |
| 2014/0181443 A1 | 6/2014 | Kottomtharayil et al. |
| 2014/0188804 A1 | 7/2014 | Vijayan |
| 2014/0188805 A1 | 7/2014 | Vijayan |
| 2014/0188812 A1 | 7/2014 | Vijayan |
| 2014/0189432 A1 | 7/2014 | Gokhale et al. |
| 2014/0201140 A1 | 7/2014 | Vibhor et al. |
| 2014/0201142 A1 | 7/2014 | Varadharajan et al. |
| 2014/0201150 A1 | 7/2014 | Kumarasamy |
| 2014/0201151 A1 | 7/2014 | Kumarasamy et al. |
| 2014/0201154 A1 | 7/2014 | Kumarasamy et al. |
| 2014/0201155 A1 | 7/2014 | Kumarasamy et al. |
| 2014/0201161 A1 | 7/2014 | Kumarasamv et al. |
| 2014/0201162 A1 | 7/2014 | Kumarasamy |
| 2014/0201170 A1 | 7/2014 | Vijayan et al. |
| 2014/0201171 A1 | 7/2014 | Vijayan |
| 2014/0250076 A1 | 9/2014 | Lad |
| 2014/0258236 A1 | 9/2014 | Vijayan |
| 2014/0279922 A1 | 9/2014 | Kottomtharayil et al. |
| 2014/0281214 A1 | 9/2014 | Rehm et al. |
| 2014/0289189 A1 | 9/2014 | Chan |
| 2014/0289196 A1 | 9/2014 | Goel |
| 2014/0365443 A1 | 12/2014 | Goel |
| 2015/0012698 A1 | 1/2015 | Bolla et al. |
| 2015/0058382 A1 | 2/2015 | St. Laurent et al. |
| 2015/0081948 A1 | 3/2015 | Thereska et al. |
| 2015/0154220 A1 | 6/2015 | Ngo et al. |
| 2015/0193229 A1 | 7/2015 | Bansod et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Kottomtharayil et al. |
| 2015/0227355 A1 | 8/2015 | Tripoli |
| 2015/0234879 A1 | 8/2015 | Baldwin et al. |
| 2015/0244775 A1 | 8/2015 | Vibhor |
| 2015/0256617 A1 | 9/2015 | Klose et al. |
| 2015/0261776 A1 | 9/2015 | Attarde et al. |
| 2015/0261792 A1 | 9/2015 | Attarde et al. |
| 2015/0278024 A1 | 10/2015 | Barman et al. |
| 2015/0286434 A1 | 10/2015 | Dain et al. |
| 2015/0301903 A1 | 10/2015 | Mutha et al. |
| 2015/0324226 A1 | 11/2015 | Gokhale et al. |
| 2015/0324233 A1 | 11/2015 | Gokhale et al. |
| 2015/0331899 A1 | 11/2015 | Gokhale et al. |
| 2015/0347238 A1 | 12/2015 | Kumarasamy et al. |
| 2016/0042007 A1 | 2/2016 | Vijayan et al. |
| 2016/0042090 A1 | 2/2016 | Mitkar et al. |
| 2016/0062846 A1 | 3/2016 | Nallathambi et al. |

(56) References Cited

U.S. PATENT DOCUMENTS

| | | | |
|---|---|---|---|
| 2016/0065671 A1 | 3/2016 | Nallathambi et al. | |
| 2016/0110266 A1 | 4/2016 | Nara et al. | |
| 2016/0132400 A1 | 5/2016 | Pawar et al. | |
| 2016/0139836 A1 | 5/2016 | Nallathambi et al. | |
| 2016/0142483 A1 | 5/2016 | Nallathambi et al. | |
| 2016/0154707 A1 | 6/2016 | Kumarasamy et al. | |
| 2016/0188416 A1 | 6/2016 | Muller et al. | |
| 2016/0196070 A1 | 7/2016 | Vijayan et al. | |
| 2016/0266828 A1 | 9/2016 | Vijayan et al. | |
| 2016/0266980 A1 | 9/2016 | Muller et al. | |
| 2016/0267159 A1 | 9/2016 | Muller et al. | |
| 2016/0306708 A1 | 10/2016 | Prahlad et al. | |
| 2016/0350391 A1 | 12/2016 | Vijayan | |
| 2017/0024152 A1* | 1/2017 | Bhagi | G06F 11/1448 |
| 2017/0024286 A1 | 1/2017 | Vijayan | |
| 2017/0134492 A1 | 5/2017 | Klose et al. | |
| 2017/0160970 A1 | 6/2017 | Gokhale et al. | |
| 2017/0160971 A1 | 6/2017 | Gokhale et al. | |
| 2017/0168903 A1 | 6/2017 | Dornemann | |
| 2017/0185488 A1 | 6/2017 | Kumarasamy et al. | |
| 2017/0192860 A1 | 7/2017 | Vijayan et al. | |
| 2017/0192861 A1 | 7/2017 | Vijayan et al. | |
| 2017/0192866 A1 | 7/2017 | Vijayan et al. | |
| 2017/0192867 A1 | 7/2017 | Vijayan et al. | |
| 2017/0192868 A1 | 7/2017 | Vijayan et al. | |
| 2017/0193003 A1 | 7/2017 | Vijayan et al. | |
| 2017/0199924 A1 | 7/2017 | Gokhale et al. | |
| 2017/0206018 A1 | 7/2017 | Nara et al. | |
| 2017/0206112 A1 | 7/2017 | Gokhale et al. | |
| 2017/0235507 A1 | 8/2017 | Sinha et al. | |
| 2017/0235647 A1 | 8/2017 | Kilaru et al. | |
| 2017/0242871 A1 | 8/2017 | Kilaru et al. | |
| 2017/0315872 A1 | 11/2017 | Prabhu et al. | |
| 2018/0011767 A1 | 1/2018 | Kochunni et al. | |
| 2018/0013825 A1 | 1/2018 | Klose et al. | |
| 2018/0089031 A1 | 3/2018 | Mitkar et al. | |
| 2018/0225177 A1 | 8/2018 | Bhagi | |
| 2018/0232164 A1 | 8/2018 | Jibbe et al. | |
| 2018/0253361 A1 | 9/2018 | Dhatrak | |
| 2018/0275881 A1 | 9/2018 | Ashraf | |
| 2018/0285201 A1 | 10/2018 | Bangalore | |
| 2018/0285209 A1 | 10/2018 | Liu | |
| 2018/0285353 A1 | 10/2018 | Rao | |
| 2018/0373597 A1 | 12/2018 | Rana | |
| 2019/0065509 A1 | 2/2019 | Liu et al. | |
| 2019/0073254 A1 | 3/2019 | Vibhor | |
| 2019/0087108 A1 | 3/2019 | Bhagi et al. | |
| 2019/0227832 A1 | 7/2019 | Dornemann et al. | |
| 2019/0243911 A1 | 8/2019 | Kobozev et al. | |
| 2019/0278667 A1 | 9/2019 | Mitkar et al. | |
| 2019/0286839 A1 | 9/2019 | Mutha et al. | |
| 2020/0293404 A1 | 9/2020 | Mitkar | |
| 2020/0334112 A1 | 10/2020 | Dhatrak | |
| 2021/0011754 A1 | 1/2021 | Dornemann et al. | |
| 2021/0019059 A1 | 1/2021 | Bhagi et al. | |

FOREIGN PATENT DOCUMENTS

| | | |
|---|---|---|
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0910019 A2 | 4/1999 |
| EP | 0981090 | 2/2000 |
| EP | 0986011 A2 | 3/2000 |
| EP | 1035690 A2 | 9/2000 |
| GB | 2216368 A | 10/1989 |
| JP | 07-046271 A | 2/1995 |
| JP | 07-073080 A | 3/1995 |
| JP | 08-044598 A | 2/1996 |
| JP | 2000-035969 A | 2/2002 |
| JP | 2003-531435 A | 10/2003 |
| WO | WO 95/13580 | 5/1995 |
| WO | WO 99/009480 A1 | 2/1999 |
| WO | WO 99/12098 | 3/1999 |
| WO | WO 00/58865 A1 | 10/2000 |
| WO | WO 01/06368 A1 | 1/2001 |
| WO | WO 01/16693 A2 | 3/2001 |
| WO | WO 01/80005 A2 | 10/2001 |
| WO | WO 2002/005466 A2 | 1/2002 |
| WO | WO 2006/052872 | 5/2006 |
| WO | WO 2010/013292 A1 | 2/2010 |
| WO | WO 2010/057199 A2 | 5/2010 |
| WO | WO 2010140264 A1 | 12/2010 |
| WO | WO 2012/044366 A1 | 4/2012 |
| WO | WO 2012/044367 A1 | 4/2012 |
| WO | WO 2013/188550 A1 | 12/2013 |

OTHER PUBLICATIONS

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Bhagwat, Extreme Binning: Scalable, Parallel Deduplication for Chunk-based File Backup. IEEE 2009, 9 pages.

Cohen, Edith, et al.,. "The Age Penalty and Its Effect on Cache Performance." In USITS, pp. 73-84. 2001.

Cohen, Edith, et al.,"Aging through cascaded caches: Performance issues in the distribution of web content." In ACM SIGCOMM Computer Communication Review, vol. 31, No. 4, pp. 41-53. ACM, 2001.

Cohen, Edith, et al., "Refreshment policies for web content caches." Computer Networks 38.6 (2002): 795-808.

CommVault Systems, Inc. "Continuous Data Replicator 7.0," Product Data Sheet, 2007.

CommVault Systems, Inc., "Deduplication—How to," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.

Diligent Technologies HyperFactor, http://www.dilligent.com/products:protecTIER-1:HyperFactor-1, Internet accessed on Dec. 5, 2008, 2 pages.

Dubnicki, et al. "HYDRAstor: A Scalable Secondary Storage." FAST. vol. 9.2009, 74 pages.

Gait, J., "The Optical File Cabinet: A Random-Access File System for Write-Once Optical Disks," IEEE Computer, vol. 21, No. 6, pp. 11-22 (Jun. 1988).

Gray (#2 of 2, pp. 604-609), Jim; Reuter Andreas, Transaction Processing Concepts and Techniques, Morgan Kaufmann Publisher, USA 1994, pp. 604-609.

Jander, M., "Launching Storage-Area Net," Data Communications, US, McGraw Hill, NY, vol. 27, No. 4 (Mar. 21, 1998), pp. 64-72.

Kashyap, et al., "Professional Services Automation: A knowledge Management approach using LSI and Domain specific Ontologies", FLAIRS-01 Proceedings, 2001, pp. 300-302.

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology-Deduplication," http://www.lortu.com/en/deduplication.asp, Internet accessed on Dec. 5, 2008, 3 pages.

Overland Storage, "Data Deduplication," http://www.overlandstorage.com/topics/data_deduplication.html, Internet accessed on Dec. 5, 2008, 2 pages.

Quantum Corporation, "Data De-Duplication Background: A Technical White Paper," May 2008, 13 pages.

Wei, et al. "MAD2: A scalable high-throughput exact deduplication approach for network backup services." Mass Storage Systems and Technologies (MSST), 2010 IEEE 26th Symposium on. IEEE, 2010, 14 pages.

(56) References Cited

OTHER PUBLICATIONS

Wolman et al., On the scale and performance of cooperative Web proxy caching, 1999.
Wu, et al., Load Balancing and Hot Spot Relief for Hash Routing among a Collection of Proxy Caches, 1999.
Final Office Action for Japanese Application No. 2003531581, dated Mar. 24, 2009, 6 pages.
International Search Report and Written Opinion, International Application No. PCT/US2009/58137, dated Dec. 23, 2009, 14 pages.
International Search Report and Written Opinion, International Application No. PCT/US2011/030804, dated Jun. 9, 2011.
International Search Report and Written Opinion, International Application No. PCT/US2011/030814, dated Jun. 9, 2011.
International Search Report and Written Opinion, International Application No. PCT/US2013/045443 dated Nov. 14, 2013, 16 pages.
International Preliminary Report on Patentability, International Application No. PCT/US2013/045443 dated Dec. 16, 2014 11 pages.
Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.
Complaint filed on Jun. 18, 2021, *Commvault Systems, Inc.* v. *Rubrik Inc.*, Civil Action No. 6-21-cv-00634, U.S. District Court, Western District of Texas, in 44 pages.
Mitkar, et al., U.S. Appl. No. 14/453,045 Published as 2016/0041880 A1 Now U.S. Pat. No. 9,852,026, filed Aug. 6, 2014, Efficient Application Recovery in an Information Management System Based on a Pseudo-Storage-Device Driver.
Mitkar, et al., U.S. Appl. No. 14/453,507 Published as 2016/0042090 A1, filed Aug. 6, 2014, Preserving the Integrity of a Snapshot on a Storage Device Via Ephemeral Write Operations in an Information Management System.
Mitkar, et al., U.S. Appl. No. 15/015,049 Published as 2016/0154709 A1 Now U.S. No. Pat. 10,360,110, filed Feb. 3, 2016, Point-In-Time Backups of a Production Application Made Accessible Over Fibre Channel and/or ISCSI as Data Sources to a Remote Application by Representing the Backups as Pseudo-Disks Operating Apart From the Production Application and Its Host.
Mitkar, et al., U.S. Appl. No. 15/809,776 Published as 2018/0089031 A1 Now U.S. Pat. No. 10,705,913, filed Nov. 10, 2017, Application Recovery in an Information Management System Based on a Pseudo-Storage-Device Driver.
Mitkar, et al., U.S. Appl. No. 16/886,431 Published as 2020/0293404 A1, filed May 28, 2020, Systems and Methods to Reduce Application Downtime During a Restore Operation Using a Pseudo-storage Device.
"Multi Instancing," retrieved from http://documentation.commvault.com/hds/release_8_0_0/books_online_1/english_us/deploym ent/install/misc/multi_instancing.htm[Feb. 18, 2014 11:57:19 AM] on Feb. 18, 2014, 3 pages.
Abbot, K., et al., "Administration and Autonomy in a Republican-Transparent Distributed DBMS.", VLDB. 1988.
Hennessy et al., "Computer Architecture—A Quantitative Approach", 2nd Edition, 1996, pp. 246-250.
Hsiao, David K., "Federated databases and systems: part i—a tutorial on tehri data sharing." The VLDB Journal 1.1 (1992): 127-179.
Hutchinson et al., "Logical vs. physical file system backup." OSDI. vol. 99. 1999, 12 pages.
Matthews et al., "Data protection and rapid recovery from attack with a virtual private file server and virtual machine appliances." Proceedings of the IASTED International Conference on Communication, Network and Information Security (CNIS 2005). 2005, 14 pages.
Microsoft Press Computer Dictionary Third Edition, "Data Compression," Microsoft Press, 1997, p. 130.
Pitoura et al., "Locating Objects in Mobile Computing", IEEE Transactions on Knowledge and Data Engineering, vol. 13, No. 4, Jul./Aug. 2001, pp. 571-592.
Pollack, et al., "Quota enforcement for high-performance distributed storage systems," 24th IEEE Conference on Mass Storage Systems and Technologies (MSST 2007), Sep. 24-27, 2007, pp. 72-86.
Prigge, "Review: ExaGrid aces disk-to-disk backup," Jan. 3, 2013, InfoWorld, 12 pages.
Quinlan, Sean, "A cached worm file system." Software: Practice and Experience 21.12 (1991): 1289-1299.
Rowe et al., "Indexes for User Access to Large Video Databases", Storage and Retrieval for Image and Video Databases II, IS,& T/SPIE Symp. On Elec. Imaging Sci. & Tech., Feb. 1994, pp. 1-12.
Veeravalli, "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.
Wu et al., "Efficient initialization and crash recovery for log-based file systems over flash memory." Proceedings of the 2006 ACM symposium on Applied computing. ACM, 2006, 5 pages.
Extended European Search Report for Application No. EP 09767119, dated Feb. 11, 2013, 12 pages.
PCT International Search Report for International Application No. PCT/US09/32325, dated Mar. 17, 2009, 11 pages.
Examination Report in European Patent Application No. 09767119.2, dated Feb. 1, 2018, 3 pages.
Case No. No. 6:21-CV-00634-ADA, Answer WDTX-6-21-cv-00634-19, filed Aug. 27, 2021, in 23 pages.
Case No. 6:21-cv-00634-ADA, Order Dismissing with Prejudice WDTX-6-21-cv-00634-22, filed Sep. 1, 2021, in 1 page.

\* cited by examiner

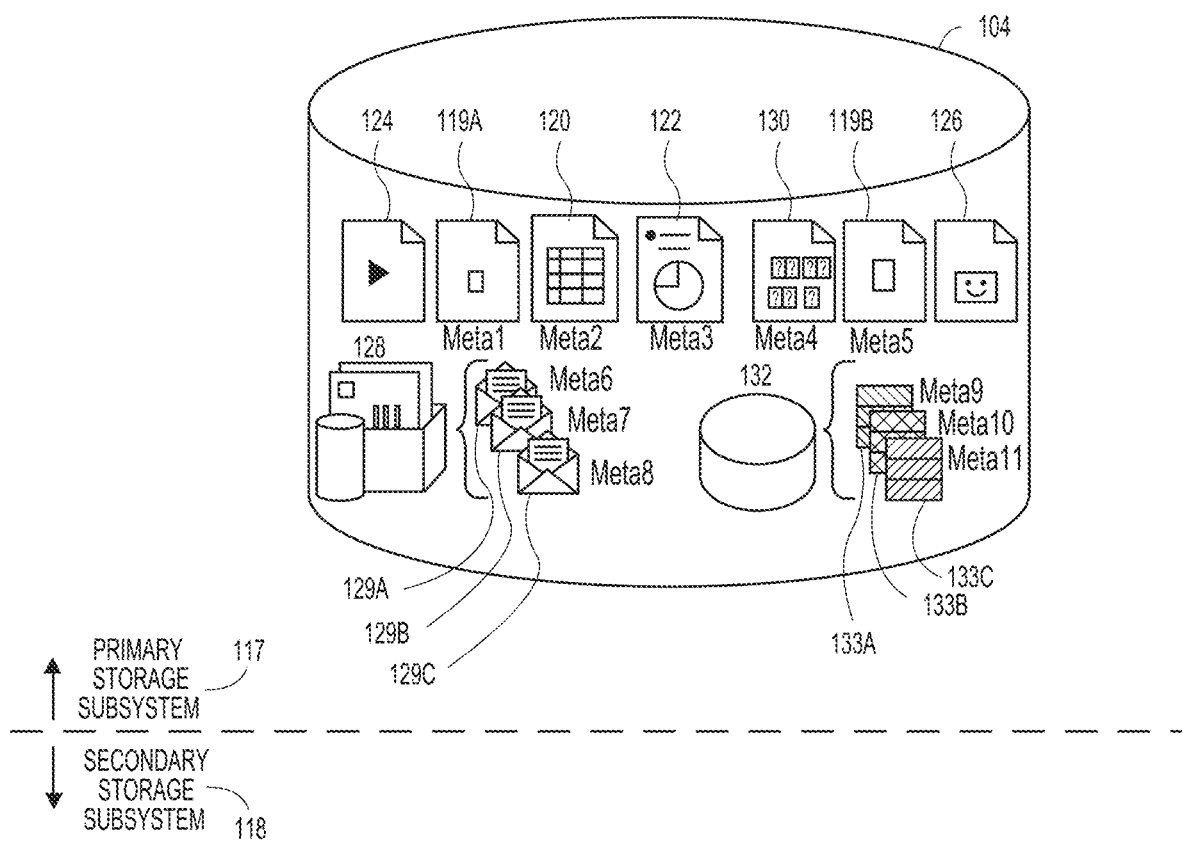
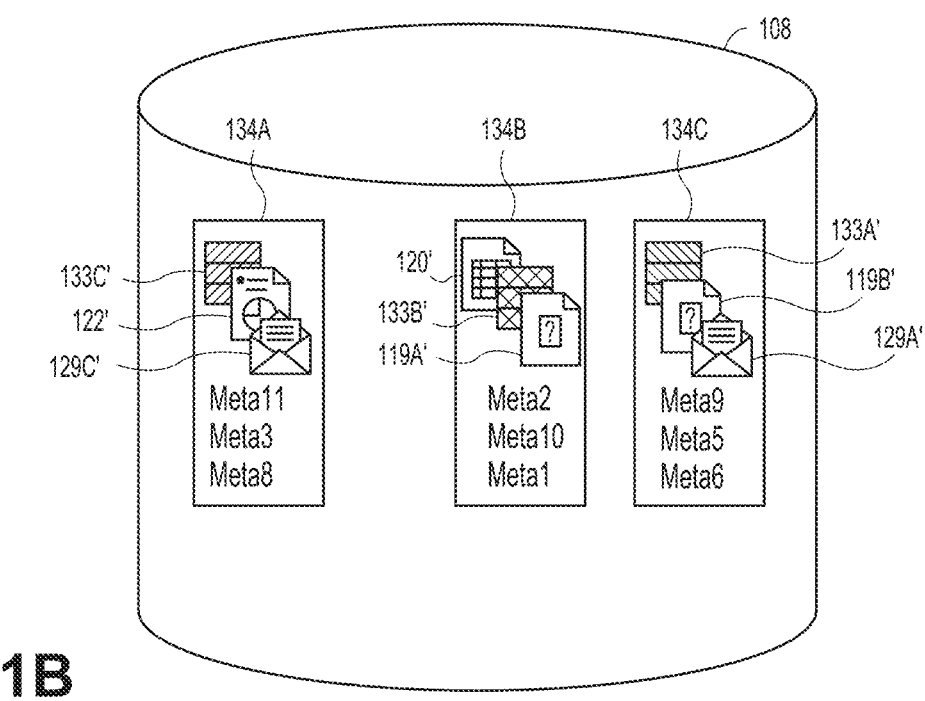
FIG. 1B

400

Start
↓
401 Mount To A First Mount Point (e.g., /dest) Of The Client Computing Device A Destination Volume (e.g., 312) For Receiving Restored Data From Backup
↓
403 Initiate A Full Restore Of Backed Up Data (e.g., Backup Copy 116) From Secondary Storage 108 (e.g., Tape) To The Primary Storage Destination 312
↓
405 Mount To The Same First Mount Point (e.g., /dest) A Pseudo-volume (e.g., Pseudo-disk 265 As Presented By Pseudo-Disk Driver 262) To Be Used By An Application As A Store For Primary Data
↓
407 Execute Instant Application Recovery Based On The Pseudo-Volume, Using Recall Store And Private Store To Service Read And Write Requests To/from The Application
↓
409 Is Full Restore From Secondary Storage (e.g. Tape) Completed?
— NO → (loop back to 407)
— YES ↓
411 (a) Stop The Application; (b) Unmount The Pseudo-volume; And (c) Apply Private Store Writes To Primary Storage Destination 312
↓
413 Re-Start The Application, Based On Using The Updated Primary Storage Destination 312 As The Store For Primary Data
↓
End

FIG. 4

POINT-IN-TIME BACKUPS OF A PRODUCTION APPLICATION MADE ACCESSIBLE OVER FIBRE CHANNEL AND/OR ISCSI AS DATA SOURCES TO A REMOTE APPLICATION BY REPRESENTING THE BACKUPS AS PSEUDO-DISKS OPERATING APART FROM THE PRODUCTION APPLICATION AND ITS HOST

INCORPORATION BY REFERENCE TO ANY PRIORITY APPLICATIONS

The present patent application is a Continuation of U.S. patent application Ser. No. 15/015,049, which is a Continuation-in-Part of U.S. patent application Ser. No. 14/453,045 filed on 6 Aug. 2014, which is entitled "Efficient Application Recovery in an Information Management System Based on A Pseudo-Storage-Device Driver" issued as U.S. Pat. No. 9,852,026. Any and all applications for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the explosive growth of data, companies also continue to seek innovative technology for not just protecting data, but also for managing outages and downtime. Certain data applications have such large associated file systems, e.g., production databases comprising petabytes of data, that an outage in the application may require hours, may be even days, to restore back to the production environment. Thus, although the integrity of production data may be adequately protected from loss by sophisticated backup techniques, the sheer amount of data to be restored may cause unacceptable amounts of downtime.

FIG. 6A illustrates such a scenario, depicting an illustrative timeline of application downtime and recovery in the prior art. The application may be any application that operates in a production environment and which generates and/or accesses very large amounts of production data, e.g., terabytes or petabytes of data. The application may have been deactivated for any number of reasons, e.g., hardware failure, software failure, maintenance, etc. Block 601 illustrates a first set of operations that begin after the application is deactivated. Block 601 may comprise mounting a restore destination to the client computing device that hosts the application, e.g., a database server, and may further comprise executing a full restore operation from a backup copy. Typically, a backup copy may be stored on relatively slower (and less costly) media than the production data, such as tape. Thus, block 601 illustrates a relatively long duration of time required for the terabytes or petabytes of data to be recovered from backup and restored to the relatively fast media used for production, e.g., high-speed disk.

Block 602 illustrates that after the full restore is complete, which may include data integrity checks and audits, the application may be restarted based on the restored backup copy.

During the duration of block 601, the application is in downtime, which, as noted, may be a matter of hours or even days. Accordingly, especially because of the rapidly growing amounts of data to be restored in scenarios such as this one, a need exists for a more speedy and efficient approach.

SUMMARY

The present inventors devised a way to ameliorate this problem, by reducing application downtime in a system that is equipped with an enhanced data agent, a pseudo-storage-device driver, and a backup copy of primary data. Accordingly, the system enables an application to start operating and servicing users soon after and during the course of its backup data being restored, no matter how long the restore may take. This is referred to herein as "instant application recovery" in view of the fact that the application may be put back in service soon after the restore operation begins. Moreover, any primary data generated by the application during "instant application recovery" is not only retained, but is efficiently updated into restored data. As a result, the application not only gains substantial amounts of operational time while backup data is being restored, but also, application data may be efficiently brought up to date after restoration is complete. Thus, the application may return to "normal" with substantially reduced downtime relative to the prior art.

An enhanced data agent and an associated pseudo-storage-device driver (e.g., a pseudo-disk driver), which execute on the same client computing device as the application, enable the application to operate substantially concurrently with a full restore operation of backed up data. According to the illustrative embodiment, the pseudo-storage-device driver presents a pseudo-volume to the file system associated with the application, such that the pseudo-volume may be used as a store for primary data during the period of "instant application recovery." According to one embodiment, this may be accomplished by configuring the client computing device that hosts the driver, the data agent, and the application with a dedicated mount point. The destination volume that is to receive the restored data is first mounted to the mount point and the restore is initiated thereto. Then, the pseudo-volume is mounted to the same mount point, thereby creating a new name space to be used by the application during "instant application recovery."

The pseudo-volume comprises a data structure for staging write operations issued by the application, designated herein the "private store." The pseudo-volume also comprises another data structure for staging read responses to the application, designated herein the "recall store." The private store receives and stores all changed blocks resulting from the execution of the application during "instant application recovery." The recall store fetches blocks from backup data in secondary storage (the same backup data that is concurrently being restored)—unless the sought-after block is already in the private store (from a more recent write) or in the recall store. The recall store may comprise data blocks previously fetched and also may be periodically updated with data blocks that have been restored to the destination volume by the ongoing restore operation. As a result, recalls using the recall store may require fewer hops and are substantially faster.

When the backup data has been fully restored to the destination volume in primary storage, "instant application recovery" may end. The application is stopped, the pseudo-volume is unmounted from the mount point on the client computing device, and an update procedure is initiated. The update procedure ensures that all the changed blocks in the private store are applied to the restored data in the destination volume, so that any blocks that changed during the course of "instant application recovery" may replace any corresponding older blocks. Applying the private store to the destination volume in order to update the application's primary data is a relatively speedy procedure, at least in part because there are far fewer changed blocks in the private store than the number of blocks restored from backup. At this point, the application may be restarted using the updated destination volume as the store for primary data.

According to the illustrative embodiment, total application downtime may be greatly reduced by using the "instant application recovery" approach described herein. Depending on the size of the backup data to be restored and the duration of the restore operation, the total downtime experienced by the application may be relatively short (even negligible to the ordinary user of the application) compared to awaiting the completion of a full restore as required in the prior art.

Sometimes, customers do not wish to install a pseudo-disk driver (e.g., 262) on the same client computing device (e.g., 202) that hosts an application. Since the pseudo-disk driver (e.g., 262) operates in the computing device's kernel, which is part of the computer's operating system, some customers and data center operators view the idea of changing the operating system as too risky for a production environment on which the business depends. In some cases, the application hosts are highly secure machines and/or cannot accommodate the operating system/kernel version recommended for the pseudo-disk driver. In such situations, therefore, the configuration disclosed in FIGS. 2-5 and described in the section entitled "Efficient Application Recovery In An Information Management System Based On A Pseudo-Storage-Device Driver" in the parent patent application (U.S. Ser. No. 14/453,045) can become impractical, or at least relatively less desirable, and therefore another solution is needed.

PRESENT ENHANCEMENT. The present inventors devised an enhancement that dispenses with these concerns and operates apart from the production environment. The enhancement is disclosed at least in part in FIGS. 7-12 herein and in the section entitled "POINT-IN-TIME BACKUPS OF A PRODUCTION APPLICATION MADE ACCESSIBLE OVER FIBRE CHANNEL AND/OR ISCSI AS DATA SOURCES TO A REMOTE APPLICATION BY REPRESENTING THE BACKUPS AS PSEUDO-DISKS OPERATING APART FROM THE PRODUCTION APPLICATION AND ITS HOST." The present enhancement substantially reduces the impact and hence the implicit risk to the computing devices that host applications in the production environment, effectively insulating the production environment from the enhanced components and operations. The illustrative enhanced system is particularly suitable for testbeds such as test, verification, certification, interoperability, or development environments where production systems remain undisturbed while a remote application ("testbed application" or "secondary application" or "recovery application") executes on another computing device ("testbed host" or "secondary host") that is distinct from production machines. The testbed application is said to be remote or secondary in the sense that it is different from the primary production application and executes on a testbed host that is distinct and apart from the primary production application's host. According to the illustrative embodiment, the testbed/secondary host may be in the same data center as the production host or on a private or public cloud, without limitation. The testbed application uses a recovery volume that represents and taps into—but is not actually—a block-level point-in-time backup of primary production data. The testbed environment (including testbed host and testbed application) operates apart from production host(s) and application(s). The testbed application can be used to verify the integrity of a given backup image or for developing enhanced functionality such as additional application features, reports, utilities, etc. using the testbed application rather than the primary (production) application. The testbed application "feels like" a live or primary application, but operates from data on an as-needed basis, which is sufficient for the testbed environment yet (i) without impacting the production environment and (ii) without restoring the entire backup image from secondary storage.

The present enhancement includes an enhanced pseudo-disk driver (e.g., 762) and associated pseudo-disks (e.g., 765) configured on an intermediary computing device (e.g., 706) that also hosts an enhanced media agent (e.g., 744); the enhanced media agent is involved in generating point-in-time backup images of the primary application's data and also communicates with the enhanced pseudo-disk driver to prompt it to generate pseudo-disks. The intermediary computing device, referred to herein as a secondary storage computing device, is distinct and apart from the primary application host as well as from any testbed host(s). The intermediary computing device is configured to optimally support the needs of the enhanced pseudo-disk driver, e.g., using a particular operating system and/or a particular version of the operating system and/or kernel.

Contrary to the solution in the parent patent application in which pseudo-disk driver and instant recovery application co-resided on the same host computing device in the production environment (e.g., 202), the present solution operates outside of and independently from production machines. The present enhancement illustratively uses (i) an intermediary computing device hosting the enhanced pseudo-disk driver and pseudo-disks as well as the enhanced media agent, and (ii) a separate computing device (the "testbed host") hosting the testbed application. The present enhanced solution only minimally impacts the testbed host by installing a disk discovery utility thereon, which occupies a minimal footprint on the testbed host and operates outside the host's kernel or operating system. The disk discovery utility finds storage devices accessible to the testbed host, including pseudo-disks exposed over iSCSI or FC and residing on the intermediary computing device.

According to the illustrative embodiment, the enhanced pseudo-disk driver (e.g., 762) creates any number of pseudo-disks, each one representing an associated point-in-time backup that was previously taken of the primary (production) data and which resides in secondary storage (e.g., on tape 108). When a given point-in-time backup (e.g., 116-1) is chosen (e.g., via a storage manager or storage management system console interface) for a remote testbed application to use as its recovery data source, the enhanced pseudo-disk driver creates a corresponding pseudo-disk (e.g., 765-1) in the intermediary computing device. The pseudo-disk comprises logical sub-components, including (i) a driver sub-component in the kernel that creates data structure(s) in the kernel that presents as a storage disk having a storage volume, and points to the backup image that is stored on a secondary storage device; and (ii) a process sub-component in user space (or "userland" or "userspace") that services input/output ("I/O") requests from/to the testbed application. Notably, the pseudo-disk is configured on the intermediary computing device whereas the testbed application executes on another computing device, namely the testbed host. The intermediary device and the testbed host are communicatively connected by a network, whether an Internet Protocol (IP) network or a Fibre Channel (FC) Storage Area Network (SAN), or possibly another network technology.

The enhanced media agent (e.g., 744) is able to expose any number of pseudo-disks over the intervening IP or SAN network, using iSCSI or FC protocol, respectively. The testbed application scans for available data storage resources (e.g., using the disk discovery utility on the testbed host) and will "see" an exposed pseudo-disk 765 as a local SCSI storage resource. By using iSCSI over an IP network or FC over a SAN network to transport the SCSI protocol, the exposed pseudo-disk 765 is treated as local storage by the testbed application using the SCSI protocol. The application will use an application-specific method to attach to the pseudo-disk (e.g., a file system application may mount the pseudo-disk; a database application may recognize the pseudo-disk; etc.). Once attached to the SCSI storage resource, i.e., to the exposed pseudo-disk, the testbed application treats the pseudo-disk as its recovery data source and begins input/output to/from the pseudo-disk using read and write operations.

Once a given pseudo-disk is attached as the data source for a testbed application, the testbed application can run, yet without executing a full restore of the entire backup image from secondary storage. Instead, the testbed application will execute from/with as-needed data only, because according to the illustrative embodiment the private store and recall store configured in the pseudo-disk are sufficient to service the testbed application's I/O. Write operations are stored to the private store and read operations are serviced from one or more of: the backup in secondary storage and/or the recall store and/or the private store, as appropriate. The result is that the testbed application can use the resources of the pseudo-disk to operate on an ongoing basis without having to fully restore the entire point-in-time backup from secondary storage. For example, if the testbed application is used for testing the integrity of the point-in-time backup, certain test scripts may be executed that exercise certain key backed up data using the recall store and private store as needed, and accessing the pseudo-disk over iSCSI or FC. Thus, a file system testbed application may be brought up on the testbed host, may retrieve certain directory data and file lists via the pseudo-disk, and may pass certain read/write tests, without restoring the underlying files from secondary storage. Likewise, if the testbed application is used for development purposes, the development project may proceed based on data in the recall store and data added to the private store without having to restore the entire point-in-time backup image from secondary storage.

Although the point-in-time backups are generated using traditional techniques, the enhanced solution herein provides a number of novel aspects, including creating any number of pseudo-disks that respectively represent distinct point-in-time backups residing in secondary storage; making each pseudo-disk accessible as a SCSI storage device over an IP or SAN network (using iSCSI or FC, respectively) as a recovery point and source of data for an application running on a remote (testbed) host; insulating the production environment configuration and operations from testbed operations; executing a testbed application without performing a full restore of a point-in-time backup image from secondary storage, while relying instead on the pseudo-disk's private store and recall store resources to service the testbed application's writes and reads as needed; and providing close cooperation between the enhanced pseudo-disk driver and the enhanced media agent, both of which operate on an intermediary computing device apart from production hosts/storage and also apart from the testbed host.

The present enhancement delivers a number of advantages over the earlier pseudo-disk driver disclosed in the parent patent application. For example, the present solution protects the production environment, because it requires no changes to the primary application's host computing device above and beyond traditional backup utilities, such as a data agent; accordingly, no pseudo-disk driver is installed thereon. Further, no kernel and/or operating system changes are required on the testbed host. Moreover, by tracking and exposing a plurality of point-in-time backup images as individual and distinct pseudo-disks, the present solution enables any number of point-in-time backups to be verified on the testbed environment as needed. Furthermore, downtime between different point-in-time backup tests can be kept to a minimum, because the testbed application can be refreshed relatively frequently in order to keep up with successive point-in-time backups, yet without having to engage a full restore operation.

Any number of testbed applications may operate on any number of respective testbed hosts, each testbed application using a pseudo-disk created to serve as its recovery data source regardless of how many point-in-time backup images are stored in secondary storage. More than one pseudo-disk may point to and tap into a given backup image according to another embodiment. The present enhanced architecture disclosed herein provides flexibility and scalability for supporting multiple testbeds from a limited number of backup images. Additionally, the present enhancement, in which the testbed or secondary application operates independently and separately from the production environment without having to fully restore a secondary copy, is compatible with and may operate in the same system as the instant application recovery of the parent application in which a primary application is instantly recovered in the production environment while a full restore occurs in the background. Therefore, some embodiments may encompass one or more instances of both of the solutions disclosed herein without limitation.

BRIEF DESCRIPTION OF THE DRAWINGS

FIG. 1B is a detailed view of a primary storage device, a secondary storage device, and some examples of primary data and secondary copy data.

Figure 3:
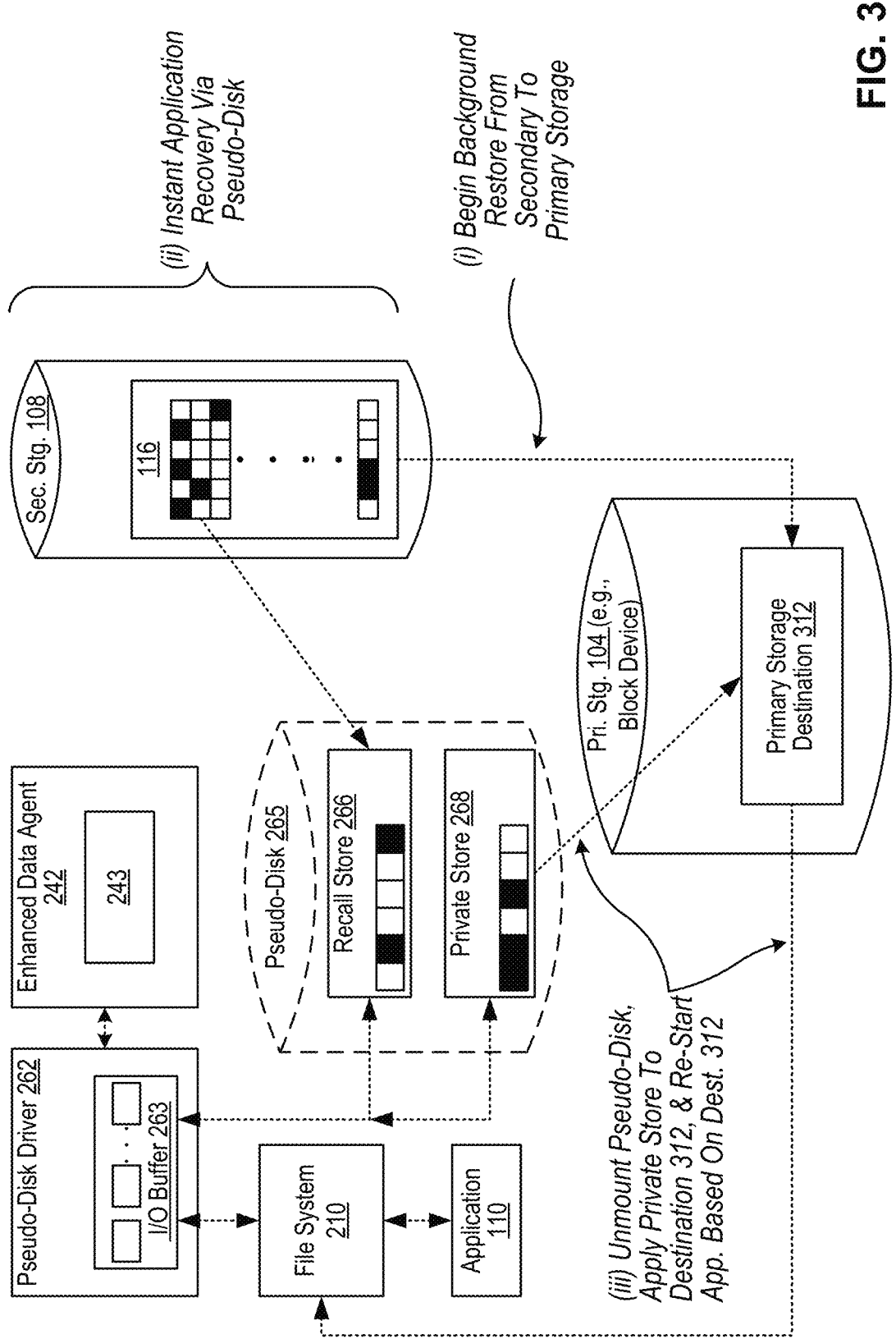

FIG. 3 is a block diagram illustrating some additional elements of system 200.

FIG. 4 depicts some salient operations of a method 400 according to an illustrative embodiment of the present invention.

Figure 5:
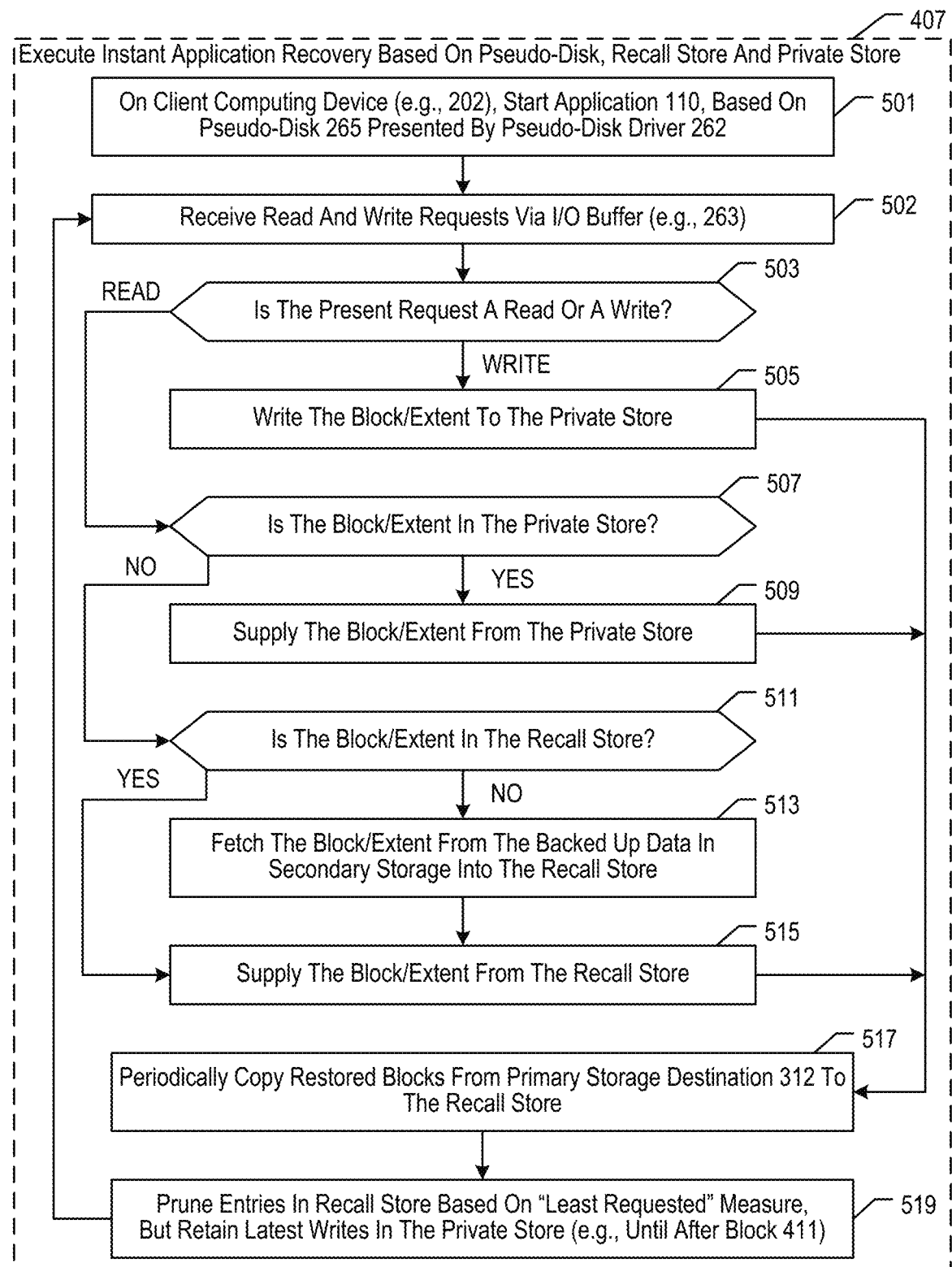

FIG. 5 depicts some salient details and sub-operations of block 407 in method 400.

Figure 6:
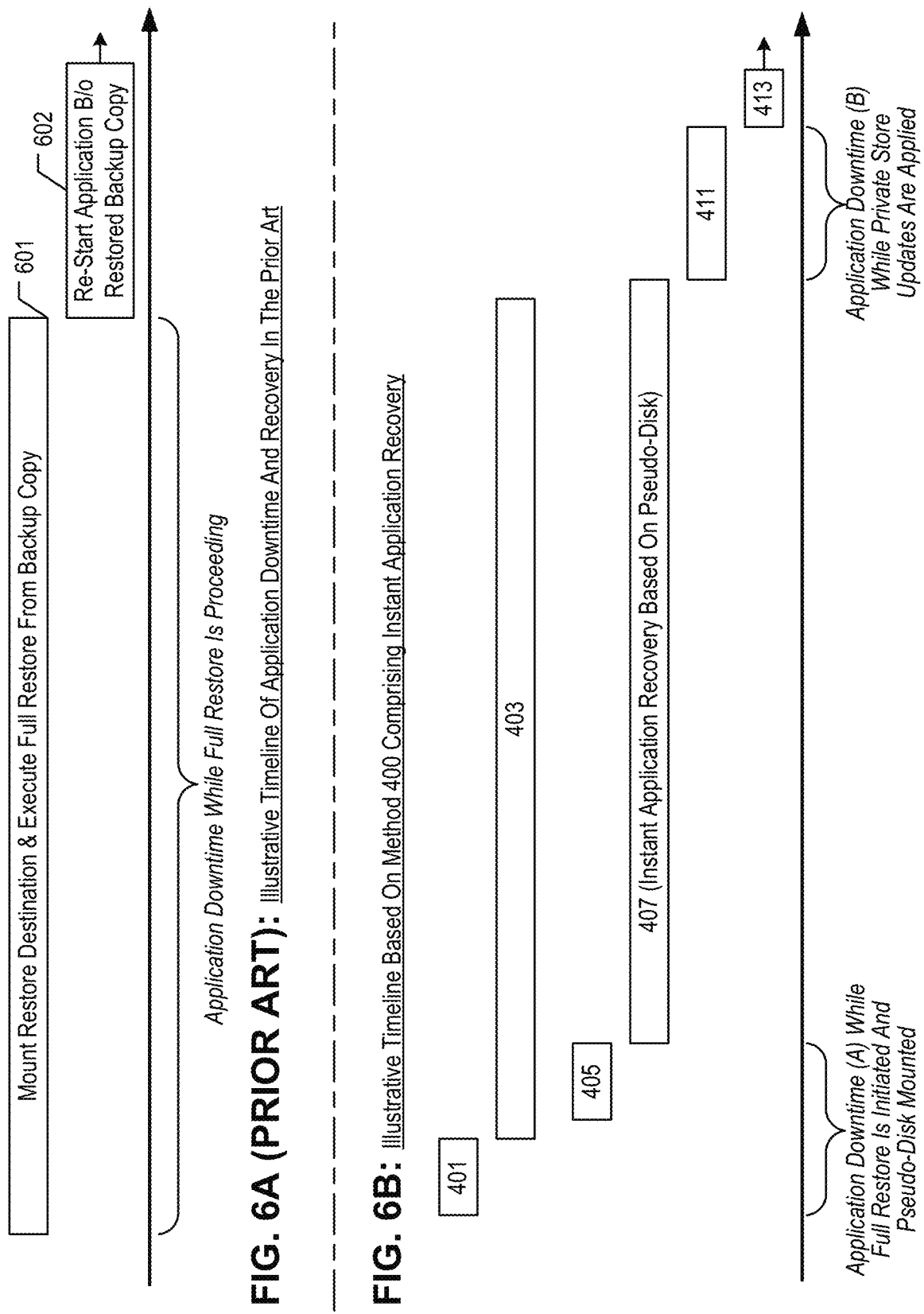

FIG. 6A (Prior Art) depicts an illustrative timeline of application downtime and recovery in the prior art.

FIG. 6B depicts an illustrative timeline based on method 400, which comprises "instant application recovery" according to an illustrative embodiment of the present invention.

Figure 7:
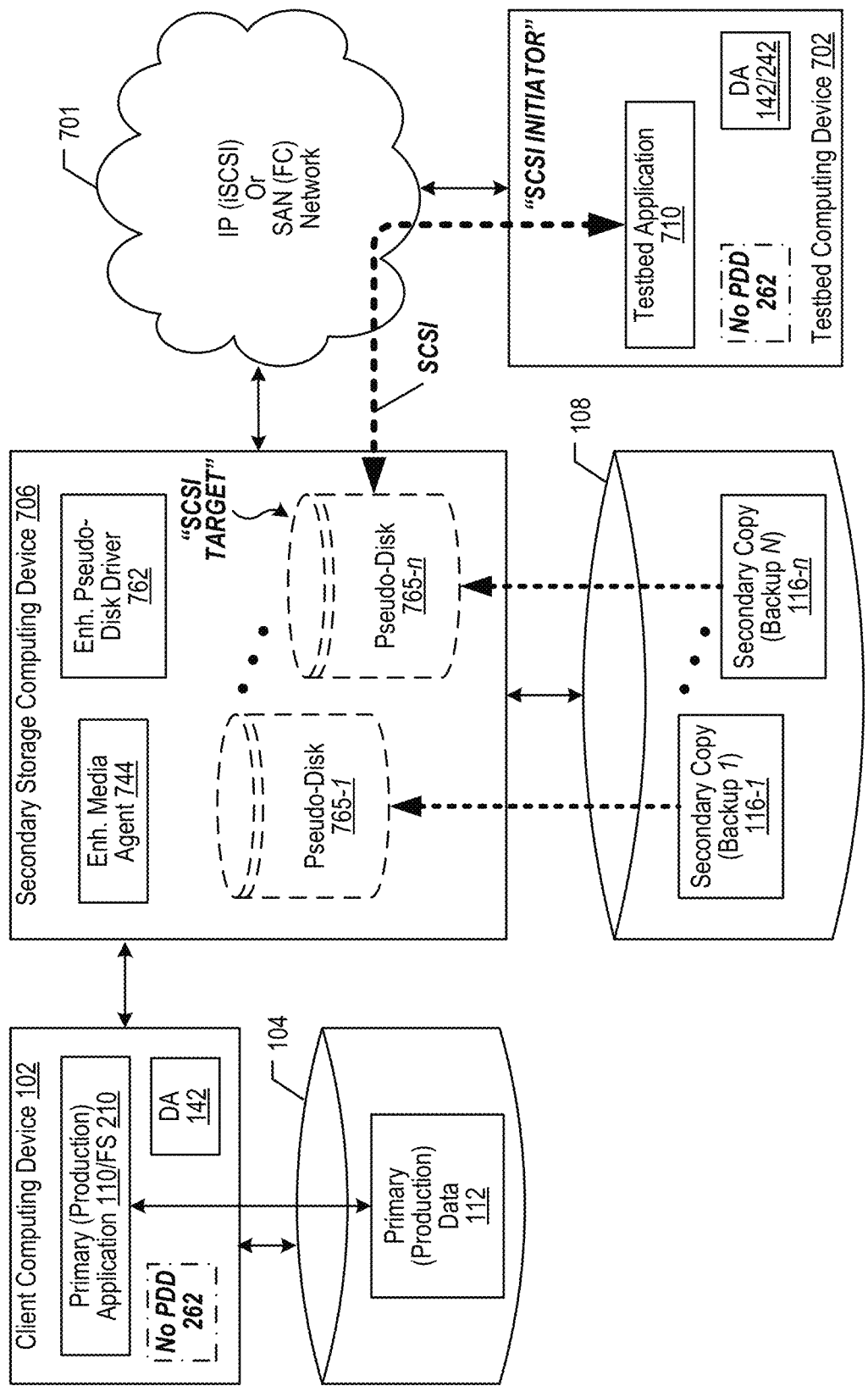

FIG. 7 is a block diagram illustrating some salient portions of a system 700 for making accessible over Fibre Channel and/or iSCSI one or more point-in-time backups of a production application as respective data sources to a remote application, by representing the backups as respective pseudo-disks operating apart from the production application and its host, according to an illustrative embodiment of the present invention.

Figure 8:
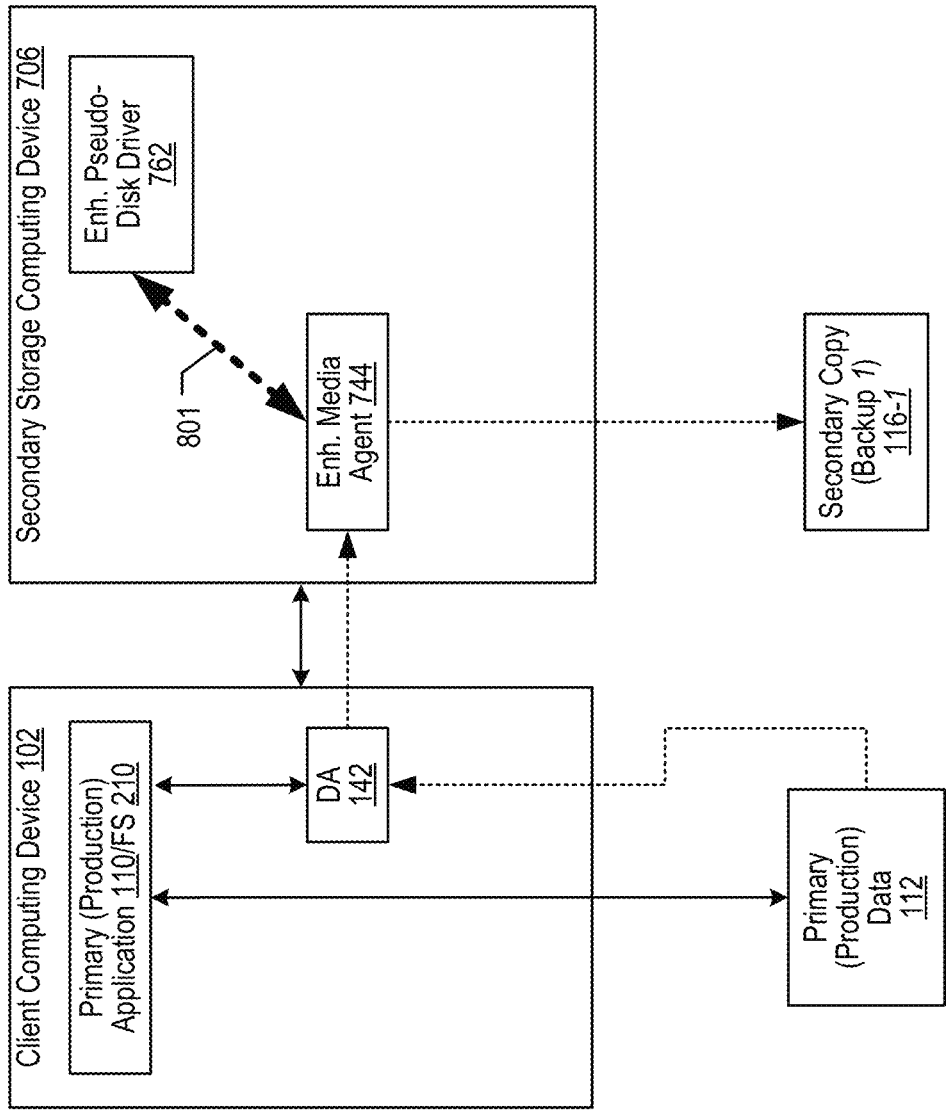

FIG. 8 is a block diagram illustrating some details of system 700, including a logical communication pathway 801 between an enhanced media agent 744 and enhanced pseudo-disk driver 762.

Figure 9:
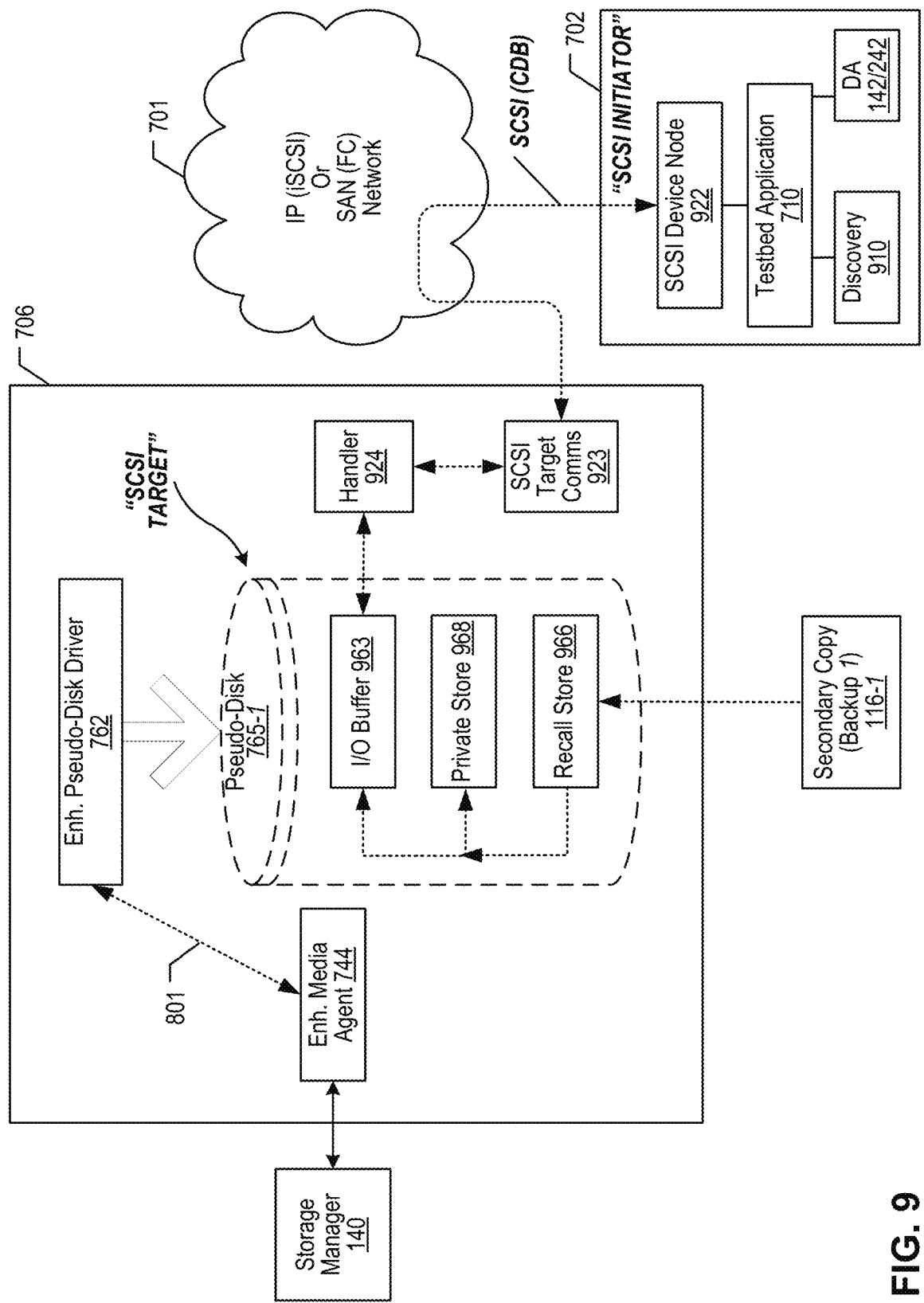

FIG. 9 is a block diagram illustrating some details of secondary storage computing device 706 and of testbed host 702 in system 700.

Figure 10:
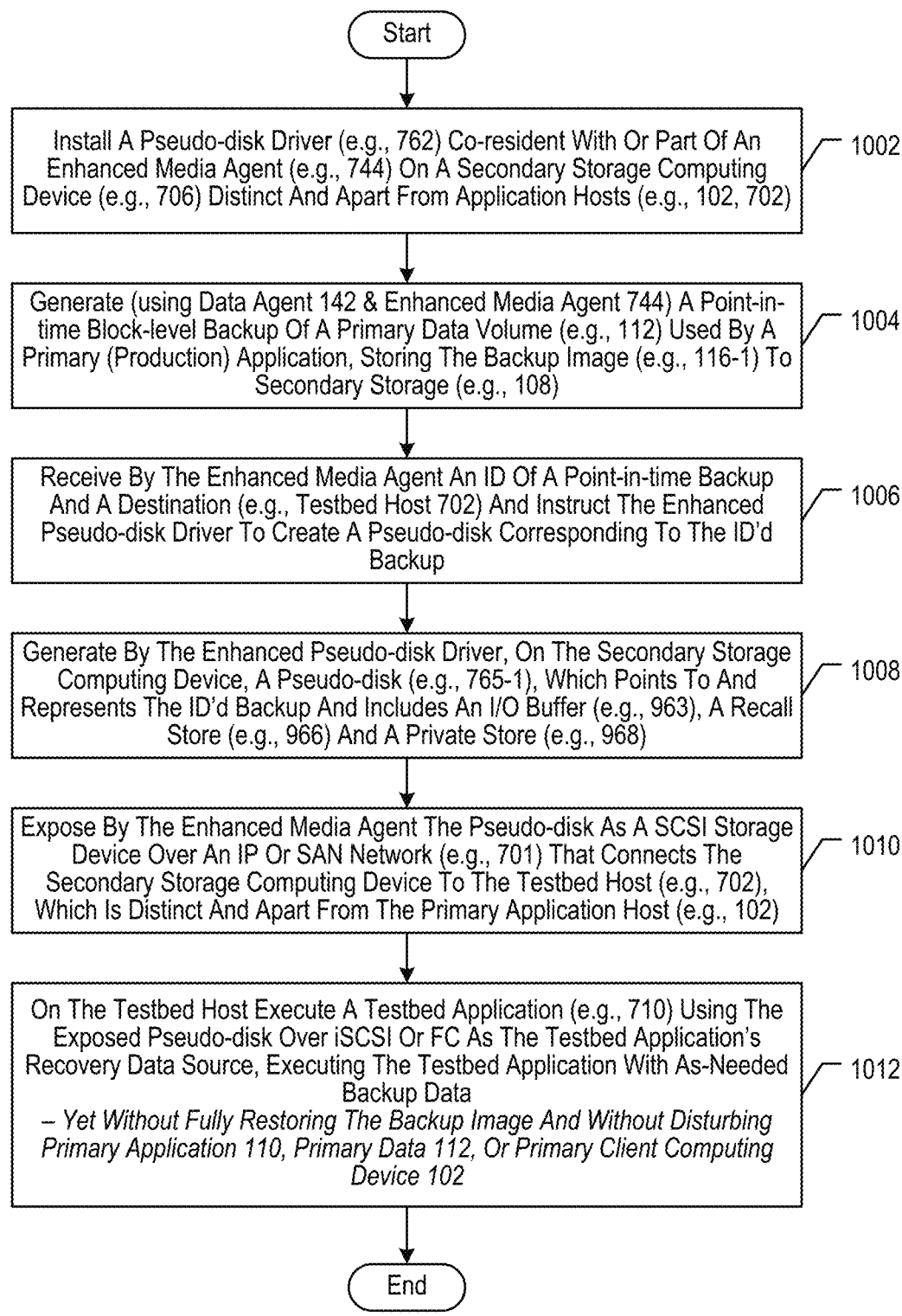

FIG. 10 depicts some salient operations of a method 1000 according to an illustrative embodiment of the present invention.

Figure 11:
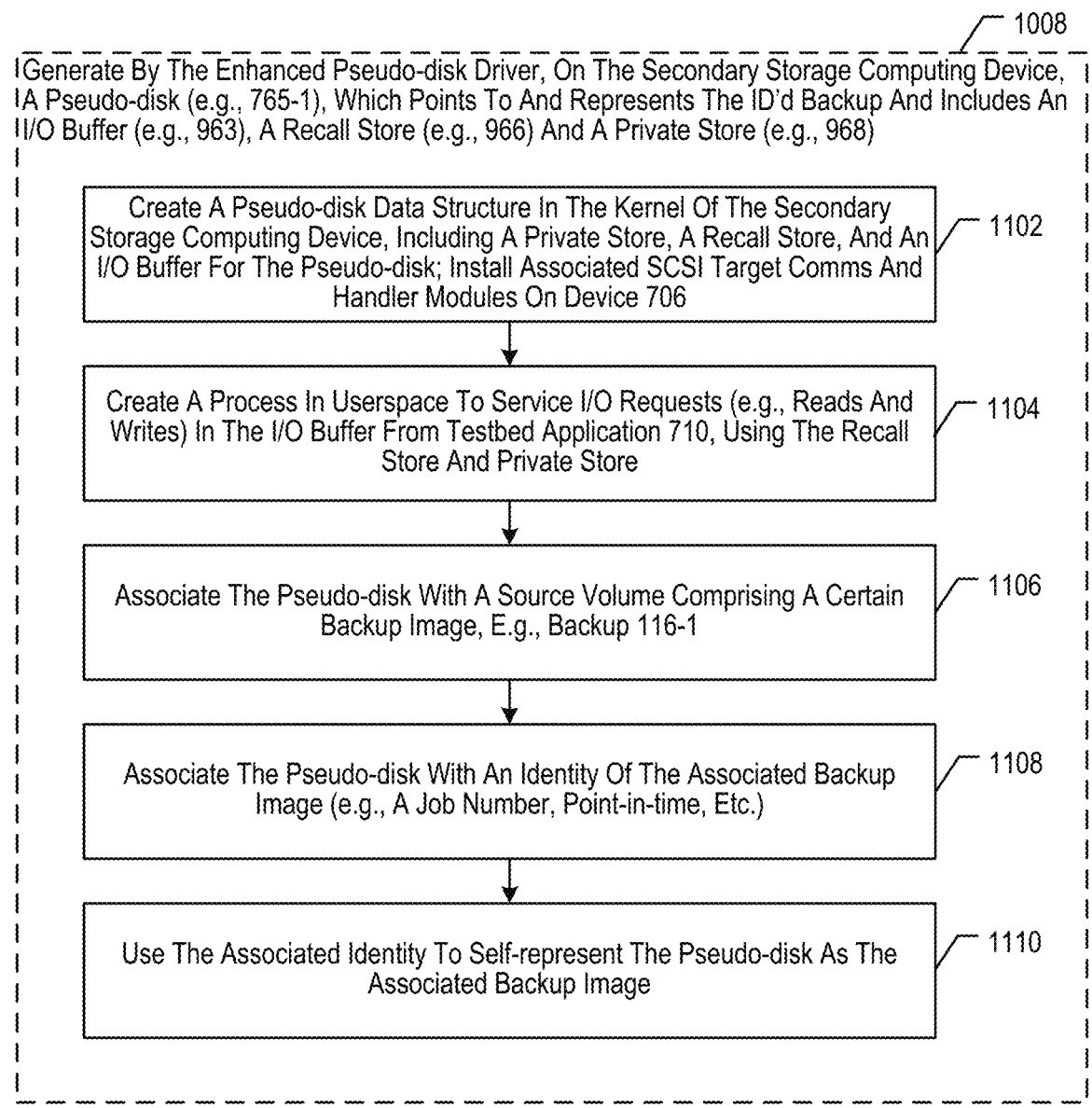

FIG. 11 depicts some salient sub-operations of block 1008 in method 1000.

Figure 12:
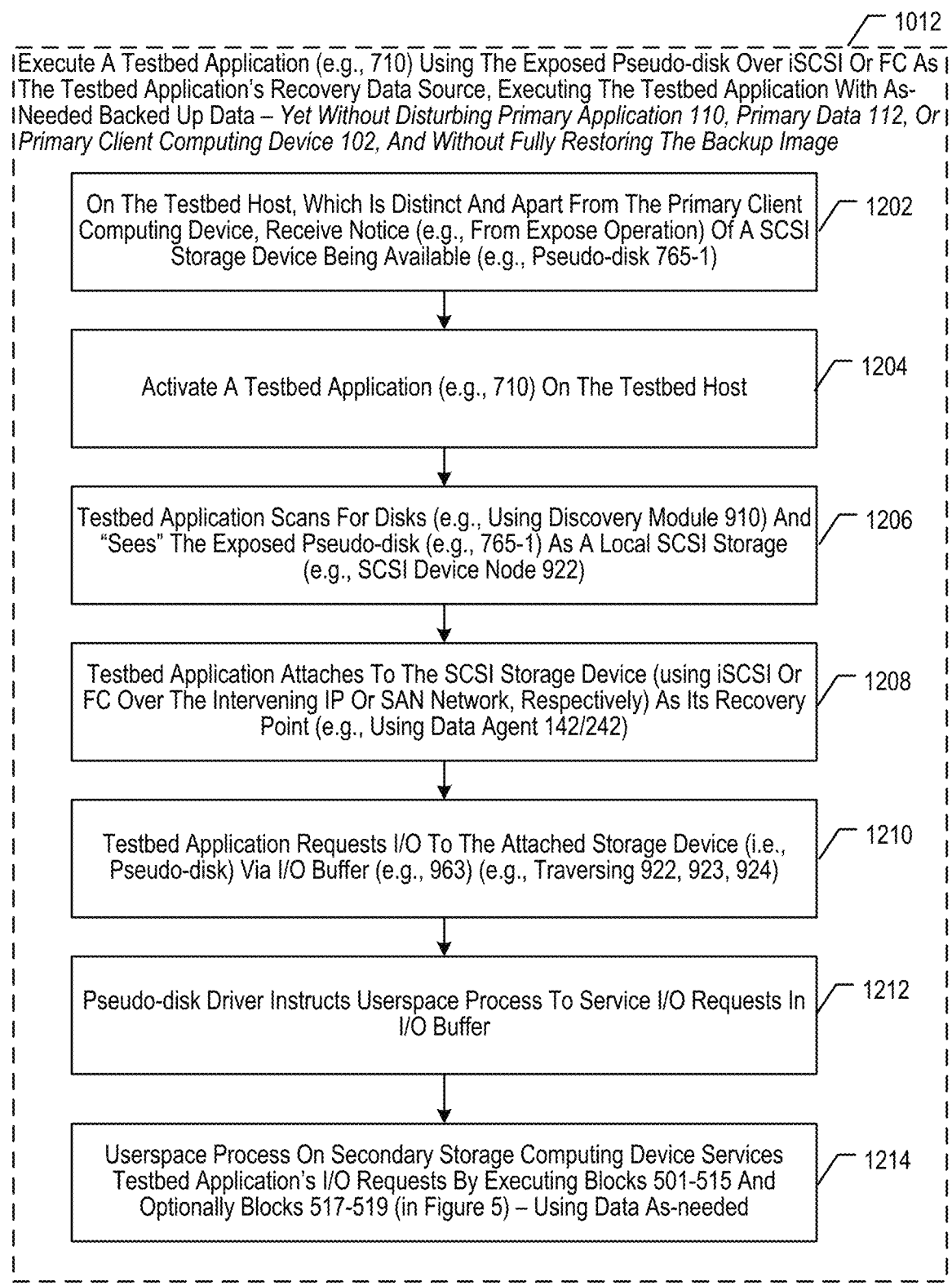

FIG. 12 depicts some salient sub-operations of block 1012 in method 1000.

DETAILED DESCRIPTION

Systems and methods are disclosed for so-called "instant application recovery" in an information management system. Examples of such systems and methods are described in further detail herein, in reference to FIGS. 2-5 and 6B and in the section entitled "EFFICIENT APPLICATION RECOVERY IN AN INFORMATION MANAGEMENT SYSTEM BASED ON A PSEUDO-STORAGE-DEVICE DRIVER." The components and functionality according to the present invention may also or alternatively be configured and/or incorporated into information management systems such as those described herein in FIGS. 1A-1H.

The enhancement is disclosed at least in part in FIGS. 7-12 herein and in the section entitled "POINT-IN-TIME BACKUPS OF A PRODUCTION APPLICATION MADE ACCESSIBLE OVER FIBRE CHANNEL AND/OR ISCSI AS DATA SOURCES TO A REMOTE APPLICATION BY REPRESENTING THE BACKUPS AS PSEUDO-DISKS OPERATING APART FROM THE PRODUCTION APPLICATION AND ITS HOST." The components and functionality according to the present invention may also or alternatively be configured and/or incorporated into information management systems and/or storage management systems such as those described herein in FIGS. 1A-1H and/or may be combined with embodiments of the systems described in FIGS. 2-5 and 6B.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
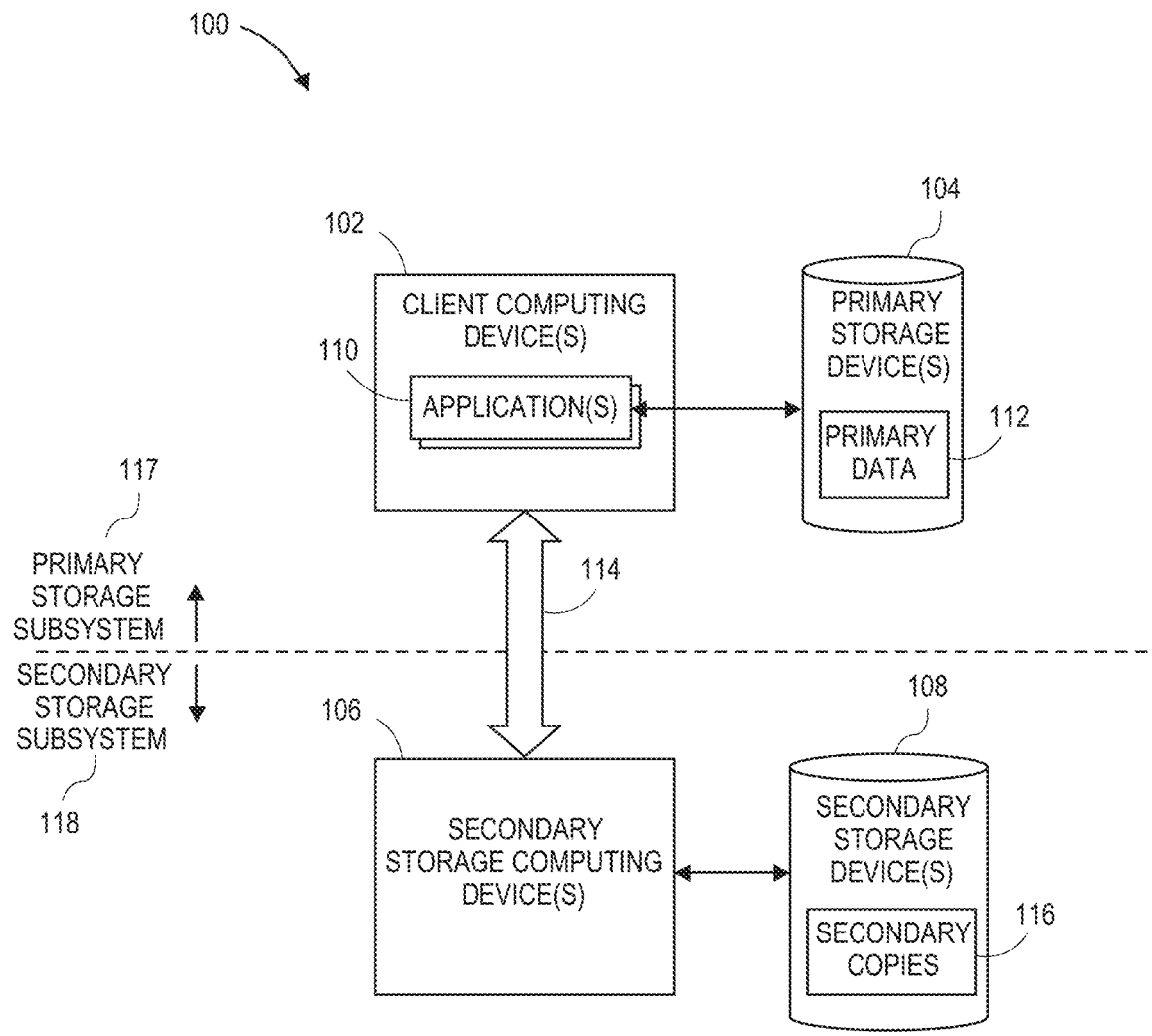
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,229,954, entitled "Managing Copies Of Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,352,422, entitled "Data Restore Systems and Methods in a Replication Environment";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,726,242, entitled "Systems and Methods for Continuous Data Replication;"

U.S. Pat. No. 8,745,105, entitled "Systems and Methods for Performing Data Replication";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System";

U.S. Pat. Pub. No. 2012/0150826, entitled "Distributed Deduplicated Storage System"; and U.S. Pat. Pub. No. 2014/0046900, entitled "Generic File Level Restore from a Block-Level Secondary Copy".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134b represents primary data objects 120, 133b, and 119A as 120', 133b', and 119A', respectively and accompanied by corresponding metadata Meta2, Meta10, and Meta1, respectively. Also, secondary data object 134C represents primary data objects 133A, 119b, and 129A as 133A', 119b', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
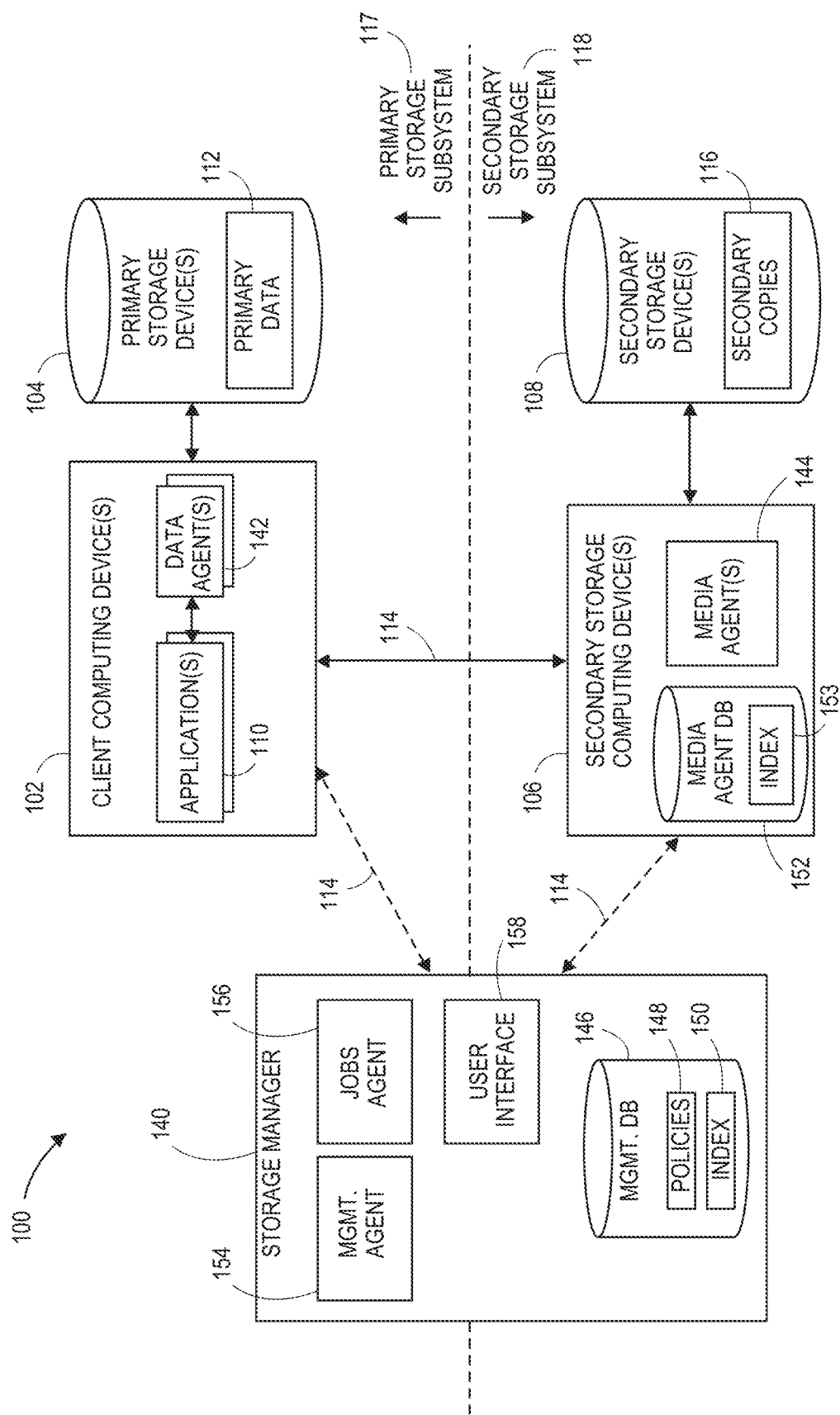
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
  initiating execution of secondary copy operations;
  managing secondary storage devices 108 and inventory/capacity of the same;
  reporting, searching, and/or classification of data in the information management system 100;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
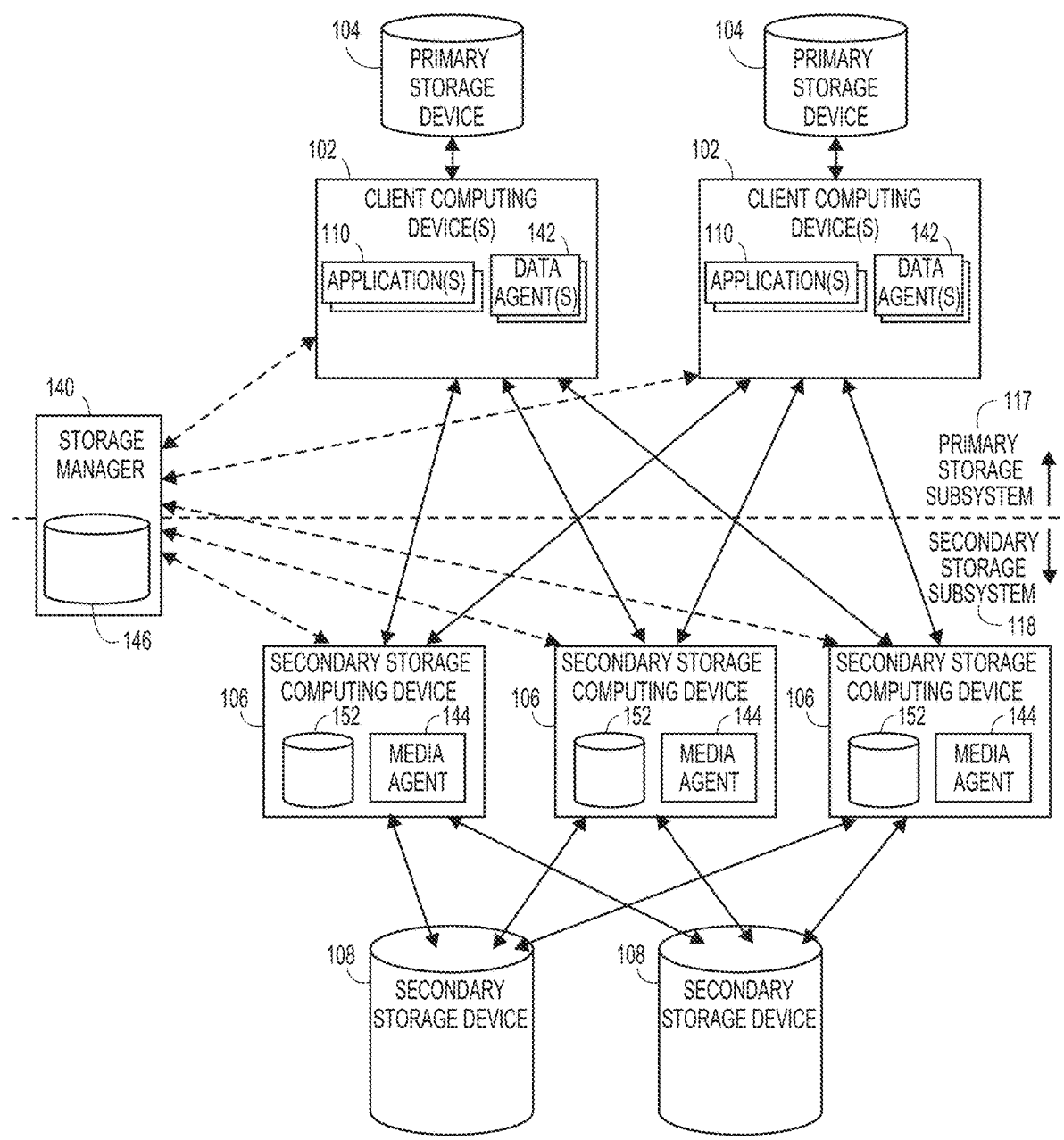
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
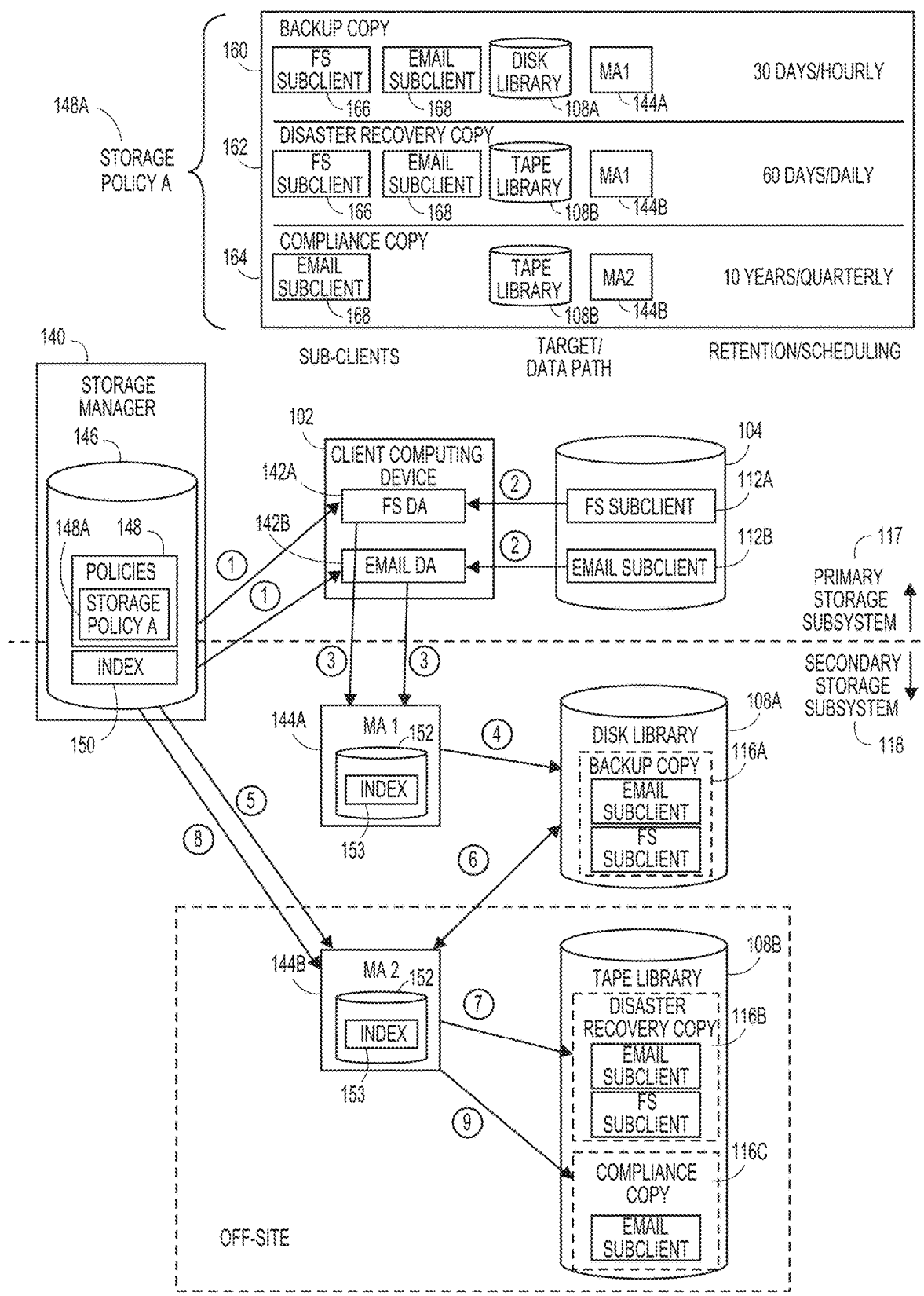
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112G may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 1086. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
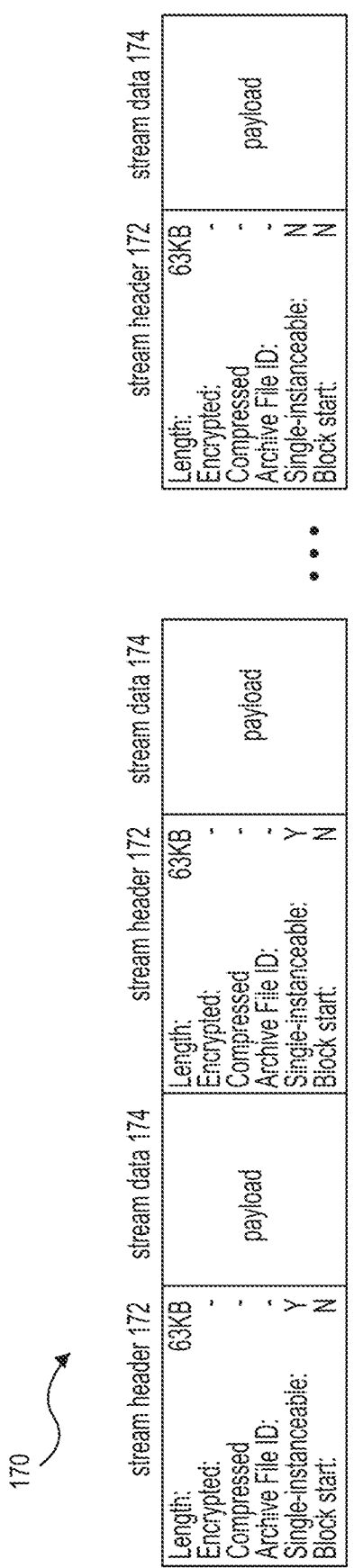
FIGS. 1F-1H are block diagrams illustrating suitable data structures that may be employed by the information management system.
Figure 1G:
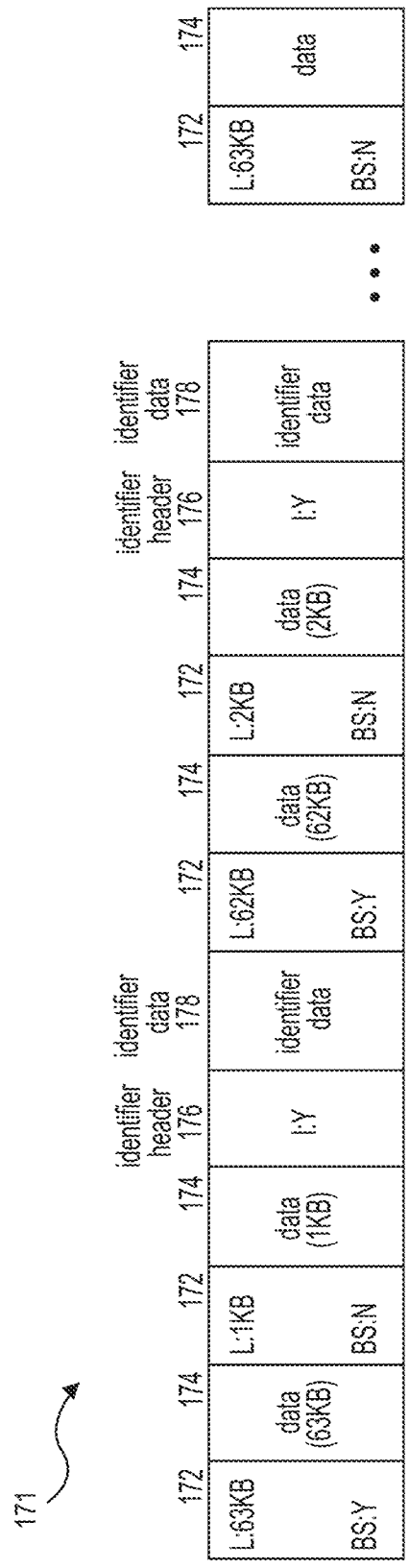

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
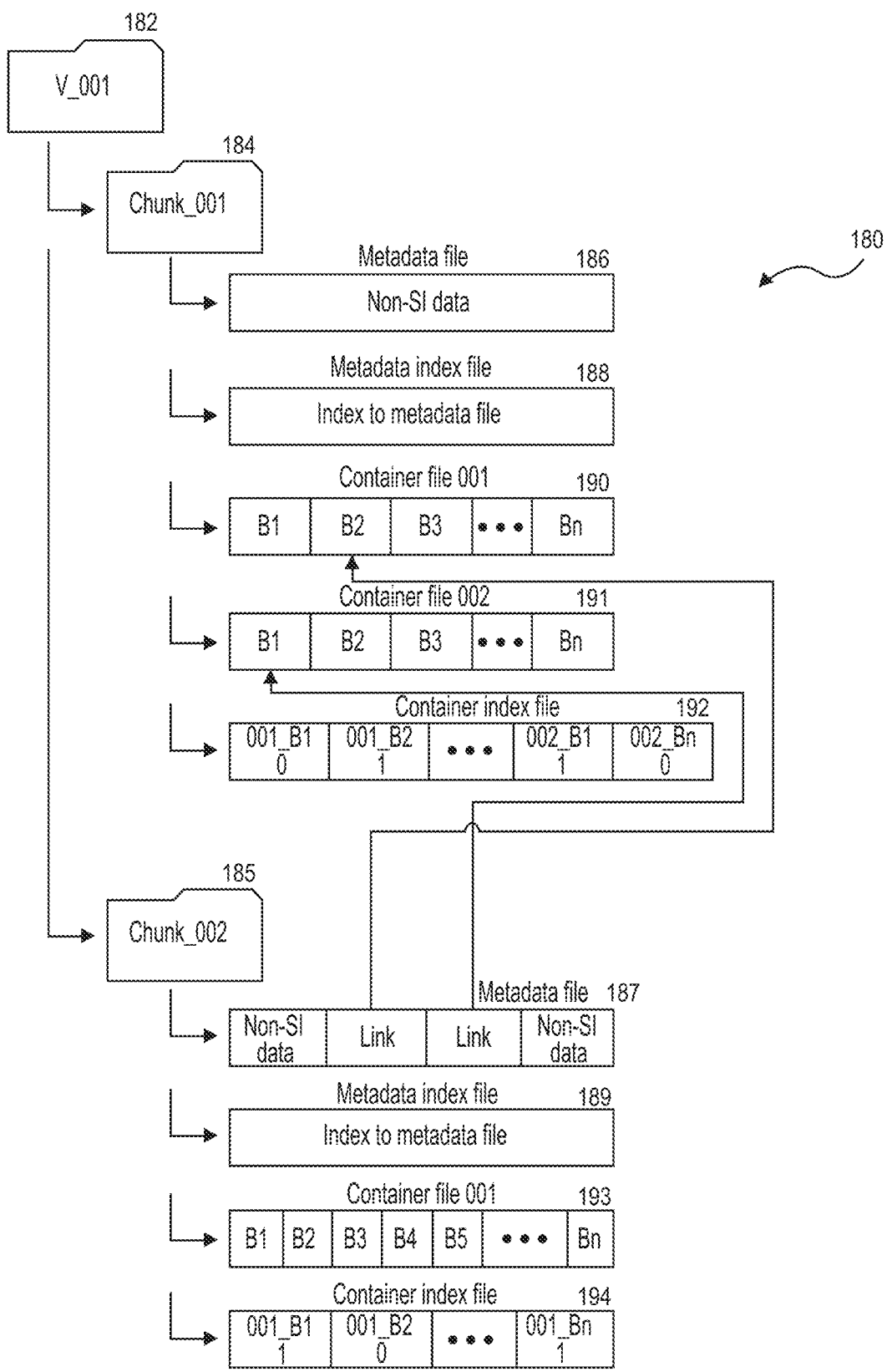

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Figure 2:
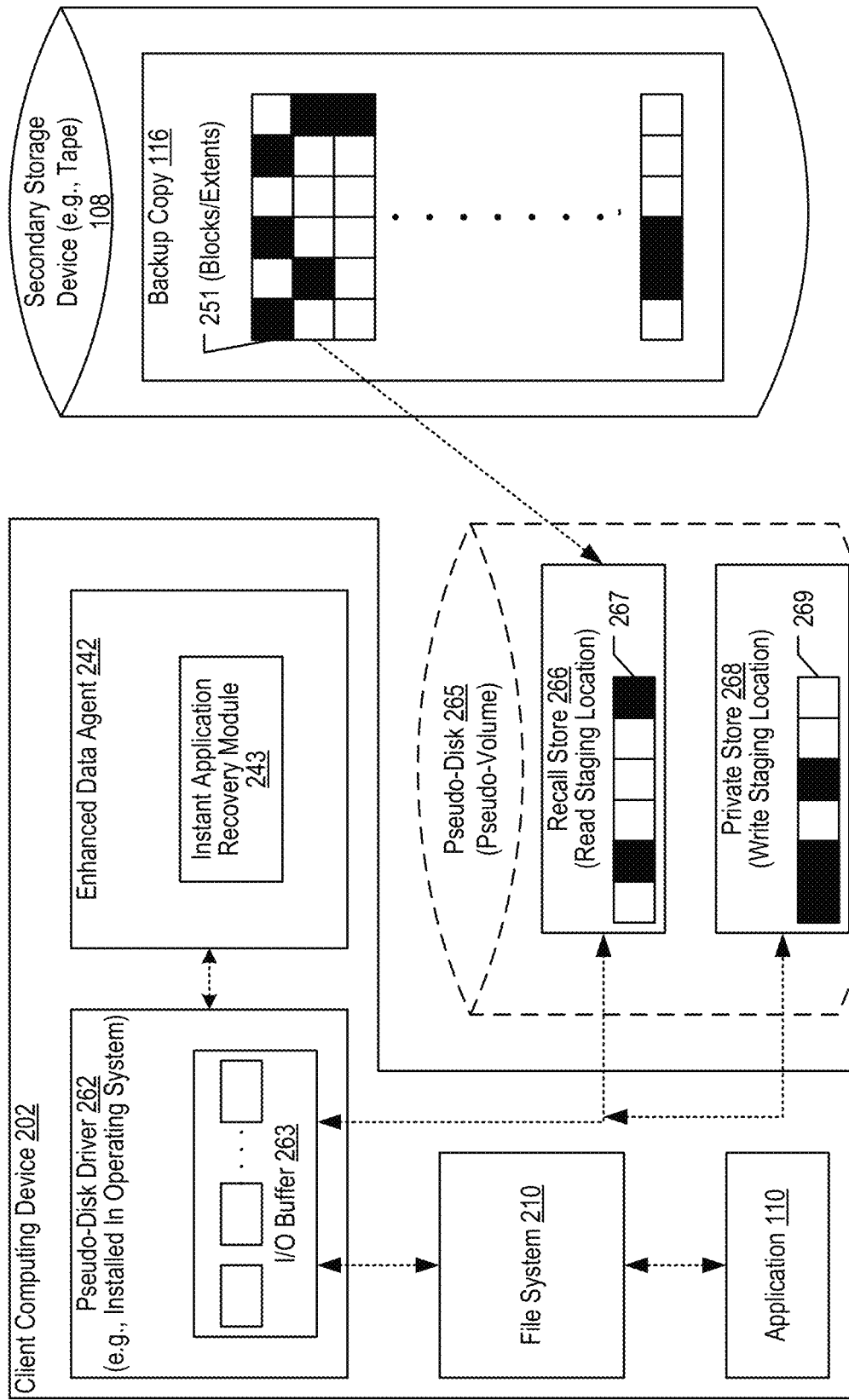
FIG. 2 is a block diagram illustrating some salient portions (DETAIL) of an information management system 200 for "instant application recovery," according to an illustrative embodiment of the present invention.

Efficient Application Recovery in an Information Management System Based on a Pseudo-Storage-Device Driver FIG. 2 is a block diagram illustrating some salient portions (DETAIL) of an information management system 200 for "instant application recovery" according to an illustrative embodiment of the present invention. System 200 comprises the following components depicted in the present figure: secondary storage physical media 108 (comprising backup copy 116); client computing device 202 (comprising application 110, file system 210, pseudo-disk driver 262, and enhanced data agent 242); and pseudo-disk 265 (comprising recall store 266 and private store 268). Other components of system 200 are depicted in subsequent figure(s). Storage manager (e.g., 140) and media agent (e.g., 144) are not depicted in the present figure even though they also are components of system 200.

The components are logically interconnected as shown by the dotted lines. The physical communications infrastructure required to support these logical connections is well known in the art and may be any suitable electronic communications infrastructure, such as that described in regard to communication pathways 114 above.

Secondary storage device 108 was described in more detail above, and may be tape, which is commonly used for storing backup data, because it is generally lower cost than primary storage media such as disks or storage arrays. Component 108 may be another type of media, such as disk, without limitation. Component 108 stores one or more secondary copies of data, such as backup copy 116.

Application 110 was described in more detail above and is well known in the art. Application 110 executes on client computing device 202. Application 110 may be a database application, for example, and there is no limitation on the nature or kind of application 110. Application 110 generates and accesses primary data 112, which may be stored in a primary storage device 104 shown elsewhere herein.

Backup copy 116 is a secondary copy of primary (production) data associated with application 110 and is logically a full backup copy. Backup copy 116 may be generated as described above. To ease understanding of the present disclosure, backup copy 116 is depicted here as occupying one unified data structure. However, it is to be understood that backup copy 116 may take a different form, and may be, for example, a synthetic full copy as described above, or may be reconstituted during a restore operation based on a full backup with later incremental backups.

Backup copy 116 comprises a plurality of blocks of data. In some embodiments, the blocks may be stored in multi-block extents, such as a set of contiguous blocks allocated in a database or other contiguous storage space on a storage device that is reserved for a particular file, folder, or application. For purposes of the present disclosure, it is to be understood that references to block read and write operations may be implemented as read and write operations on the respective extent that comprises the given block. Therefore, element 251 illustrated in the present figure may be a block or an extent, depending on the implementation. Each block/extent 251 may comprise payload data, file system metadata, indexing information, and/or "unused space," according to the respective file system associated with application 110 and based at least in part on the geometry of the physical storage device and the nature of the storage media. Blocks/extents 251 need not be contiguously stored relative to each other on the media, though they are so depicted here for simplicity and to enhance understanding of the present disclosure.

Client 202 is a client computing device analogous to client computing device 102 and also comprises additional functionality for operating within system 200 according to the illustrative embodiment.

File system 210 is well known in the art, and is used here to control how data is stored and retrieved in particular reference to application 110. Thus, file system 210 is associated with application 110. Illustratively, file system 210 is in communication with application 110 and with input/output buffer 263 (hereinafter "I/O buffer 263"), such that read and write requests issued by application 110 are interpreted by file system 210 and conveyed to I/O buffer 263 for processing. For example, file system 210 may determine the identity and/or location of a block/extent, based on a read or write request issued by application 110.

Enhanced data agent 242 is a data agent analogous to data agent 142 and additionally comprises functionality, such as functional component 243 and communications to/from pseudo-disk driver 262, to enable data agent 242 to perform within system 200 according to the illustrative embodiment. Enhanced data agent 242 may also be in communication with other components of system 200, such as a storage manager (e.g., storage manager 140), a media agent (e.g., media agent 144), and with other components of client 202, such as pseudo-disk driver 262, file system 210, application 110, etc. For example, data agent 242 may communicate to pseudo-disk driver 262 to indicate which blocks need to be read into the recall store. Data agent 242 may be application-specific. In some embodiments, enhanced data agent 242 may comprise the code for pseudo-disk driver 262, such that when enhanced data agent 242 is installed on client computing device 202, the pseudo-disk driver 262 is installed in the operating system of client 202. Logically, however, to enhance understanding of the present disclosure, data agent 242 is shown as a separate component from pseudo-disk driver 262.

Instant application recovery module 243 is a functional component of enhanced data agent 242 and may be implemented as executable software and/or firmware, which executes on client computing device 202. When it executes according to the illustrative embodiment, module 243 may be responsible for initiating, coordinating, and managing the "instant application recovery" of application 110 on client 202, as described in further detail below and in subsequent figures. Module 243 may also be responsible for other operations, such as those described in regard to method 400 below. For example, instant application recovery module 243 may coordinate the servicing of read and write requests issued by application 110, such as executing the logic of block 407 in FIG. 5, as well as the logic of several other blocks in method 400 shown in FIG. 4.

Instant application recovery module 243 is shown herein as a distinct component to ease understanding of the present disclosure, however, alternative embodiments are also possible within the scope of the present invention. Module 243 may be embodied as a unified module within data agent 242, layered on data agent code, or may be a logical construct whose functionality is distributed through one or more other functional modules of the data agent—and in any combination thereof.

Pseudo-disk driver 262 is a pseudo-storage-device driver (which may be implemented as executable software and/or firmware) that is illustratively installed in the operating system of client computing device 202. Pseudo-disk driver executes on client computing device 202. Pseudo-disk driver 262 provides application 110 (via file system 210) with an interface to a pseudo-volume (e.g., pseudo-disk 265) that enables application 110 to operate under "instant application recovery" using the pseudo-volume as a store for primary data.

Pseudo-disk driver 262 comprises an I/O buffer 263 that receives read and write requests from application 110 (via file system 210), which are directed at the primary data associated with application 110. As will be described below, these read and write operations will be serviced, during the period of "instant application recovery," based on data structures configured in pseudo-disk 265, such as a read staging location (e.g., recall store 266) and a write staging location (e.g., private store 268). Pseudo-disk driver 262 may be delivered to client computing device 202 as part of enhanced data agent 242, and may be installed in the operating system of the host client computing device 202 when enhanced data agent 242 is installed.

Input/output buffer 263 ("I/O buffer 263") is a data structure associated with and maintained by pseudo-disk driver 262. I/O buffer 263 is shown here as a component of pseudo-disk driver 262, but may be located anywhere properly accessible to pseudo-disk driver 262 and file system 210. I/O buffer 263 receives and stores read and write requests issued by application 110 (via file system 210), and also stores responses thereto, which are served to application 110 in response, such as responses to read and write requests that may be received from recall store 266 and/or private store 268.

Pseudo-disk 265 is an instantiation of a pseudo-volume presented and made accessible by pseudo-disk driver 262 for data storage. Pseudo-disk 265 is presented by pseudo-disk driver 262 to file system 210 (for application 110), as primary storage for the primary data generated/accessed by application 110 during the course of "instant application recovery" according to the illustrative embodiment. Thus, pseudo-disk 265 is a pseudo-volume that is used by application 110 as a store for primary data during "instant application recovery." Pseudo-disk 265 comprises data structures such as recall store 266 and private store 268, which may be stored on one or more appropriate physical storage devices (e.g., 104). Pseudo-disk 265 may also be implemented in cache memory in some embodiments. Pseudo-disk 265 is identified as a distinct storage device, based on a mount point.

Recall store 266 is a data structure configured in pseudo-disk 265. Recall store 266 is a staging location for read requests issued by application 110 (via application 210). Recall store 266 may receive blocks/extents from backup copy 116 which is in secondary storage (e.g., on tape/storage device 108) and/or from primary storage destination 312. A received block/extent is stored as block/extent 267 in recall store 266. Recall store 266 may also transmit blocks/extents to I/O buffer 263. There is no limit to the number of blocks/extents 267 in recall store 266.

Private store 268 is a data structure configured in pseudo-disk 265. Private store 268 is a staging location for write requests issued by application 110 (via file system 210). Private store 268 may receive blocks/extents from I/O buffer 263, which represent writes issued by application 110, and which may be stored as block/extent 269. Private store 268 may also transmit blocks/extents to I/O buffer 263. There is no limit to the number of blocks/extents 269 in private store 268.

FIG. 3 is a block diagram illustrating some additional elements of system 200, including a high-level sequence of events according to the illustrative embodiment. In addition to the components depicted in FIG. 2, the present figure also depicts: primary storage device 104, which comprises primary storage destination 312. Components are logically interconnected as shown by the dotted lines. The physical communications infrastructure required to support these logical connections is well known in the art and may be any suitable electronic communications infrastructure, such as that described in regard to communication pathways 114 above.

Primary storage device 104 was described above and is well known in the art. Primary storage device 104 may be used for primary data that is generated and/or accessed by application 110. Illustratively, primary storage device 104 may be configured to appear to a file system as a block device. Primary storage device 104 may be part of a storage array. Primary storage device 104 may be a logical volume.

Primary storage destination 312 is a volume on primary storage device 104 which, in the course of a restore operation, receives the backed up data from backup copy 116 in secondary storage. Primary storage destination 312 may also receive data from the write staging location that is private store 268, thus capturing writes that have occurred after the backup copy 116 was made. Application 110 may then restart based on primary storage destination 312, using destination 312 at its primary data store.

The overall process according to the illustrative embodiment is described in further detail in subsequent figures. At a high level, the process comprises a number of stages:

(i) begin a restore operation, running in the background, restoring backup copy 116 from secondary storage to primary storage destination 312 in primary storage;

(ii) execute instant application recovery of application 110 via pseudo-disk 265, which may execute substantially concurrently with stage (i);

(iii) after the restore operation begun in stage (i) has completed, application 110 is temporarily deactivated (stopped from executing), pseudo-disk 265 is unmounted, and the writes in private store 268 are applied to primary storage destination 312; at this point, application 110 may re-start ordinary operations based on using the updated primary storage destination 312 as the primary data store.

FIG. 4 depicts some salient operations of a method 400 according to an illustrative embodiment of the present invention. In general, method 400 is executed collectively by the components of system 200 (which is managed by a storage manager such as storage manager 140, and principally by data agent 242. In general, method 400 is directed at reducing the downtime of application 110 through the execution of "instant application recovery" as described herein. The present method presupposes that before method 400 begins application 110 has been deactivated (i.e., stopped executing for any number of reasons, e.g., hardware failure, maintenance, software failure, manual take-down, etc.).

At block 401, a destination volume (e.g., 312) is mounted to a first mount point on client computing device 202 that hosts application 110. The primary storage device 104 comprises a primary storage destination 312, which is where the restored data is to be stored. The first mount point may be illustratively identified as "/dest" or as otherwise appropriate to the client computing device. The particular naming chosen to identify the first mount point is important here, because it may be used again later in the process. The mounting operation may be executed by enhanced data agent 242 (e.g., using instant application recovery module 243), and in some embodiments may be prompted by a user via a user interface and/or may be executed as part of a restore operation as instructed by the storage manager.

At block 403, a full restore of backed up data is initiated from e.g., backup copy 116 in secondary storage (e.g., residing on secondary storage device 108) to primary storage destination 312 on primary storage device 104. The restore operation may be initiated by a user prompt via the storage manager, by the storage manager, and/or by the enhanced data agent 242. This operation also involves a media agent (e.g., 144) to find data on the backup media and move it from secondary storage to primary storage. As noted earlier, the restore operation of the backup copy can take a long time if the amount of data to be restored is very large, and therefore this operation shall continue to execute even while some of the next steps execute, as described below. See also the illustrative timeline in FIG. 6B.

The backed up data may be a copy of data that was generated by an application executing on the self-same client computing device 202 to which the data is being restored; or it may have been generated by a corresponding application running on another client computing device, in which case, the effect of the present method 400 is to migrate the application from one client to another client with reduced downtime.

At block 405, pseudo-disk 265 is mounted to the very same first mount point (e.g., "/dest") on client computing device 202 that was used to mount the primary storage destination volume at block 401. This may be executed as a "remount" operation in some implementations, since the same mount point is used. This operation creates a new name space to be used for primary data storage going forward from here. However, the restore operation using the name space defined by primary storage destination 312 will continue (effectively taking place in the background) so long as the restore process begun at block 403 remains uninterrupted. Thus, any process begun within the restore operation that was making use of the destination 312 name space will continue to do so regardless of the present block.

Thus, by using the same mount point again as described here (or through equivalent techniques depending on the underlying technology, operating system, file system, etc.) method 400 substantially reduces the downtime needed by application 110. The difference in downtime is illustratively demonstrated by comparing the timelines of FIGS. 6A and 6B.

At block 407, "instant application recovery" is executed. At this point, application 110 may be started (recovered), based on using pseudo-disk 265 as a store for primary data. Accordingly recall store 266 and private store 268 are used here to service read and write requests to/from the application. During "instant application recovery," application 110 "sees" backup data natively, albeit on a selective basis, via recall store 266, and therefore may be able to operate and service user transactions. Because the backup data is available selectively at this stage, application 110 may experience some performance delays, e.g., for retrieving backup data on demand from tape, but nevertheless, application 110 will operate and be available to users. The fact that application 110 may be operating via pseudo-disk 265 may not be expressly evident to users (preferably), except that performance delays may occur. In this way, even with performance delays, a business-critical application may provide adequate, if not ideal, service—as opposed to being altogether unavailable while backup data is restored. Block 407 is described in further detail in a subsequent figure.

At block 409, data agent 242 determines whether the backup has been fully restored from secondary storage (e.g., from tape), including any data integrity checks and/or audits—i.e., whether block 403 completed all operations. In other words, has the backup data been fully restored to primary storage destination 312? Data agent 242 may make this determination in any number of ways, e.g., natively by monitoring restore process(es); by querying the media agent that is handling the data movement from secondary storage to destination 312; by querying the storage manager that oversees the restore operation; and/or any combination thereof.

If data agent 242 determines that the restore operation is still ongoing, block 407 continues to execute "instant application recovery." On the other hand, if data agent 242 determines that the restore operation has fully completed, control passes to block 411.

At block 411, based on having determined that the backup data has been fully restored to primary storage, data agent 242 may perform the following operations: (a) stops application 110; (b) unmounts pseudo-disk 265; and (c) applies private store 268 to primary storage destination 312.

Operation (a) comprises properly quiescing application 110 as is well known in the art and stopping application 110 from executing. At this point, application 110 enters another period of downtime.

Operation (b) comprises an unmount operation in which the pseudo-volume (e.g., pseudo-disk 265) is unmounted from the first mount point (e.g., /dest), thereby reversing block 405. At this point, application 110, were it to be re-started, would no longer be able to access pseudo-disk 265 from this first mount point. Notably, however, primary storage destination 312 is still mounted to the first mount point, based on block 401 above.

Operation (c) comprises updating primary storage destination 312 to incorporate the write operations that have accumulated in private store 268 while application 110 was operating under "instant application recovery" in block 407. Because the writes in private store 268 are tracked and managed at the block/extent level (e.g., 269), the present updating of primary storage destination 312 likewise may (preferably) operate at the same level of granularity. Data agent 242 thus substitutes each block/extent in private store 268 (e.g., block/extent 269) for the corresponding pre-existing block/extent that has been restored from backup in destination 312. All block/extents 269 in private store 268 (representing the most recent writes of the respective block/extent) may be thus written to destination 312, thereby updating destination 312 with the latest writes based on private store 268. Now, destination 312 comprises an up-to-date version of primary data, including the most recent writes generated by application 110 while it executed under "instant application recovery." At this point, destination 312 is ready to be used as the primary data store by application 110 when it is re-started.

At block 413, data agent 242 re-starts application 110, based on the updated primary storage destination 312, which resides on the primary storage device 104. At this point, application 110 has native access to all its primary data, including the updates that occurred during "instant application recovery," and thus application 110 may be said to have been fully restored to normal operations. After block 413, method 400 ends.

FIG. 5 depicts some salient details and sub-operations of block 407 in method 400. Block 407 is generally directed at executing the "instant application recovery" stage (ii) referred to in FIG. 3, based at least in part on the pseudo-volume (e.g., pseudo-disk 265) and its constituent recall store 266 and private store 268. According to the illustrative embodiment, enhanced data agent 242 executes the sub-operations of block 407 which are detailed here (e.g., using instant application recovery module 243 in conjunction with pseudo-disk driver 262). In some alternative embodiments, data agent 242 may do so based on instructions and/or messages received from storage manager 140, e.g., "execute instant application recovery for application 110 based on pseudo-disk 265 mounted at mount point '/dest.'" Data agent 242 and pseudo-disk driver 262 may co-operate (e.g., interwork with each other) to perform the recited operations.

At block 501, data agent 242 starts application 110, which data agent and application both execute on client computing device 202. Data agent 242 starts application 110 based on pseudo-disk 265, which is presented as a primary data store to application 110 and/or its associated file system 210 by pseudo-disk driver 262. From the perspective of application 110 and/or file system 210, pseudo-disk 265 is the store for primary data for application 110 during "instant application recovery." Application 110 is preferably unaware that it is operating under "instant application recovery."

At block 502, data agent 242 receives read and write requests via I/O buffer 263, which read and write requests are provided by application 110 (via associated file system 210), based on the fact that application 110 is presently operational and servicing users. For example, a user report or lookup operation may result in a read request; a user transaction or update may result in a write request.

At block 503, data agent 242 analyzes an entry in I/O buffer 263 to determine whether it is a read or a write request. If the request is a read, control passes to block 507. If it is a write, control passes to block 505.

At block 505, which is reached on a write request, the write request is executed by writing the block/extent provided by application 110 (via file system 210) to private store 268 (e.g., written as block/extent 269). The identity of the particular affected block/extent may have been determined by file system 210. Appropriate acknowledgement of the successful write may be transmitted to application 110. When a given block/extent 269 in private store 268 is the subject of a new write request, the existing block/extent is preferably overwritten so as to retain only the latest writes in the private store. Control then passes to block 517; in some embodiments, control may regularly pass to block 502 for processing a new request, and may pass to block 517 only intermittently, e.g., periodically, after a certain number of operations, etc.

At block 507, which is reached based on a read request, data agent 242 determines whether the read request of the given block/extent may be found in private store 268, i.e., whether the block/extent changed since "instant application recovery" began. If the block/extent is not in the private store, control passes to block 511; otherwise control passes to block 509.

At block 509, the requested block/extent is supplied by data agent 242 from private store 268, thus providing current data to application 110. Control then passes to block 517 or block 502 as noted above.

At block 511, which may be reached when a read request cannot be supplied from the private store, data agent 242 determines whether the block/extent may be found in recall store 266, e.g., whether the block/extent may have been read since "instant application recovery" began, or perhaps may have been stored therein from primary storage destination 314 (see block 517). If the block/extent is in recall store 266, control passes to block 515; otherwise control passes to block 513.

At block 513, which is reached after a requested block/extent cannot be found in either the private store or the recall store, data agent 242 fetches the requested block/extent from the backup copy 116 residing in secondary storage (e.g., on tape). This operation may be relatively time-consuming and may require a lookup (e.g., via media agent 144) in an index (e.g., index 153) to find the location of the sought-after block/extent on the secondary storage media; or may even require the index to be retrieved from secondary storage first before the block/extent may be located. Once the block/extent has been fetched from secondary storage, it is stored in the recall store 266. Control then passes to block 515.

At block 515, the requested block/extent is supplied from recall store 266. This operation advantageously saves fetching data from the backup copy in secondary storage for every read request, by supplying data locally instead (if available). Control then passes to block 517 or block 502 as noted above.

At block 517, restored blocks (which have been stored in primary storage destination 312 by the ongoing restore operation) may be copied to the recall store 266. This operation may occur periodically, e.g., after a certain number of blocks have been restored. This operation advantageously interworks with block 515 to reduce the number of fetches required from the backup copy in secondary storage as in block 513.

At block 519, data agent 242 may prune entries from recall store 266. For example, the pruning may be based on a "least requested" measure kept by data agent 242 (e.g., using instant application recovery module 243), to track how often entries in the recall store are requested by application 110. This operation ensures that the recall store may speedily service relatively frequent requests and yet may not become unmanageably large. This operation may occur intermittently, e.g., periodically, after a certain number of reads, based on the number of blocks/extents in the recall store, etc.

In contrast to pruning the recall store, all the latest writes in private store 268 are retained, at least until they are transferred to primary storage destination 312 in block 411(c). After block 519, control may pass back to block 502 for processing the next read/write request, or block 407 may end.

FIG. 6B depicts an illustrative timeline based on method 400, which comprises "instant application recovery" according to an illustrative embodiment of the present invention. The numbered blocks in FIG. 6B correspond to the blocks of method 400 in FIG. 4. FIG. 6B may be contrasted to FIG. 6A, which depicts the prior art. The relative durations of the depicted blocks here and in FIG. 6A are merely illustrative and are intended to enhance understanding of the present disclosure and its distinct advantages over the prior art.

For example, total application downtime may be substantially reduced by the illustrative embodiment depicted in FIG. 6B, which uses instant application recovery. Accordingly, application downtime may occur twice, for relatively short intervals: first downtime (A) occurs before the application begins "instant application recovery" in block 407; and then downtime (B) occurs while the private store is applied to the primary storage destination in block 411. Compare these intervals to block 601 in FIG. 6A. Depending on the size of the backup copy to be restored and the duration of the restore operation (e.g., block 601, block 403), the two downtime periods (A) and (B) shown in FIG. 6B may be relatively short (even negligible to the ordinary user of application 110) compared to awaiting the completion of a full restore (e.g., block 601) as required in the prior art.

In regard to the components, blocks, operations and/or sub-operations described in reference to FIGS. 2-5 and 6B, other embodiments are possible within the scope of the present invention, such that the above-recited components, steps, blocks, operations, and/or messages/requests/queries/instructions may be differently arranged, sequenced, subdivided, organized, and/or combined. In some embodiments, a different component may initiate or execute a given operation.

Point-in-Time Backups of a Production Application Made Accessible Over Fibre Channel and/or iSCSI as Data Sources to a Remote Application by Representing the Backups as Pseudo-Disks Operating Apart from the Production Application and its Host As noted earlier, the present enhancement, an illustrative embodiment of which is depicted in FIGS. 7-12 herein, substantially reduces the impact and hence the implicit risk to the computing devices that host applications in the production environment, effectively insulating the production environment from the enhanced components and operations. The enhanced system is particularly suitable for testbeds such as test, verification, certification, interoperability, or development environments where production systems remain undisturbed while a remote application ("testbed application" or "secondary application" or "recovery application") executes on another computing device that is distinct from production machines ("testbed host" or "secondary host"). The testbed application is said to be remote or secondary in the sense that it is different from the primary production application and executes on a host that is distinct and apart from the primary production application's host. According to the illustrative embodiment, the testbed/secondary host may be in the same data center as the production host or on a private or public cloud, without limitation. The testbed application uses a recovery volume that represents and taps into—but is not actually—a block-level point-in-time backup of primary production data. The testbed environment operates apart from production host(s) and application(s). The testbed application can be used to verify the integrity of a given backup image or for developing enhanced functionality such as additional application features, reports, utilities, etc. using the testbed application rather than the primary (production) application. The testbed application "feels like" a live or primary application, but operates from data on an as-needed basis sufficient for the testbed environment yet (i) without impacting the production environment and (ii) without restoring the entire backup image from secondary storage.

FIG. 7 is a block diagram according to an illustrative embodiment of the present invention illustrating some salient portions of a system 700 for making accessible over Fibre Channel and/or iSCSI one or more point-in-time backups of a production application as respective data sources to a remote application, by representing the backups as respective pseudo-disks operating apart from the production application and its host. System 700 illustratively comprises: client computing device 102, hosting primary (production) application 110 and/or file system 210 and data agent 142; primary storage device 104 storing primary (production) data 112; secondary storage device 108, storing secondary copies (point-in-time backups) 116-1 through 116-n; network 701; testbed computing device 702, hosting testbed application 710 and a data agent 142/242; and secondary storage computing device 706, comprising enhanced media agent 744, enhanced pseudo-disk driver 762, and pseudo-disks 765-1 through 765-n. The components are logically interconnected as shown by the two-way solid arrows. The physical communications infrastructure required to support these logical connections is well known in the art and may be any suitable electronic communications infrastructure, such as that described in regard to communication pathways 114 above.

System 700 is a storage management system that may be an embodiment of information management system 100 further enhanced to support the components and to perform the operations disclosed herein. System 700 is managed by a storage manager 140 and associated management database 146 (not shown in the present figure).

Components 102-142 and file system 210 were described in more detail elsewhere herein. Secondary storage device 108 may be any suitable data storage platform such as tape, disk, storage array, etc. Enhanced data agent 242 was described in more detail in reference to the parent patent application. A data agent, whether data agent 142 or enhanced data agent 242, operates on testbed computing device 702 to enable application 710 to attach to and use a recovery point as its data source, e.g., from a pseudo-disk 765 representing a corresponding point-in-time backup 116. Notably, NO pseudo-disk drivers 262 are installed on client computing device 102 or on testbed computing device 702.

The bold dotted two-way arrow labeled "SCSI" indicates a logical Small Computer System Interface ("SCSI") connection, over the intervening network 701, between testbed application 710 on testbed computing device 702 and one of the pseudo-disks, illustratively pseudo-disk 765-*n* on secondary storage computing device 706. This logical SCSI connection traverses a number of sub-components that are described in more detail in a subsequent figure. Pseudo-disk 765-*n* is labeled "SCSI Target," because in the SCSI relationship with testbed application 710 executing on testbed host 702, the pseudo-disk is the so-called target. In contrast, the testbed host 702 is the "SCSI Initiator" as labeled thereon. Target and initiator are SCSI terms of art. The SCSI protocol is well known in the art.

Each dotted bold one-way arrow depicts a logical relationship between a secondary copy (point-in-time backup) 116 residing in secondary storage and a corresponding pseudo-disk 765 created on the secondary storage computing device to represent the particular point-in-time backup in system 700. The unidirectional arrow indicates that backup data flows from secondary storage to the pseudo-disk, but not vice-versa.

Network 701 is a network that is well known in the art and which enables secondary storage computing device 706 to be in communication with testbed computing device 702. Network 701 may be an Internet Protocol ("IP") network or a storage area network ("SAN") using Fibre Channel ("FC") protocol. In alternative embodiments, network 701 may employ another network technology. Network 701 may be local to the data center that houses both components 706 and 702; may be a private network or private cloud belonging to the organization that owns/operates components 706 and 702; may be a public network resource, such as the Internet; and/or any combination thereof, without limitation.

Testbed computing device 702 (or "testbed host 702") is a computing device analogous to a client computing device 102, and additionally comprises features needed for operating in system 700, such as discovery module 910 and other local features (see FIG. 9). Moreover, testbed computing device 702 is in communication via network 701 with secondary storage computing device 706, which hosts pseudo-disk(s) 765. Importantly from a system architecture perspective, testbed host 702 is distinct and apart from production host 102 and from the production environment in general and operates independently of the production environment, e.g., accessing point-in-time backups regardless of when they were taken and operating regardless on whether the production environment is "on" or "off" or executing backup operations.

Secondary storage computing device 706 is a specialized computing device analogous to secondary storage computing device 106, and comprising additional features needed for operating in system 700. According to the illustrative system architecture, secondary storage computing device 706 is configured as a component that is distinct and apart from application hosts 102 and 702. Secondary storage computing device 706 hosts an enhanced media agent 744 as well as enhanced pseudo-disk driver 762, which is responsible for creating and managing pseudo-disks 765, which are also hosted by secondary storage computing device 706. Secondary storage computing device 706 is in communication with secondary storage device(s) such as secondary storage device 108, storing one or more secondary copies of primary data, such as point-in-time backups 116.

Testbed application 710 is any application that may execute on a host. For example, application 710 may be a file system manager, such as Windows Explorer from Microsoft Corp; or any transactional application, such as an Oracle database from Oracle Corp.; or another application without limitation. Accordingly, in the present illustrative system 700, application 710 is the same as application 110, such that application 710 may use backup data from application 110 as its own recovery data source. Application 710 is identified as a "testbed application," because it is remote from the primary application 110 and from the production environment and operates according to the illustrative embodiment, e.g., using as-needed data to/from a pseudo-disk without restoring a full backup image in its entirety.

Enhanced media agent 744 is a media agent analogous to media agent 144 and additionally comprises features needed for operating in system 700, such as having a communication pathway to enhanced pseudo-disk driver 762 and instructing the enhanced pseudo-disk driver to create a pseudo-disk 765 that corresponds to a particular point-in-time backup 116 that enhanced media agent 744 was involved in creating. Enhanced media agent 744 is also responsible for exposing pseudo-disks over network 701 using iSCSI or FC as the underlying transport.

Enhanced pseudo-disk driver 762 is similar to pseudo-disk driver 262 disclosed in the parent patent application and additionally comprises features needed for operating in system 700, such as a communications pathway to/from enhanced media agent 744, as well as the ability to receive instructions and information from enhanced media agent 744, the ability to generate, manage, and maintain any number of pseudo-disks 765 corresponding to respective point-in-time backup images that reside in secondary storage. Enhanced pseudo-disk driver 762 may be delivered, installed, and configured as part of enhanced media agent 744, but for the sake of enhancing understanding of the present disclosure, enhanced pseudo-disk driver 762 is shown and discussed herein as a component apart from enhanced media agent 744.

Pseudo-disks 765 (e.g., 765-1 through 765-*n*) are data structures that are analogous to pseudo-disk 265 disclosed in the parent application and are configured to operate in system 700. These are described in more detail in subsequent figures and elsewhere herein. Any number of pseudo-disks 765 may be configured and/or operating on a secondary storage computing device 706 at any given time.

System 700 may comprise any number of the depicted components and certain operations may occur concurrently in whole or in part. For example, more than one primary application 110 may be backed up to secondary copies 116 on one or more secondary storage devices. Any number of corresponding pseudo-disks may be generated for representing the secondary copies 116 respectively. Any number of secondary copies 116 may be exposed over one or more networks 701 to any number of testbed hosts 702. Correspondingly, more than one testbed application 710 may be activated using an exposed pseudo-disk 765, operating autonomously from another application 710 using another pseudo-disk 765. Accordingly, any number of distinct testbeds 702/710 may operate autonomously with respective attached pseudo-disks 765 using the illustrative components, configurations, and methods herein.

FIG. 8 is a block diagram illustrating some details of system 700, including a logical communication pathway 801 between an enhanced media agent 744 and enhanced pseudo-disk driver 762. Depicted components include: client computing device 102, hosting primary (production) application 110 and/or file system 210 and data agent 142; primary (production) data 112; secondary copy (point-in-time backup 1) 116-1; and secondary storage computing device 706 hosting enhanced media agent 744 and enhanced pseudo-disk driver 762. These components were depicted and described in an earlier figure. Additionally, the present figure depicts a set of dotted one-way arrows and dotted two-way arrow 801.

The set of dotted one-way arrows represent the logical pathway taken by data being backed up according to techniques that are well known in the art. Illustratively, primary data 112 is processed in part by data agent 142, transmitted to enhanced media agent 744 where is it is further processed, and finally transmitted to and stored at a secondary storage device in the form of a secondary copy 116. Because secondary copy 116 represents data backed up at a certain point in time it is referred to as a point-in-time backup image. Other operations, such as indexing where and how the secondary copy is stored are not shown here (e.g., index cache 153) but are described in more detail elsewhere herein.

Dotted bold two-way arrow 801 depicts a communication pathway between enhanced media agent 744 and enhanced pseudo-disk driver 762 that carries messages and/or instructions therebetween, which form part of system 700, e.g., acknowledgments, information about backup images 116 such as ID, point in time, type of application backed up in the image, type of backup, and/or any other suitable backup details, etc. Communication pathway 801 is used, for example, when media agent 744 instructs enhanced pseudo disk driver 762 to create a pseudo-disk 765 to represent a certain backup image 116. The instructions may include relevant information about the particular backup image, such as an associated identifier, a point in time, a job ID, etc., that uniquely identifies the backup image relative to others. The enhanced pseudo-disk driver 762 may respond with acknowledgment messages and/or may request additional details, such as identifiers or state information pertaining to the primary data or primary application.

FIG. 9 is a block diagram illustrating some details of secondary storage computing device 706 and of testbed host 702 in system 700. FIG. 9 depicts: storage manager 140; secondary copy (point-in-time backup 1) 116-1; network 701; secondary storage computing device 706 comprising enhanced media agent 744, enhanced pseudo-disk driver 762, SCSI target communications module 923, message handler 924, and pseudo-disk 765-1 comprising I/O buffer 963, recall store 966 and private store 968; and testbed host 702 hosting data agent 142/242, testbed application 710, discovery module 910, and SCSI device node 922. Relative to the SCSI relationship between testbed application 710 and pseudo-disk 765-1, testbed host 702 is the "SCSI initiator" and pseudo-disk 765-1 is the "SCSI target." Communication pathway 801 also is depicted.

Data agent 142/242 is invoked when testbed application 710 needs to begin executing using a recovery data source, i.e., to enable testbed application 710 to access backup data via an exposed pseudo-disk 765. For example, data agent 142/242 receives information about the identified point-in-time backup (the one that was selected as the recovery data source for the testbed application—see, e.g., block 1006 at FIG. 10) from storage manager 140 and/or from enhanced media agent 744. Accordingly, data agent 142/242 knows what application was captured in the backup. Data agent 142/242 performs operations needed to get the backup ready to be accessed, e.g., mounting a file system, rolling back logs to get to an application-consistent recovery point, etc. These features of data agent 142/242 are not specific to system 700.

Enhanced pseudo-disk driver 762 is generally responsible for creating one or more pseudo disks such as pseudo-disk 765-1 in response to instructions received from enhanced media agent 744. Enhanced pseudo-disk driver 762 also tracks and manages the pseudo-disks 765, e.g., removing a pseudo-disk when it is no longer needed. Enhanced pseudo-disk driver 762 is also responsible for installing associated utilities such as SCSI target communicator 923 and message handler 924. An embodiment of enhanced pseudo-disk driver 762 is the so-called "CVBLK" driver implemented by Commvault Systems, Inc.

Pseudo-disk 765-1, which is one of any number of pseudo-disks 765 created on secondary storage computing device 706, comprises a number of logical sub-components that are uniquely created for and associated with this particular pseudo-disk: I/O buffer 963, recall store 966, and private store 968. These logical sub-components are implemented in the kernel of secondary storage computing device 706. Another logical component, which is not shown here, is a process that executes in userspace and which is responsible for servicing the I/O buffer 963.

Discovery module 910 is an executable component that may be implemented in software and/or firmware and which executes on testbed host 702. The disk discovery utility 910 finds storage devices accessible to the testbed host, including pseudo-disks exposed over iSCSI or FC and residing on another device, such as secondary storage computing device 706. Application 710 may use this utility to find storage volumes that are available for attaching to. Alternatively, testbed host 702 may execute this utility and populate the discovery results to a local data structure (not shown) that application 710 may access to obtain the information. The present enhanced solution only minimally impacts the testbed host 702 by installing discovery module 910 thereon, which occupies only a minimal footprint on the testbed host and operates outside the testbed host's kernel or operating system.

SCSI device node 922 is a functional module operating on testbed host 702. SCSI device node 922 is the entity that testbed application 710 "sees" as its local SCSI storage device interface. SCSI device node 922 provides an interface from testbed application 710 to the storage device, in this case to pseudo-disk 765-1 via a series of other components, including SCSI target communicator 923. As shown by the series of dotted arrows between SCSI device node 922 reaching to/from I/O buffer 963 in pseudo-disk 765-1, testbed application 710 communicates with a pseudo-disk that actually resides and operates from a remote device, i.e., secondary storage computing device 706, across network 701. SCSI device node 922, communicates SCSI protocol commands known as Command Descriptor Blocks ("CDBs") to/from SCSI target communications module 923 (which operates on secondary storage computing device 706) over network 701, using iSCSI or FC as the underlying transport protocol for the SCSI message set. Other transport protocols supporting the SCSI message set may be used in alternative embodiments with different network technologies deployed in network 701.

SCSI target communications module 923 is a functional module on the SCSI storage/target side—here associated with pseudo-disk 765-1—that handles communications between SCSI initiator and the data source. The communications and interfacing functionality provided by this module is well known in the art. Here, SCSI target module 923 receives SCSI messages (CDBs) from SCSI device node 922 at the initiator side and transfers those messages to a co-located message handler 924. According to the illustrative embodiment, module 923 is an off-the-shelf product. SCSI target communicator 923 is particularly associated with a given pseudo-disk, e.g., 765-1.

Message handler 924, is a Commvault-specific functional module or utility that is responsible for interfacing between SCSI target communications module 923 and I/O buffer 923 deployed in the associated pseudo-disk 765. Message handler 924 takes CDB messages from module 923 and feeds them to the I/O buffer 923; and vice-versa converts responses from I/O buffer 963 into CDBs to be transmitted back to the initiator side (host 702). Message handler 924 is particularly associated with a given pseudo-disk, e.g., 765-1.

I/O buffer 963 is analogous to I/O buffer 263 but in contrast thereto is configured away from the production environment and operates in the intermediary component that is secondary storage computing device 706. I/O buffer 963 receives read and write requests from testbed application 710 and stores responses thereto—after application 710 logically attaches to pseudo-disk 765-1 as a SCSI storage device. Because the application's read and write requests traverse a series of components, including 922, 923, and 924, communications between testbed application 710 and I/O buffer 963 are said to be indirect.

Recall store 966 is analogous to recall store 266 but in contrast thereto is configured away from the production environment and operates in the intermediary component that is secondary storage computing device 706. Recall store 966 receives and stores data blocks or extents retrieved (or "recalled") from the corresponding point-in-time backup image 116-1 with which the pseudo-disk is associated. The retrieval operations may be facilitated by enhanced media agent 744, i.e., determining where an identified extent/block is located in secondary storage, e.g., based in index cache 153 (not shown in the present figure).

Private store 968 is analogous to private store 268 but in contrast thereto is configured away from the production environment and operates in the intermediary component that is secondary storage computing device 706. Private store 968 receives and stores data blocks or data extents from I/O buffer 963, which are generated by testbed application 710 write requests. In response to read requests submitted by testbed application 710, appropriate data blocks/extents may be read from private store 968 rather than being read from recall store 966 or from backup image 116-1 (for further details see, e.g., block 1214 in FIG. 12).

FIG. 10 depicts some salient operations of a method 1000 according to an illustrative embodiment of the present invention. Method 1000 is executed in system 700 by the components recited herein. In general, method 1000 is directed at enabling and executing a testbed application 710 on a testbed host 702 using an exposed pseudo-disk 765 over iSCSI or FC as the testbed application's recovery data source—executing the testbed application with as-needed backup data, yet without fully restoring the backup image 116 and moreover without disturbing the primary application 116, primary data 112, or primary client computing device 102.

At block 1002, a pseudo-disk driver (e.g., 762) is installed co-resident with or part of an enhanced media agent (e.g., 744) on a secondary storage computing device (e.g., 706) distinct and apart from application hosts (e.g., 102, 702). The pseudo-disk driver may be delivered to and installed on secondary storage computing device 706 in conjunction with enhanced media agent 744. As noted earlier, NO pseudo-disk driver is installed on the application hosts 102 and 702. Rather, enhanced pseudo-disk driver 762 operates on the intermediary component that is the secondary storage computing device, which also hosts enhanced media agent 744.

At block 1004, data agent 142 and enhanced media agent 744 generate a point-in-time block-level backup of a primary data volume (e.g., 112) used by a primary (production) application, storing the backup image (e.g., 116-1) to secondary storage (e.g., 108). Generating a point-in-time block level backup of primary data is well known in the art. Although it is not shown here, enhanced media agent 744 performs certain indexing functions in reference to the backup image (e.g., storing data/metadata in index cache 153) and reports backup job results and other information to the storage manager 140 that manages storage operations and other information management operations in system 700.

At block 1006, enhanced media agent 744 receives information from storage manager 140 or from an associated console—information that will trigger the features disclosed herein. The information may represent choices input by a user and/or may be otherwise configured such as via scripting. The information will identify a point-in-time backup 116 that is to be used by a testbed application on a certain identified destination computing device. The information may comprise an identifier of a point-in-time backup (e.g., 116-1) and a destination (e.g., testbed host 702), as well as may identify a testbed application 710 on the testbed host. Accordingly, enhanced media agent 744 instructs the co-resident enhanced pseudo-disk driver 762 (e.g., using communication pathway 801) to create a pseudo-disk corresponding to the identified backup image. For example, a user may identify a backup executed at noon the previous day as the data source for a testbed application on a certain testbed host.

At block 1008, the enhanced pseudo-disk driver 762 generates, on the secondary storage computing device 706, a pseudo-disk (e.g., 765-1), which points to and represents the identified backup image (e.g., 116-1), and which includes data structures such an I/O buffer (e.g., 963), a recall store (e.g., 966), and a private store (e.g., 968). These data structures are illustratively created in the kernel of secondary storage computing device 706. More details are given in a subsequent figure.

At block 1010, the enhanced media agent 744 exposes pseudo-disk 765-1 as a SCSI storage device over an IP or SAN network (e.g., 701) that connects the secondary storage computing device 706 to the testbed host 702. Having caused the pseudo-disk to be properly generated in the preceding block, enhanced media agent 744 exposes the pseudo-disk as a SCSI storage peripheral using techniques that are well known in the art. Notably, the exposing operation is performed over an IP or FC network, so that pseudo-disk 765-1 may attach over said network to an application at a destination, such as testbed host 702.

At block 1012, testbed host 702 executes a testbed application (e.g., 710) using the exposed pseudo-disk 765 over iSCSI or FC as the testbed application's recovery data source, executing the testbed application with as-needed backup data—yet without disturbing primary application 110, primary data 112, or primary client computing device 102, and without fully restoring the backup image 116-1 that is associated with the exposed pseudo-disk 765-1. At block 1012, the testbed environment is fully functional, executing testbed application 710 with pseudo-disk 765 attached as a SCSI storage peripheral. More details are given in a subsequent figure.

FIG. 11 depicts some salient sub-operations of block 1008 in method 1000. Block 1008 is executed by enhanced pseudo-disk driver 762 on secondary storage computing device 706, wherein enhanced pseudo-disk driver 762 generates a pseudo-disk 765, which points to and represents the identified point-in-time backup image and includes an I/O buffer, a recall store, and a private store.

At block 1102, enhanced pseudo-disk driver 762 creates a pseudo-disk data structure 765 (e.g., 765-1) in the kernel of secondary storage computing device 706. The pseudo-disk logically comprises data structures such as a private store 968, a recall store 966, and an I/O buffer 963. Additionally, message handler 924 and SCSI target communicator 923 also are installed in secondary storage computing device 706; these modules are associated with this particular pseudo-disk, e.g., 765-1, and are part of a component chain that enables testbed application 710 to communicate with pseudo-disk 765-1 (e.g., 922, 923, 924).

At block 1104, enhanced pseudo-disk driver 762 creates or instantiates a process in userspace of secondary storage computing device 706 to service I/O requests (e.g., reads and writes) in I/O buffer 963—received from testbed application 710 via components 922, 923, and 924. Servicing the I/O buffer 963 involves recognizing the type of request and where/how the data may be found using the pseudo-disk's recall store 966 and private store 968 resources—these operations are described in more detail in block 1214 in FIG. 12.

At block 1106, enhanced pseudo-disk driver 762 associates the present pseudo-disk (e.g., 765-1) with a source volume comprising a certain point-in-time backup image, e.g., backup 116-1, stored at a certain offset/location on secondary storage device 108. Accordingly, the location of the backup image is now associated with the corresponding pseudo-disk created to represent the backup in system 700, or more specifically, created to represent the backup image to a certain selected testbed application. Accordingly, the pseudo-disk is configured to point to the chosen backup image, e.g., a pointer to a certain location in secondary storage where the backup image is stored.

At block 1108, enhanced pseudo-disk driver 762 associates the pseudo-disk with an identity of the associated backup image (e.g., a job number, a point-in-time, etc.). In order to represent itself as a certain point-in-time backup, pseudo-disk 765-1 must properly associate itself with an identifier of the backup image that uniquely identifies it in system 700, such as a job number that created the backup image and/or a point in time that unambiguously identifies the backup image and its source. This identity is one that a user may perceive when choosing the backup image as the recovery data source for a testbed application. The objective here is to ensure that logical connections are properly made between an existing backup image 116 and the respective pseudo-disk 765 that represents the backup as a data source. For example, a backup ID "Oracle_DB08_full_backup_2016-Jan-01_20:00:00" may be an identifier assigned to a full backup taken of an Oracle DBMS primary application 110 at the given date and time. Any naming convention or designation scheme may be used without limitation. Accordingly, this identifier is associated hereby with the given pseudo-disk 765.

At block 1110, enhanced pseudo-disk driver 762 uses the associated identity to self-represent the pseudo-disk as the associated backup image. Accordingly, when the pseudo-disk 765 is exposed as a SCSI storage peripheral (see, e.g., block 1010), it will point to this associated backup image when accessed. Since the pseudo-disk 765 is exposed, and the actual backup image is not exposed to the testbed host, the pseudo-disk 765 is what testbed host 702 will "see" as a SCSI storage resource.

FIG. 12 depicts some salient sub-operations of block 1012 in method 1000. Block 1012 is generally directed at executing the testbed application using a pseudo-disk over an intervening network as the recovery point.

At block 1202, on the testbed host (e.g., 702), notice is received (e.g., from the expose operation at block 1010) of a SCSI storage device being available, which is really a pseudo-disk 765 (e.g., pseudo-disk 765-1). Notably, the pseudo-disk 765 is exposed, not the associated secondary copy (point-in-time backup image 116). Hence, testbed application 710 will lack any knowledge of the actual secondary copy in secondary storage and will only "see" the exposed pseudo-disk 765 is the data source to use.

At block 1204, the testbed application (e.g., 710) is activated on the testbed host. Notably, this operation is autonomous and independent from operations in the production environment (including components 102, 104, 110, and 112), because the testbed host is distinct and apart from the primary client computing device (e.g., 102). Accordingly, the testbed application may be activated and may operate apart from the primary (production) application 110, at any time, whether application 110 is actively executing or not.

At block 1206, the testbed application scans for storage disks (e.g., using discovery module 910) and "sees" SCSI device node 922 as a local SCSI storage device. As explained, SCSI device node 922 confers a logical SCSI relationship to pseudo-disk 765. Because SCSI is used over iSCSI or FC, the testbed application is not aware that the pseudo-disk actually resides on a remote component, i.e., secondary storage computing device 706. Rather, via SCSI device node 922, the pseudo-disk is effectively treated as local storage from the perspective of testbed application 710.

At block 1208, the testbed application attaches to the SCSI storage device (i.e., the exposed pseudo-disk) as its recovery point using iSCSI or FC over the intervening IP or SAN network 701, respectively. This operation is well known in the art and is application-specific, as different applications attach to storage in different ways. For example, a file system application may mount the pseudo-disk; a database application may recognize and access the pseudo-disk; etc. The application has no awareness that the pseudo-disk represents a volume in secondary storage. The attach operation may be facilitated or executed by the associated data agent 142/242 operating on testbed host 702.

At block 1210, the testbed application requests I/O to the attached storage device (i.e., pseudo-disk) using the storage device's I/O buffer (e.g., 963). The testbed application (indirectly via components 922, 923, 924) places read and write requests in the I/O buffer and receives responses therefrom, again with no awareness that the I/O buffer belongs to a pseudo-disk and not to a full-sized recovery volume.

At block 1212, the pseudo-disk driver (e.g., 762) instructs the userspace process associated with the respective pseudo-disk 765 to service the I/O requests in the pseudo-disk's I/O buffer 963.

At block 1214, the userspace process on secondary storage computing device 706 services the testbed application's I/O requests illustratively by executing blocks 502-515 in FIG. 5—using I/O buffer 963 to process data as needed. Accordingly, write requests are written to private store 968. Read requests are serviced from the most efficient source, including: from private store 968 if a block/extent was most recently written thereto; from recall store 966 if a block/extent was most recently recalled thereto; or otherwise from the backup image in secondary storage (e.g., 116-1) via a recall store 966 (i.e., recalling data to the recall store before serving the read response).

The result of this approach is that testbed application 710 operates with as-needed data without needing to restore the point-in-time backup image (e.g., 116-1) in its entirety. Only read-requested data is extracted from the backup image 116 and kept in the recall store. If data is changed by the testbed application's write operations, the most recently written data blocks/extents are served from the private store. No effort is made to reconcile these changes with the backup image or to incorporate the changed data into the restored image—because no full-blown restore is executed and the testbed application operates on as-needed data from the pseudo-disk's recall store and private store resources. This approach provides a substantial advantage over the "instant application recovery" scenario described in the parent application, because the background restore of the entire backup image is not required in the present testbed scenario and thus fewer system and network resources are used; furthermore, the changes collected in the private store need not be applied in order to complete the process. To verify the integrity of the backup image, for example, a number of test scripts may be executed without having to restore all of the backup image, retrieving only what is needed as needed. Meanwhile, the production environment may operate undisturbed by what is happening at the testbed.

Block 1012 may be repeated when a new/different point-in-time backup 116 is to be used with the testbed application 710. Accordingly, a new pseudo-disk 765 (e.g., 765-2) will be created on secondary storage computing device 706 and exposed to the testbed host 702 via iSCSI or FC over network 701. The new pseudo-disk will attach to the testbed application, providing its own I/O buffer, recall store, and private store resources for as-needed data, as well associated handler 924 and SCSI target communicator 923 with a corresponding SCSI device node 922 being created on the SCSI initiator side at testbed host 702. Alternatively, a separate testbed may be implemented at another, distinct, computing device 702, again establishing a new pseudo-disk (e.g., 765-3) and associated components 922, 923, and 924.

The enumerated functionality herein is presented without limitation, and it will be understood by those having ordinary skill in the art, after reading the present disclosure, that substantial additional functionality is enabled by the architecture of system 700 and the depicted components thereof, according to the exemplary embodiment as well as other alternative embodiments.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

According to an illustrative embodiment of the present enhancement, a method for executing an application in a storage management system apart from a production environment may comprise: storing a secondary copy to a secondary storage device that is in communication with a secondary storage computing device, wherein the secondary copy is a block-level point-in-time backup of primary data for a first application that operates on a client computing device in the production environment, wherein the secondary storage computing device hosts a media agent and a pseudo-disk driver, and wherein the secondary storage computing device is in communication over a network with a host computing device that hosts a second application; generating a pseudo-disk on the secondary storage computing device, by the pseudo-disk driver, wherein the generating further comprises associating the pseudo-disk with the secondary copy; exposing the pseudo-disk as a SCSI storage device over the network to the host computing device; executing the second application on the host computing device using the exposed pseudo-disk as the second application's recovery point, wherein data written by the second application is stored to a second data structure of the pseudo-disk; and wherein the second application uses the pseudo-disk without restoring the secondary copy in its entirety from the secondary storage device.

The above-recited method may further comprise: instructing, by the media agent, the pseudo-disk driver to generate the pseudo-disk corresponding to the secondary copy. The above-recited method wherein the generating comprises creating (i) a first data structure for storing data recalled from the secondary copy, (ii) the second data structure for storing data written by the second application, and (iii) an input-output buffer for receiving read and write requests from the second application and for responding thereto.

According to another illustrative embodiment of the present enhancement, a method for executing an application in a storage management system apart from a production environment that also operates in the storage management system, may comprise: storing a secondary copy to a secondary storage device that is in communication with a secondary storage computing device, wherein the secondary copy is a block-level point-in-time backup of primary data for a first application that operates on a client computing device in the production environment, wherein the secondary storage computing device hosts a media agent and a pseudo-disk driver, and wherein the secondary storage computing device is in communication over a network with a host computing device that hosts a second application; instructing, by the media agent, the pseudo-disk driver to generate a pseudo-disk corresponding to the secondary copy; generating the pseudo-disk on the secondary storage computing device, by the pseudo-disk driver, wherein the generating comprises creating (i) a first data structure for storing data recalled from the secondary copy, (ii) a second data structure for storing data written by the second application, and (iii) an input-output buffer for receiving read and write requests from the second application and for responding thereto, and wherein the generating further comprises associating the pseudo-disk with the secondary copy; exposing the pseudo-disk as a SCSI storage device over the network to the host computing device; executing the second application on the host computing device using the exposed pseudo-disk as the second application's recovery point, wherein data written by the second application is stored to the second data structure of the pseudo-disk; and wherein the second application uses the pseudo-disk without restoring the secondary copy in its entirety from the secondary storage device.

The above-recited method wherein data read requests issued by the executing second application are satisfied by the pseudo-disk by (a) retrieving the requested data from the second data structure; and if the requested data cannot be found in the second data structure, by (b) retrieving the requested data from the first data structure; and if the requested data cannot be found in the first data structure, by (c) retrieving the requested data from the secondary copy to the first data structure and serving the requested data therefrom. The above-recited method wherein the second application executes on the host computing device without impacting the first application, without impacting the client computing device, and without impacting the production environment. The above-recited method wherein the instructing by the media agent comprises information about a backup job in the storage management system that generated the secondary copy, and wherein the pseudo-disk is associated with the backup job. The above-recited method wherein the pseudo-disk comprises a pointer to the secondary copy stored in the secondary storage device. The above-recited method wherein the second application uses pseudo-disk resources, including the first data structure and the second data structure, to operate based on as-needed data without initiating a restore of the entire secondary copy from the secondary storage device. The above-recited method wherein the host computing device is distinct and apart from the client computing device, and wherein the second application executes on the host computing device using the exposed pseudo-disk on the secondary storage computing device, apart from the production environment that includes the client computing device. The above-recited method wherein the pseudo-disk is exposed using iSCSI protocol. The above-recited method wherein the network is an Internet Protocol data network and wherein the pseudo-disk is exposed using iSCSI protocol. The above-recited method wherein the pseudo-disk is exposed using Fibre Channel protocol. The above-recited method wherein the network is a Storage Area Network and wherein the pseudo-disk is exposed using Fibre Channel protocol.

In another embodiment of the present enhancement a storage management system may comprise: a primary storage subsystem that comprises a primary application executing on a client computing device, wherein the application accesses primary data on a primary storage device; a secondary storage device storing a secondary copy of the primary data, wherein the secondary copy is a point-in-time block-level backup of the primary data; a secondary storage computing device that hosts (i) a media agent that acts as a data access portal to the secondary storage device and the secondary copy stored thereon, and (ii) a pseudo-disk created by a pseudo-disk driver, wherein the pseudo-disk points to the secondary copy; a host computing device in communication with the secondary storage computing device over a network, wherein the pseudo-disk is exposed over the network to the host computing device as a SCSI storage device; and a secondary application executing on the host computing device, wherein the secondary application is logically attached to the pseudo-disk as a recovery data source for the secondary application, and wherein the second application uses the pseudo-disk to access data as needed without restoring the secondary copy in its entirety from the secondary storage device.

The above-recited storage management system wherein the pseudo-disk comprises: (a) a first data structure for storing data recalled from the secondary copy in response to some data read requests received from the secondary application, (b) a second data structure for storing data written by the secondary application, and (c) an input-output buffer for receiving read and write requests from the secondary application and for responding thereto. The above-recited storage management system wherein data read requests issued by the secondary application are satisfied by the pseudo-disk by (A) retrieving the requested data from the second data structure; and if the requested data cannot be found in the second data structure, by (B) retrieving the requested data from the first data structure; and if the requested data cannot be found in the first data structure, by (C) retrieving the requested data from the secondary copy to the first data structure and serving the requested data therefrom. The above-recited storage management system wherein the pseudo-disk driver also resides on the secondary storage computing device; and wherein the media agent is configured to instruct the pseudo-disk driver to create the pseudo-disk and to associate the pseudo-disk with the secondary copy after the media agent is involved in storing the secondary copy to the secondary storage device.

In yet another embodiment of the present enhancement, a computer-readable medium, excluding transitory propagating signals, storing instructions that, when executed by at least one secondary storage computing device, may cause the secondary storage computing device to perform operations comprising: storing a secondary copy to a secondary storage device that is in communication with a secondary storage computing device, wherein the secondary copy is a block-level point-in-time backup of primary data for a first application that operates on a client computing device; hosting a media agent and a pseudo-disk driver; communicating over a network with a host computing device that hosts a second application, wherein the host computing device is distinct and apart from the client computing device; after storing the secondary copy to the secondary storage device, causing the pseudo-disk driver to generate a pseudo-disk corresponding to and associated with the secondary copy, wherein the pseudo-disk comprises (i) a first data structure for storing data retrieved from the secondary copy, (ii) a second data structure for storing data written by the second application, and (iii) an input-output buffer for receiving read and write requests from the second application and for responding thereto; and exposing the pseudo-disk as a SCSI storage device over the network to the host computing device, thereby enabling the second application to attach to the exposed pseudo-disk and to use the exposed pseudo-disk as pseudo-disk as a recovery data source for the second application without restoring the secondary copy in its entirety from the secondary storage device. The above-recited computer-readable medium wherein the operations further comprise: storing data written by the second application to the second data structure of the pseudo-disk; and serving data read requests received from the second application by (a) retrieving requested data from the second data structure of the pseudo-disk, and if the requested data cannot be found in the second data structure, by (b) retrieving the requested data from the first data structure, and if the requested data cannot be found in the first data structure, by (c) retrieving the requested data from the secondary copy to the first data structure and serving the requested data therefrom. The above-recited computer-readable medium wherein the media agent is configured to instruct the pseudo-disk driver to create the pseudo-disk and to associate the pseudo-disk with the secondary copy after the media agent is involved in storing the secondary copy to the secondary storage device. The above-recited computer-readable medium wherein the secondary storage computing device and the host computing device operate in conjunction with each other to enable the second application to execute using the pseudo-disk without impacting or interacting with the first application, the primary data, and the client computing device.

According to an illustrative embodiment of the present invention, a method associated with a data agent that executes on a client computing device in a system, the method may comprise: mounting, to a first mount point of the client computing device, a destination volume on a primary storage device; initiating a full restore of backed up data from a secondary storage device to the destination volume on the primary storage device, wherein the backed up data represents primary data generated by an application; mounting, to the first mount point of the client computing device, a pseudo-volume based on a driver executing on the client computing device; starting the application on the client computing device, based on using the pseudo-volume for primary data, wherein, after starting the application, the full restore continues to restore backed up data to the destination volume on the primary storage device substantially concurrently with the application; in response to a write request issued by the application, storing one or more changed data blocks to a first data structure configured in the pseudo-volume; and in response to a read request issued by the application: (i) supplying one or more data blocks from the first data structure, if the data block is found therein, (ii) supplying one or more data blocks from a second data structure configured in the pseudo-volume, if the one or more data blocks were not found in the first data structure and were found in the second data structure, and (iii) fetching the one or more data blocks from the backed up data in the secondary storage device if the one or more data blocks were not found in either of the first data structure and the second data structure.

The above-recited method may further comprise: after the full restore is completed: (a) stopping the application, (b) unmounting the pseudo-volume from the first mount point, (c) updating the destination volume with the changed data blocks from the first data structure; and (d) re-starting the application based on using the updated destination volume for primary data; wherein the stopping, unmounting, updating, and re-starting operations are performed by the data agent that executes on the client computing device. The above-recited method may further comprise: copying, by the data agent, at least some data blocks from the destination volume to the second data structure.

Another illustrative method may comprise: executing an application on a client computing device substantially concurrently with restoring a backup copy of primary data previously generated by the application, based on: (i) restoring the backup copy from a secondary storage device to a destination volume, on a primary storage device, that is mounted to a first mount point of the client computing device; (ii) executing the application on the client computing device, based on using a pseudo-volume as a store for primary data, wherein the pseudo-volume is also mounted to the first mount point of the client computing device after the primary storage device is mounted, and wherein the pseudo-volume comprises a first data structure for storing data blocks retrieved from the backup copy on the secondary storage device in response to read requests issued by the application, and further comprises a second data structure for storing changed data blocks from write requests issued by the application; (iii) after the restoring of the backup copy to the destination volume is completed, (a) stopping the application, (b) unmounting the pseudo-volume from the first mount point, and (c) updating the destination volume with the changed data blocks from the second data structure; and executing the application again, on the client computing device, based on using the updated destination volume as the store for primary data.

The above-recited method wherein the pseudo-volume is a logical storage device presented by a driver that executes on the client computing device. The above-recited method wherein the using of the pseudo-volume as the store for primary data while executing the application on the client computing device is managed by a data agent that also executes on the client computing device. The above-recited method wherein the using of the pseudo-volume as the store for primary data while executing the application on the client computing device is managed by a data agent that also executes on the client computing device; and wherein the data agent executes a write request issued by the application by writing one or more changed data blocks to the second data structure in the pseudo-volume. The above-recited method wherein the using of the pseudo-volume as the store for primary data while executing the application on the client computing device is managed by a data agent that also executes on the client computing device; and wherein the data agent executes a read request issued by the application by: supplying one or more data blocks from the second data structure if the one or more data blocks are found therein, supplying one or more data blocks from the first data structure if the one or more data blocks were not found in the second data structure and were found in the first data structure, and causing one or more data blocks to be fetched from the backup copy on the secondary storage device if the one or more data blocks were not found in either of the first data structure or the second data structure. The above-recited method wherein the executing of the application substantially concurrently with restoring the backup copy causes less downtime of the application as compared to executing the application only after restoring the backup copy to the destination volume. The above-recited method wherein a write request issued by the application causes one or more changed data blocks to be stored to the second data structure in the pseudo-volume. The above-recited method wherein a response to a read request for a data block comprises: supplying the data block from the second data structure if the data block is found therein; supplying the data block from the first data structure if the data block was not found in the second data structure and was found in the first data structure; and fetching the data block from the backup copy on the secondary storage device if the data block was not found in either of the first data structure or the second data structure.

According to an illustrative embodiment, a computer-readable medium, excluding transitory propagating signals, storing instructions that, when executed by at least one client computing device, cause the client computing device to perform operations may comprise: executing a driver that presents a pseudo-volume to the client computing device; executing an application substantially concurrently with restoring a backup copy of primary data previously generated by the application, based on: (i) restoring the backup copy from a secondary storage device to a destination volume, on a primary storage device, that is mounted to a first mount point of the client computing device; (ii) executing the application on the client computing device, based on using the pseudo-volume as a store for primary data, wherein the pseudo-volume is also mounted to the first mount point of the client computing device after the primary storage device is mounted, and wherein the pseudo-volume comprises a first data structure for storing data blocks retrieved from the backup copy on the secondary storage device in response to read requests issued by the application, and further comprises a second data structure for storing changed data blocks from write requests issued by the application; (iii) after the restoring of the backup copy to the destination volume is completed: (a) stopping the application, (b) unmounting the pseudo-volume from the first mount point, and (c) updating the destination volume with the changed data blocks from the second data structure; and executing the application again, based on using the updated destination volume as the store for primary data.

An illustrative system for application recovery based on using a pseudo-storage-device driver, the system comprising: a client computing device in communication with a primary storage device and a secondary storage device; wherein the client computing device is configured with a mount point, and also comprises an executable application, an executable data agent, and an executable driver; wherein the primary storage device comprises a destination volume that is mounted to the first mount point of the client computing device; wherein the secondary storage device comprises a backup copy of primary data previously generated by the application; wherein the driver is configured to present a pseudo-volume mounted to the same first mount point of the client computing device; wherein the pseudo-volume comprises a first data structure for storing data blocks retrieved from the backup copy on the secondary storage device in response to read requests issued by the application, and further comprises a second data structure for storing changed data blocks based on write requests issued by the application; and wherein, based on the pseudo-volume being mounted to the same first mount point of the client computing device as the destination volume, the system is configured to substantially concurrently (a) execute a full restore of the backup copy from the secondary storage device to the destination volume, and (b) execute the application on the client computing device, based on using the pseudo-volume as a store for primary data.

The above-recited system wherein the data agent is configured to: initiate the full restore of the backup copy from the secondary storage device to the destination volume, before the pseudo-volume is mounted to the first mount point of the client computing device, initiate execution of the application, after the pseudo-volume is mounted to the first mount point of the client computing device, in response to a write request issued by the application, store one or more changed data blocks to the second data structure, in response to a read request issued by the application: (i) supply a data block from the second data structure if the data block is found therein, (ii) supply a data block from the first data structure if the data block was not found in the second data structure and was found in the first data structure; and (iii) fetch a data block from the backup copy in the secondary storage device if the data block was not found in either of the first data structure and the second data structure; and based on the completion of the full restore: (a) stop the application,
(b) unmount the pseudo-volume from the first mount point, (c) update the destination volume with the changed data blocks from the second data structure, and (d) re-initiate execution of the application on the client computing device, based on using the updated destination volume for primary data.

The above-recited system may further comprise: a storage manager in communication with the data agent; wherein the storage manager is configured to initiate the full restore of the backup copy from the secondary storage device to the destination volume, before the pseudo-volume is mounted to the first mount point of the client computing device. The above-recited system wherein the data agent is configured to: initiate execution of the application on the client computing device while the full restore of the backup copy is underway with the destination volume mounted to the first mount point, in response to a write request issued by the application, store one or more changed data blocks to the second data structure, in response to a read request issued by the application: (i) supply a data block from the second data structure if the data block is found therein, (ii) supply a data block from the first data structure if the data block was not found in the second data structure and was found in the first data structure; and (iii) fetch a data block from the backup copy in the secondary storage device if the data block was not found in either of the first data structure and the second data structure; and based on the completion of the full restore: (a) stop the application, (b) unmount the pseudo-volume from the first mount point, (c) update the destination volume with the changed data blocks from the second data structure, and (d) re-initiate execution of the application on the client computing device, based on using the updated destination volume for primary data. The above-recited system wherein the data agent is further configured to: copy at least some data blocks from the destination volume to the second data structure.

Other methods, systems, and computer-readable media will also fall within the scope of the present invention, based on one or more of the above-recited illustrative methods, systems, and computer-readable media, and/or in any combination thereof.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for executing an application in a storage management system apart from a production environment by using a pseudo block storage device, the method comprising:
   storing a secondary copy to a storage device, wherein the secondary copy is a block-level backup copy of primary data of a first application that operates on a client computing device in the production environment,
      wherein the storage device is in communication with a first computing device that hosts a media agent and a pseudo-disk driver, and
      wherein the first computing device is in communication over a network with a second computing device;
   by the pseudo-disk driver, generating a pseudo-disk on the first computing device,
      wherein the pseudo-disk comprises (i) a first data structure for storing data recalled from the secondary copy and (ii) a second data structure for storing data written by a second application, and
      wherein the generating further comprises associating the pseudo-disk with the secondary copy;
   by the media agent, exposing the pseudo-disk as a Small Computer System Interface (SCSI) block storage device over the network to the second computing device;
   executing the second application on the second computing device without restoring the secondary copy in its entirety from the storage device, based on using the pseudo-disk to read data blocks therefrom and to write data blocks thereto, comprising:
      (a) upon determining that data blocks specified in a first read request issued by the second application can be found in the second data structure, the pseudo-disk driver serves the first read request therefrom,
      (b) upon determining that data blocks specified in a second read request issued by the second application cannot be found in the second data structure and can be found in the first data structure, the pseudo-disk driver serves the second read request from the first data structure,
      (c) upon determining that data blocks specified in a third read request issued by the second application cannot be found in the first data structure or in the second data structure, the pseudo-disk driver retrieves the data blocks specified in the third read request from the secondary copy into the first data structure and serves the third read request from the first data structure, and
      (d) wherein data blocks written by the second application are stored to the second data structure of the pseudo-disk.

2. The method of claim 1 further comprising:
   by the media agent, instructing the pseudo-disk driver to generate the pseudo-disk corresponding to the secondary copy.

3. The method of claim 1, wherein the pseudo-disk further comprises (iii) an input-output buffer for receiving read and write requests from the second application and for responding thereto.

4. The method of claim 1, wherein the media agent instructs the pseudo-disk driver to generate the pseudo-disk, including providing information to the pseudo-disk driver about a backup job in the storage management system that generated the secondary copy, and wherein the pseudo-disk is associated with the backup job.

5. The method of claim 1, wherein the pseudo-disk further comprises a pointer to the secondary copy stored in the storage device.

6. The method of claim 1, wherein the second application uses pseudo-disk resources, including the first data structure and the second data structure, to operate based on as-needed data without initiating a restore of the secondary copy in its entirety from the storage device.

7. The method of claim 1, wherein the network uses as a protocol for carrying a SCSI message set at least one of: internet Small Computer System Interface (iSCSI) and Fibre Channel (FC).

8. The method of claim 1, wherein the first data structure and the second data structure are implemented in a kernel of an operating system of the first computing device.

9. The method of claim 1, wherein a process that executes in userspace of the first computing device services an input-output buffer of the pseudo-disk for receiving read and write requests from the second application and for responding thereto.

10. A storage management system comprising:
   a storage device storing a secondary copy based on primary data generated by a first application, wherein the secondary copy is a block-level backup copy of the primary data;
   a first computing device that hosts (i) a media agent that accesses the storage device and the secondary copy stored thereon, and (ii) a pseudo-disk created by a pseudo-disk driver, wherein the pseudo-disk points to the secondary copy, wherein the pseudo-disk is exposed as a Small Computer System Interface (SCSI) block storage device, over a network, to a second computing device, and
   wherein a second application executing on the second computing device uses the pseudo-disk as a recovery data source, using the pseudo-disk to access data as needed without restoring the secondary copy in its entirety from the storage device;
   wherein the pseudo-disk comprises: (a) a first data structure for storing data recalled from the secondary copy in response to some data read requests received from the second application, and (b) a second data structure for storing data written by the second application; and
   wherein the first computing device is configured to:
      (a) upon determining that data blocks specified in a first read request issued by the second application can be found in the second data structure of the pseudo-disk, serve the first read request therefrom,
      (b) upon determining that data blocks specified in a second read request issued by the second application cannot be found in the second data structure of the pseudo-disk and can be found in the first data structure of the pseudo-disk, serve the second read request from the first data structure,
      (c) upon determining that data blocks specified in a third read request issued by the second application cannot be found in the first data structure or in the second data structure of the pseudo-disk, retrieve the data blocks specified in the third read request from the secondary copy into the first data structure of the pseudo-disk and serve the third read request therefrom, and
      (d) store data blocks written by the second application to the second data structure of the pseudo-disk.

11. The storage management system of claim 10, wherein the first application executes on a client computing device that is distinct from the first computing device and the second computing device.

12. The storage management system of claim 10, wherein the pseudo-disk further comprises: (c) an input-output buffer for receiving read and write requests from the second application and for responding thereto.

13. The storage management system of claim 10, wherein the pseudo-disk driver executes on the first computing device; and
wherein the media agent is configured to instruct the pseudo-disk driver to create the pseudo-disk and to associate the pseudo-disk with the secondary copy.

14. The storage management system of claim 10, wherein the media agent instructs the pseudo-disk driver to generate the pseudo-disk and provides information to the pseudo-disk driver about a backup job in the storage management system that generated the secondary copy.

15. The storage management system of claim 10, wherein the pseudo-disk is associated with a backup job that generated the secondary copy.

16. The storage management system of claim 10, wherein the pseudo-disk further comprises a pointer to the secondary copy stored in the storage device.

17. The storage management system of claim 10, wherein the second application uses pseudo-disk resources, including the first data structure and the second data structure, to operate based on as-needed data without initiating a restore of the secondary copy in its entirety from the storage device.

18. The storage management system of claim 10, wherein the network uses as a protocol for carrying a SCSI message set at least one of: internet Small Computer System Interface (iSCSI) and Fibre Channel (FC).

19. The storage management system of claim 10, wherein the first data structure and the second data structure are implemented in a kernel of an operating system of the first computing device.

20. The storage management system of claim 10, wherein a process that executes in userspace of the first computing device services an input-output buffer of the pseudo-disk for receiving read and write requests from the second application and for responding thereto.

* * * * *